US012050548B2

(12) United States Patent
Itani et al.

(10) Patent No.: US 12,050,548 B2
(45) Date of Patent: *Jul. 30, 2024

(54) BUILT-IN SELF-TEST FOR A PROGRAMMABLE VISION ACCELERATOR OF A SYSTEM ON A CHIP

(71) Applicant: NVIDIA Corporation, Santa Clara, CA (US)

(72) Inventors: Ahmad Itani, San Jose, CA (US); Yen-Te Shih, Zhubei (TW); Jagadeesh Sankaran, Dublin, CA (US); Ravi P Singh, Austin, TX (US); Ching-Yu Hung, Pleasanton, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,819

(22) Filed: Dec. 20, 2022

(65) Prior Publication Data

US 2023/0125397 A1    Apr. 27, 2023

Related U.S. Application Data

(63) Continuation of application No. 17/391,891, filed on Aug. 2, 2021, now Pat. No. 11,573,921.

(51) Int. Cl.
*H03M 13/00* (2006.01)
*G06F 9/30* (2018.01)
(Continued)

(52) U.S. Cl.
CPC ...... *G06F 15/8053* (2013.01); *G06F 9/30101* (2013.01); *G06F 9/3887* (2013.01);
(Continued)

(58) Field of Classification Search
CPC ...... G06F 21/64; H03M 13/09; H03M 13/091
See application file for complete search history.

(56) References Cited

U.S. PATENT DOCUMENTS 6,256,724 B1   7/2001   Hocevar et al.
6,298,366 B1   10/2001  Gatherer et al.
(Continued)

OTHER PUBLICATIONS

Itani, Ahmad; Applicant-Initiated Interview Summary for U.S. Appl. No. 17/391,891, filed Aug. 2, 2021, mailed Aug. 17, 2022, 2 pgs.

(Continued)

*Primary Examiner* — Esaw T Abraham
(74) *Attorney, Agent, or Firm* — Taylor English Duma L.L.P.

(57) ABSTRACT

In various examples, a VPU and associated components may be optimized to improve VPU performance and throughput. For example, the VPU may include a min/max collector, automatic store predication functionality, a SIMD data path organization that allows for inter-lane sharing, a transposed load/store with stride parameter functionality, a load with permute and zero insertion functionality, hardware, logic, and memory layout functionality to allow for two point and two by two point lookups, and per memory bank load caching capabilities. In addition, decoupled accelerators may be used to offload VPU processing tasks to increase throughput and performance, and a hardware sequencer may be included in a DMA system to reduce programming complexity of the VPU and the DMA system. The DMA and VPU may execute a VPU configuration mode that allows the VPU and DMA to operate without a processing controller for performing dynamic region based data movement operations.

20 Claims, 51 Drawing Sheets

(51) Int. Cl.
*G06F 9/38* (2018.01)
*G06F 13/28* (2006.01)
*G06F 15/80* (2006.01)
*G06F 21/64* (2013.01)
*H03M 13/09* (2006.01)
*G06T 1/20* (2006.01)

(52) U.S. Cl.
CPC .............. *G06F 13/28* (2013.01); *G06F 21/64* (2013.01); *H03M 13/09* (2013.01); *G06T 1/20* (2013.01); *H03M 13/091* (2013.01)

(56) References Cited

U.S. PATENT DOCUMENTS

| | | | |
|---|---|---|---|
| 6,526,430 B1 | 2/2003 | Hung et al. | |
| 6,530,010 B1 | 3/2003 | Hung et al. | |
| 6,829,016 B2 | 12/2004 | Hung | |
| 8,880,961 B2* | 11/2014 | Brewerton | G06F 11/10 |
| | | | 714/47.1 |
| 9,047,192 B2* | 6/2015 | Sridharan | G06F 11/167 |
| 9,501,429 B2* | 11/2016 | Zheng | H04N 21/42623 |
| 9,519,617 B2 | 12/2016 | Hung et al. | |
| 10,541,782 B2* | 1/2020 | Carlough | H04L 1/0061 |
| 10,803,009 B2 | 10/2020 | Hung et al. | |
| 10,831,628 B2* | 11/2020 | Santoni | G06F 11/1695 |
| 10,885,698 B2 | 1/2021 | Muthler et al. | |
| 11,088,782 B2* | 8/2021 | Carlough | H04L 1/0045 |
| 11,573,921 B1 | 2/2023 | Itani et al. | |
| 2016/0321074 A1 | 11/2016 | Hung et al. | |
| 2023/0037738 A1 | 2/2023 | Itani et al. | |

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

Itani, Ahmad; Notice of Allowance for U.S. Appl. No. 17/391,891, filed Aug. 2, 2021, mailed Oct. 18, 2022, 15 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

* cited by examiner

| | l1 | l2 | l3 | l4 | l5 | l6 | auto_pred_off |
|---|---|---|---|---|---|---|---|
| Initial state | 0 | 0 | 0 | 0 | 0 | 0 | 0 (1st store allowed) |
| after 1 execution | 1 | 0 | 0 | 0 | 0 | 0 | 0 (2nd store allowed) |
| after 2 executions | 2 | 0 | 0 | 0 | 0 | 0 | 0 (3rd store allowed) |
| after 3 executions | 3 | 0 | 0 | 0 | 0 | 0 | 0 (4th store allowed) |
| after 4 execution | 0 | 1 | 0 | 0 | 0 | 0 | 0 (5th store allowed) |
| after 5 executions | 1 | 1 | 0 | 0 | 0 | 0 | 0 (6th store allowed) |
| after 6 executions | 2 | 1 | 0 | 0 | 0 | 0 | 0 (7th store allowed) |
| after 7 execution | 3 | 1 | 0 | 0 | 0 | 0 | 0 (8th store allowed) |
| after 8 executions | 3 | 1 | 0 | 0 | 0 | 0 | 1 (9th store blocked) |
| after 9 executions | 3 | 1 | 0 | 0 | 0 | 0 | 1 (10th store blocked) |

FIGURE 2B

| BYTE     | 0 | 1 | 2 | 3 | 4 | 5 | 6 | 7 | 8 | 9 | 10 | 11 | 12 | 13 | 14 | 15 | ... |
|----------|---|---|---|---|---|---|---|---|---|---|----|----|----|----|----|----|-----|
| HALFWORD | 0 |   | 1 |   | 2 |   | 3 |   | 4 |   | 5  |    | 6  |    | 7  |    | ... |
| WORD     | 0 |   |   |   | 1 |   |   |   | 2 |   |    |    | 3  |    |    |    | ... |
| SLICE    | 0 |   |   |   |   |   |   |   | 1 |   |    |    |    |    |    |    | ... |

FIGURE 3A

| | | | | |
|---|---|---|---|---|
| src1a | D[0] | D[1] | D[2] | D[3] |
| src1b | D[4] | D[5] | D[6] | D[7] |
| src2 | C[0] | C[1] | C[2] | C[3] |
| src3dst.lo | ACC[0] | | ACC[2] | |
| src3dst.hi | ACC[1] | | ACC[3] | |

FIGURE 3B

| | | | | |
|---|---|---|---|---|
| src1a.lo | D[0][0] | D[0][1] | D[0][2] | D[0][3] |
| src1a.hi | D[1][0] | D[1][1] | D[1][2] | D[1][3] |
| src1b.lo | D[2][0] | D[2][1] | D[2][2] | D[2][3] |
| src1b.hi | D[3][0] | D[3][1] | D[3][2] | D[3][3] |
| src2 | C[0] | C[1] | C[2] | C[3] |
| src3dst.lo | ACC[0] | | ACC[2] | |
| src3dst.hi | ACC[1] | | ACC[3] | |

FIGURE 3C

| | | | | |
|---|---|---|---|---|
| src1 | key1[0] | payload1[0] | key1[1] | payload1[1] |
| src2 | key2[0] | payload2[0] | key2[1] | payload2[1] |
| dst1 | out_key1[0] | out_payload1[0] | out_key1[1] | out_payload1[1] |
| dst2 | out_key2[0] | out_payload2[0] | out_key2[1] | out_payload2[1] |

| LOGICAL VIEW OF TRANSPOSED LOADS | | | | | | | | | | | | | | | | |
|---|---|---|---|---|---|---|---|---|---|---|---|---|---|---|---|---|
| T | | 0 | | | | | | | | | | | | | | |
| LINE PITCH = 17 | | 17 | | | | | | | | | | | | | | |
| | | 34 | | | | | | | | | | | | | | |
| | | 51 | | | | | | | | | | | | | | |
| | | 68 | | | | | | | | | | | | | | |
| | | 85 | | | | | | | | | | | | | | |
| | | 102 | | | | | | | | | | | | | | |
| | | 119 | | | | | | | | | | | | | | |
| | | 136 | | | | | | | | | | | | | | |
| | | 153 | | | | | | | | | | | | | | |
| | | 170 | | | | | | | | | | | | | | |
| | | 187 | | | | | | | | | | | | | | |
| | | 204 | | | | | | | | | | | | | | |
| | | 221 | | | | | | | | | | | | | | |
| | | 238 | | | | | | | | | | | | | | |
| | | 255 | | | | | | | | | | | | | | |
| MEMORY BANK VIEW OF TRANSPOSED LOADS | | | | | | | | | | | | | | | | |
| BANK | | 0 | 1 | 2 | 3 | 4 | 5 | 6 | 7 | 8 | 9 | 10 | 11 | 12 | 13 | 14 | 15 |
| INDEX | | 0 | 1 | 2 | 3 | 4 | 5 | 6 | 7 | 8 | 9 | 10 | 11 | 12 | 13 | 14 | 15 |
| | | 16 | 17 | 18 | 19 | 20 | 21 | 22 | 23 | 24 | 25 | 26 | 27 | 28 | 29 | 30 | 31 |
| | | 32 | 33 | 34 | 35 | 36 | 37 | 38 | 39 | 40 | 41 | 42 | 43 | 44 | 45 | 46 | 47 |
| | | 48 | 49 | 50 | 51 | 52 | 53 | 54 | 55 | 56 | 57 | 58 | 59 | 60 | 61 | 62 | 63 |
| | | 64 | 65 | 66 | 67 | 68 | 69 | 70 | 71 | 72 | 73 | 74 | 75 | 76 | 77 | 78 | 79 |
| | | 80 | 81 | 82 | 83 | 84 | 85 | 86 | 87 | 88 | 89 | 90 | 91 | 92 | 93 | 94 | 95 |
| | | 96 | 97 | 98 | 99 | 100 | 101 | 102 | 103 | 104 | 105 | 106 | 107 | 108 | 109 | 110 | 111 |
| | | 112 | 113 | 114 | 115 | 116 | 117 | 118 | 119 | 120 | 121 | 122 | 123 | 124 | 125 | 126 | 127 |
| | | 128 | 129 | 130 | 131 | 132 | 133 | 134 | 135 | 136 | 137 | 138 | 139 | 140 | 141 | 142 | 143 |
| | | 144 | 145 | 146 | 147 | 148 | 149 | 150 | 151 | 152 | 153 | 154 | 155 | 156 | 157 | 158 | 159 |
| | | 160 | 161 | 162 | 163 | 164 | 165 | 166 | 167 | 168 | 169 | 170 | 171 | 172 | 173 | 174 | 175 |
| | | 176 | 177 | 178 | 179 | 180 | 181 | 182 | 183 | 184 | 185 | 186 | 187 | 188 | 189 | 190 | 191 |
| | | 192 | 193 | 194 | 195 | 196 | 197 | 198 | 199 | 200 | 201 | 202 | 203 | 204 | 205 | 206 | 207 |
| | | 208 | 209 | 210 | 211 | 212 | 213 | 214 | 215 | 216 | 217 | 218 | 219 | 220 | 221 | 222 | 223 |
| | | 224 | 225 | 226 | 227 | 228 | 229 | 230 | 231 | 232 | 233 | 234 | 235 | 236 | 237 | 238 | 239 |
| | | 240 | 241 | 242 | 243 | 244 | 245 | 246 | 247 | 248 | 249 | 250 | 251 | 252 | 253 | 254 | 255 |
| | | 256 | 257 | 258 | 259 | 260 | 261 | 262 | 263 | 264 | 265 | 266 | 267 | 268 | 269 | 270 | 271 |
| | | 272 | 273 | 274 | 275 | 276 | 277 | 278 | 279 | 280 | 281 | 282 | 283 | 284 | 285 | 286 | 287 |

| Logical view of transposed loads | | | | | | | | | | | | | | | | |
|---|---|---|---|---|---|---|---|---|---|---|---|---|---|---|---|---|
| T | | 0 | T2 | | 2 | 3 | | | | | | | | | | |
| Line pitch = 17 | | 17 | Line pitch = 18 | | 20 | 21 | | | | | | | | | | |
| | | 34 | | | 38 | 39 | | | | | | | | | | |
| | | 51 | | | 56 | 57 | | | | | | | | | | |
| | | 68 | | | 74 | 75 | | | | | | | | | | |
| | | 85 | | | 92 | 93 | | | | | | | | | | |
| | | 102 | | | 110 | 111 | | | | | | | | | | |
| | | 119 | | | 128 | 129 | | | | | | | | | | |
| | | 136 | | | | | | | | | | | | | | |
| | | 153 | T4 | | 140 | 141 | 142 | 143 | | | | | | | | |
| | | 170 | Line pitch = 20 | | 160 | 161 | 162 | 163 | | | | | | | | |
| | | 187 | | | 180 | 181 | 182 | 183 | | | | | | | | |
| | | 204 | | | 200 | 201 | 202 | 203 | | | | | | | | |
| | | 221 | | | | | | | | | | | | | | |
| | | 238 | T8 | | 240 | 241 | 242 | 243 | 244 | 245 | 246 | 247 | | | | |
| | | 255 | Line pitch = 24 | | 264 | 265 | 266 | 267 | 268 | 269 | 270 | 271 | | | | |

| Memory bank view of transposed loads | | | | | | | | | | | | | | | | |
|---|---|---|---|---|---|---|---|---|---|---|---|---|---|---|---|---|
| Bank | | 0 | 1 | 2 | 3 | 4 | 5 | 6 | 7 | 8 | 9 | 10 | 11 | 12 | 13 | 14 | 15 |
| Index | | 0 | 1 | 2 | 3 | 4 | 5 | 6 | 7 | 8 | 9 | 10 | 11 | 12 | 13 | 14 | 15 |
| | | 16 | 17 | 18 | 19 | 20 | 21 | 22 | 23 | 24 | 25 | 26 | 27 | 28 | 29 | 30 | 31 |
| | | 32 | 33 | 34 | 35 | 36 | 37 | 38 | 39 | 40 | 41 | 42 | 43 | 44 | 45 | 46 | 47 |
| | | 48 | 49 | 50 | 51 | 52 | 53 | 54 | 55 | 56 | 57 | 58 | 59 | 60 | 61 | 62 | 63 |
| | | 64 | 65 | 66 | 67 | 68 | 69 | 70 | 71 | 72 | 73 | 74 | 75 | 76 | 77 | 78 | 79 |
| | | 80 | 81 | 82 | 83 | 84 | 85 | 86 | 87 | 88 | 89 | 90 | 91 | 92 | 93 | 94 | 95 |
| | | 96 | 97 | 98 | 99 | 100 | 101 | 102 | 103 | 104 | 105 | 106 | 107 | 108 | 109 | 110 | 111 |
| | | 112 | 113 | 114 | 115 | 116 | 117 | 118 | 119 | 120 | 121 | 122 | 123 | 124 | 125 | 126 | 127 |
| | | 128 | 129 | 130 | 131 | 132 | 133 | 134 | 135 | 136 | 137 | 138 | 139 | 140 | 141 | 142 | 143 |
| | | 144 | 145 | 146 | 147 | 148 | 149 | 150 | 151 | 152 | 153 | 154 | 155 | 156 | 157 | 158 | 159 |
| | | 160 | 161 | 162 | 163 | 164 | 165 | 166 | 167 | 168 | 169 | 170 | 171 | 172 | 173 | 174 | 175 |
| | | 176 | 177 | 178 | 179 | 180 | 181 | 182 | 183 | 184 | 185 | 186 | 187 | 188 | 189 | 190 | 191 |
| | | 192 | 193 | 194 | 195 | 196 | 197 | 198 | 199 | 200 | 201 | 202 | 203 | 204 | 205 | 206 | 207 |
| | | 208 | 209 | 210 | 211 | 212 | 213 | 214 | 215 | 216 | 217 | 218 | 219 | 220 | 221 | 222 | 223 |
| | | 224 | 225 | 226 | 227 | 228 | 229 | 230 | 231 | 232 | 233 | 234 | 235 | 236 | 237 | 238 | 239 |
| | | 240 | 241 | 242 | 243 | 244 | 245 | 246 | 247 | 248 | 249 | 250 | 251 | 252 | 253 | 254 | 255 |
| | | 256 | 257 | 258 | 259 | 260 | 261 | 262 | 263 | 264 | 265 | 266 | 267 | 268 | 269 | 270 | 271 |
| | | 272 | 273 | 274 | 275 | 276 | 277 | 278 | 279 | 280 | 281 | 282 | 283 | 284 | 285 | 286 | 287 |

```
┌─────────────────────────────────────────────┐
│ RECEIVE DATA REPRESENTATIVE OF A LINE PITCH AND A │
│ STARTING MEMORY ADDRESS IN A MEMORY BANK OF A │
│ PLURALITY OF MEMORY BANKS, THE STARTING MEMORY │
│ ADDRESS CORRESPONDING TO AN ELEMENT OF A │
│ PLURALITY OF ELEMENTS CORRESPONDING TO A COLUMN │
│ OF AN ARRAY │
│ B408 │
└─────────────────────────────────────────────┘
                         │
                         ▼
┌─────────────────────────────────────────────┐
│ READ, IN A SINGLE READ OPERATION, THE PLURALITY OF │
│ ELEMENTS FROM THE PLURALITY OF MEMORY BANKS, EACH │
│ ELEMENT OF THE PLURALITY OF ELEMENTS BEING READ │
│ FROM A RESPECTIVE MEMORY BANK OF THE PLURALITY OF │
│ MEMORY BANKS BASED AT LEAST IN PART ON THE LINE │
│ PITCH │
│ B410 │
└─────────────────────────────────────────────┘
```

FIGURE 4D

ACROSS THE WHOLE
VECTOR WIDTH, DATA AND
COEFFICIENT SHOULD BE:

| D[0] | D[1] | D[2] | D[3] | D[4] | D[5] | D[6] | D[7] | ... | D[15] |
| D[4] | D[5] | D[6] | D[7] | D[8] | D[9] | D[10] | D[11] | ... | D[19] |
| C[0] | C[1] | C[2] | C[3] | C[0] | C[1] | C[2] | C[3] | ... | C[3] |

FIGURE 5A

ACROSS THE WHOLE
VECTOR WIDTH, DATA AND
COEFFICIENT SHOULD BE:

| D[0] | D[1] | D[2] | D[3] | D[4] | D[5] | D[6] | D[7] | ... | D[15] |
| D[4] | D[5] | D[6] | D[7] | D[8] | D[9] | D[10] | D[11] | ... | D[19] |
| C[0] | C[1] | C[2] | C[3] | C[0] | C[1] | C[2] | C[3] | ... | C[3] |
| C[4] | C[5] | C[6] | C[7] | C[4] | C[5] | C[6] | C[7] | ... | C[7] |

| | | |
|---|---|---|
| src1a | x | y |
| src1b | z | w |
| src2 | alpha0 | alpha1 |
| dst | Y0 | Y1 |

600

```
┌─────────────────────────────────────────────────┐
│ REPLICATE A TABLE TO MEMORY TO INCLUDE A FIRST  │
│ VALUE AT A FIRST PHYSICAL ADDRESS IN A FIRST    │
│ MEMORY BANK AND A SECOND VALUE AT A SECOND      │
│ PHYSICAL ADDRESS IN A SECOND MEMORY BANK, THE   │
│ FIRST VALUE AND THE SECOND VALUE INCLUDED IN A  │
│ SAME COLUMN IN LOGICAL MEMORY VIEW OF THE TABLE │
│                      B602                       │
└─────────────────────────────────────────────────┘
                         │
                         ▼
┌─────────────────────────────────────────────────┐
│ DETERMINE A FIRST INDEX CORRESPONDING TO THE    │
│        FIRST PHYSICAL ADDRESS IN MEMORY         │
│                      B604                       │
└─────────────────────────────────────────────────┘
                         │
                         ▼
┌─────────────────────────────────────────────────┐
│ BASED AT LEAST IN PART ON A READ INSTRUCTION    │
│ CORRESPONDING TO A MULTI-POINT LOOKUP, READ THE │
│ FIRST VALUE LOCATED AT THE FIRST PHYSICAL       │
│ ADDRESS AND THE SECOND VALUE LOCATED AT THE     │
│               SECOND PHYSICAL ADDRESS           │
│                      B606                       │
└─────────────────────────────────────────────────┘
                         │
                         ▼
┌─────────────────────────────────────────────────┐
│ PERFORM ONE OR MORE OPERATIONS USING THE FIRST  │
│            VALUE AND THE SECOND VALUE           │
│                      B608                       │
└─────────────────────────────────────────────────┘
```

FIGURE 6G

| VFilt4HHW V0 slot data: | VFilt4HHW V1 slot data: | Shared coefficients: |
| --- | --- | --- |
| data[0][0..15] data[0][4..19] | data[0][16..31]data[0][20..35] | coef[0][0..3] |
| data[0][4..19] data[0][8..23] | data[0][20..35]data[0][24..39] | coef[0][4..7] |
| data[1][0..15] data[1][4..19] | data[1][16..31]data[1][20..35] | coef[1][0..3] |
| data[1][4..19] data[1][8..23] | data[1][20..35]data[1][24..39] | coef[1][4..7] |
| ... | ... | ... |
| data[6][0..15] data[6][4..19] | data[6][16..31]data[6][20..35] | coef[6][0..3] |
| data[6][4..19] data[6][8..23] | data[6][20..35]data[6][24..39] | coef[6][4..7] |

FIGURE 7A

DATA

| HALFWORD ARRAY ELEMENTS READ | | | |
|---|---|---|---|
| 0 | 1 | ... | 31 | READ 32 BANKS (DOUBLE VECTOR) |
| 4 | 5 | ... | 35 | READ 4 BANKS |
| 8 | 9 | ... | 39 | READ 4 BANKS |
| 100 | 101 | ... | 131 | READ 32 BANKS (LINE PITCH = 100) |
| 104 | 105 | ... | 135 | READ 4 BANKS |
| 108 | 109 | ... | 139 | READ 4 BANKS |
| ... | | | |

FIGURE 7B

COEF

| HALFWORD ARRAY ELEMENTS READ | | | |
|---|---|---|---|
| 0 | 1 | ... | 15 | READ 16 BANKS (SINGLE VECTOR) |
| 4 | 5 | ... | 19 | READ 4 BANKS |
| 8 | 9 | ... | 23 | READ 4 BANKS |
| ... | | | |
| 52 | 53 | ... | 67 | READ 4 BANKS |
| 0 | 1 | ... | 15 | READ 0 BANK |
| 4 | 5 | ... | 19 | READ 0 BANK |
| ... | | | |

FIGURE 7C

| 0..3 | 4..7 | 8..11 | 12..15 | 16..19 | 20..23 | 24..27 | 28..31 |
|---|---|---|---|---|---|---|---|
| 32..35 | 36..39 | 40..43 | 44..47 | 48..51 | 52..55 | 56..59 | 60..63 |
| 64..67 | | | | | | | |

| First Coef Read | Last Coef Read |
|---|---|

| | 1D/2D w/o INTERPOLATION | 1D/2D WITH INTERPOLATION | TABLE REFORMATTING |
|---|---|---|---|
| IDX STREAM 916 | INDEX FROM VMEM | INDEX/PATCH FROM VMEM | INDEX FROM VMEM |
| IAU 922 | INDEX/ADDRESS CALC | INDEX/ADDRESS CALC | NOT USED |
| CDRU 924 | CONFLICT DETECT | CONFLICT DETECT | NOT USED |
| LUT STREAM 918 | LUT TO VMEM | LUT TO VMEM | NOT USED |
| FRAC FIFO 926 CTL FIFO 928 | CTL: CDRU TO DCU FRAC: NOT USED | CTL: CDRU TO DCU FRAC: IAU TO PPU | NOT USED |
| DCU 932 | COALESCE | COALESCE | NOT USED |
| PPU 930 | NO INTERPOLATION RESULT GATHER | INTERPOLATION RESULT GATHER | NOT USED |
| OUT STREAM 920 | OUTPUT TO VMEM | OUTPUT TO VMEM | OUTPUT TO VMEM |

| FIELD | FIELD DESCRIPTION |
|---|---|
| FRAME HEADER1<br>HEADER CONTROL | FRAME REPETITION FACTOR<br>NUMBER OF DESCRIPTOR ROWS/COLUMNS |
| FRAME HEADER2<br>OFFSET CONTROL | FRAME TILE OFFSET<br>FRAME OFFSET |
| FRAME HEADER3 | FRAME PADDING CONTROL |
| COLUMN/ROW 1<br>HEADER | COLUMN/ROW OFFSET<br>COLUMN/ROW REPETITION FACTOR<br>NUMBER OF DESCRIPTORS |
| DESCRIPTOR 1 | DESCRIPTOR ID<br>DESCRIPTOR REPETITION FACTOR |
| ............. | |
| DESCRIPTOR N | DESCRIPTOR ID<br>DESCRIPTOR REPETITION FACTOR |
| ............. | |
| COLUMN/ROW M<br>HEADER | COLUMN/ROW OFFSET<br>COLUMN/ROW REPETITION FACTOR<br>NUMBER OF DESCRIPTORS |
| DESCRIPTOR 1 | DESCRIPTOR ID<br>DESCRIPTOR REPETITION FACTOR |
| ............. | |
| DESCRIPTOR N | DESCRIPTOR ID<br>DESCRIPTOR REPETITION FACTOR |

FIGURE 10I

| HW DESCRIPTOR FOR 16x8 RASTER PROCESSING | SEQUENCE COMMAND BYTE VALUE | DESCRIPTOR ID | ROW # | BYTE # |
|---|---|---|---|---|
| HWSEQ START ID (RASTER MODE) | 0xCODE | | | 1:0 |
| FAME REPETITION FACTOR: FR | 0 | | | 2 |
| NUMBER OF ROWS: NCR | 0 | | | 3 |
| TILE OFFSET: TO | 0 (SAME FRAME) | | | 5:4 |
| FRAME ADDRESS OFFSET: FO | | | | 7:6 |
| FRAME PAD CONTROL PL, PR, PT, PB | 3,3,3,3 | | 1H | 11:8 |
| ENTRIES PER ROW1: DEC | 0 | | 1H | 12 |
| ROW1 REPETITION FACTOR: CRR | 7 | | 1H | 13 |
| OFFSET PER ROW 1: CRO | TY | | 1H | 15:14 |
| FIRST DESCRIPTOR ID IN ROW1 | 1 | D1 | 1 | 16 |
| FIRST DESCRIPTOR REPETITION FACTOR IN ROW1 | 15 | | 1 | 17 |

| | CH1/Trig1 | CH1/Trig1 | CH1/Trig1 | ...... | CH1/Trig1 | CH1/Trig1 |
|---|---|---|---|---|---|---|
| | C1 | C2 | C3 | | C15 | C16 |
| R1 | D1 | D1 | D1 | ...... | D1 | D1 |
| R2 | D1 | D1 | D1 | | D1 | D1 |
| R3 | D1 | D1 | D1 | | D1 | D1 |
| ..... | | | | | | |
| R7 | D1 | D1 | D1 | | D1 | D1 |
| R8 | D1 | D1 | D1 | | D1 | D1 |

| Field Description | Field Position | | | |
|---|---|---|---|---|
| | Bits[63:32] | Bits[31:24] | Bits[23:16] | Bits[15:0] |

| List Header | 0xDEAD_CODE (TO CHECK FOR HEADER) | RSVD 0x00 | ADDR[39:32] SET TO 0x00 FOR MMIO | NUMBER OF ADDR/DATA IN THE LIST |
|---|---|---|---|---|
| ADDR/DATA #1 | ADDR0[31:0] | | | DATA0[31:0] |
| ADDR/DATA #2 | ADDR1[31:0] | | | DATA1[31:0] |
| ..... | | | | |
| ADDR/DATA #N | ADDRn-1[31:0] | | | DATAn-1[31:0] |

```
┌─────────────────────────────────────────────┐
│ COMPUTE, USING A PROCESSOR AND BASED AT LEAST IN │
│ PART ON FIRST DATA WRITTEN TO MEMORY USING A DMA │
│ SYSTEM, A FIRST OUTPUT CORRESPONDING TO ONE OR   │
│ MORE FIRST UPDATED LOCATIONS OF A TRACKED FEATURE│
│                   B1102                          │
└─────────────────────────────────────────────┘
                      │
                      ▼
┌─────────────────────────────────────────────┐
│ UPDATE, USING THE PROCESSOR, MEMORY TO INCLUDE   │
│ SECOND DATA REPRESENTATIVE OF ONE OR MORE        │
│ ADDRESS/DATA PAIRS CORRESPONDING TO THE ONE OR   │
│ MORE FIRST UPDATED LOCATIONS                     │
│                   B1104                          │
└─────────────────────────────────────────────┘
                      │
                      ▼
┌─────────────────────────────────────────────┐
│ UPDATE, USING THE DMA SYSTEM AND BASED AT LEAST IN│
│ PART ON THE ONE OR MORE ADDRESS/DATA PAIRS, ONE  │
│ OR MORE DESCRIPTORS CORRESPONDING TO THE         │
│ TRACKED FEATURE                                  │
│                   B1106                          │
└─────────────────────────────────────────────┘
                      │
                      ▼
┌─────────────────────────────────────────────┐
│ WRITE, USING THE DMA SYSTEM AND BASED AT LEAST IN│
│ PART ON THE ONE OR MORE DESCRIPTORS, THIRD DATA TO│
│ THE MEMORY                                       │
│                   B1108                          │
└─────────────────────────────────────────────┘
                      │
                      ▼
┌─────────────────────────────────────────────┐
│ COMPUTE, USING THE PROCESSOR AND BASED AT LEAST  │
│ IN PART ON THE THIRD DATA, A SECOND OUTPUT       │
│ CORRESPONDING TO ONE OR MORE SECOND UPDATED      │
│ LOCATIONS OF THE TRACKED FEATURE                 │
│                   B1110                          │
└─────────────────────────────────────────────┘
```

FIGURE 11C

BUILT-IN SELF-TEST FOR A PROGRAMMABLE VISION ACCELERATOR OF A SYSTEM ON A CHIP

CROSS-REFERENCE TO RELATED APPLICATIONS

This application is a continuation of U.S. patent application Ser. No. 17/391,891, filed Aug. 2, 2021, now U.S. Pat. No. 11,573,921, issued Feb. 7, 2023, which is incorporated herein by reference in its entirety.

BACKGROUND

Vector processing units (VPUs) are used to perform single instruction multiple data (SIMD) operations in parallel. Popular uses of VPUs include operations such as image processing, computer vision, signal processing, deep learning (e.g., for convolution operations), and/or the like.

In some computer vision applications, for example, dynamic ranges of intermediate values are well understood. As such, to detect anomalies, computed values may be compared against these dynamic ranges. However, conventional solutions for detecting and analyzing these minimum and maximum values include writing all values to memory, and thereafter performing an analysis of the values in memory, which requires additional processing cycles. Additionally, to achieve high throughput in spite of load-to-use latency, high clock rate processors may perform software pipelining and/or loop unrolling. However, where an original iteration count does not divide evenly by the unrolling factor, there may be some number of iterations that remain after completing the unrolled loop, thereby requiring an additional remainder loop to compute the values of the final iteration(s). This remainder loop increases the code size and latency of the system—e.g., because the remainder loop cannot be unrolled to achieve optimal performance. In conventional single instruction multiple data (SIMD) operations, each SIMD unit may operate in parallel and independently of one another in its own data lane. Some architectures may allow for sharing between adjacent neighbors, but this limited sharing is restrictive and makes implementation of operations often require copying a same operand to each data lane for processing. In addition, vector SIMD processors may require that every memory read operation uses a standard or consistent unit, e.g., equal to a vector processing width, which may be inefficient where the memory bank is wide. For example, when reading from elements 4 to 67 with a memory width of 64 bytes, two memory reads may be required—e.g., one from 0 to 63 and one from 64 to 67. However, this results in reading many additional values—e.g., values 0-3 and values 68-127 even where those values are not needed for the current operation. In traditional instruction sets, where additional data manipulation is required, the additional instructions may be used to operate on memory data in registers after the data is read out and stored in the registers. For example, this may require loading the data, performing permutations on the data, and then using the reorganized data to perform operations. As such, the data manipulation requires additional cycles and increases latency. When performing table lookups using existing VPUs, the tables may be replicated such that each single value may be pulled from a replicated table, or additional read ports may be added to each memory bank to allow for multiple values to be read from a same table in a same bank. However, replicating a table for each value requires additional memory and processing, and adding additional read ports requires additional space on the chip. In traditional VPUs, because the VPU is programmed to execute on a smaller set of highly optimized code, data caches may not be implemented because programmers may manage the contents in local data memory. However, by doing so, each access requires reading values from each memory bank, even where the data for a next iteration includes overlap with one or more prior read operations.

To optimize performance of processors—such as VPUs— the instruction set architecture (ISA) may be enhanced to create custom instructions to accelerate commonly occurring operations—such as table lookups, convolutional operations, and/or the like. However, using the ISA in this manner requires that the processor itself also execute these operations, meaning the processor is busy during execution of these enhanced instructions.

In addition, a VPU may use a direct memory access (DMA) system to retrieve data for processing by the VPU. As such, the DMA system may operate as a data movement engine, but also may perform additional operations such as image padding, address manipulation, overlapping data management, traversal order management, frame size management, and/or the like. However, the programming complexity to program the DMA system and the VPU is increased as DMA resources—e.g., descriptors, channels, triggers, etc.—are increased. Where tiles of a frame include spatial or temporal dependencies, the dynamic updating of DMA resources becomes a processing burden on the system. When fetching unknown or data dependent data, conventional DMA systems required a processing controller (e.g., an R5 or ARM processing core) to intervene in the processing cycle to determine updated information for directing a next processing iteration. For example, in object or feature tracking, the VPU may compute a next location of an object or feature, and the processing controller would then intervene, update the memory addressing information, and then trigger the DMA system to use the updated information. However, the intervention of the processing controller increases latency and requires more complex programming for operations with region dependent data movement algorithms.

Moreover, in safety critical applications, such as autonomous and semi-autonomous machine applications, there are strict requirements for permanent fault detection and isolation. For example, when executing deep learning, computer vision, sensor processing, and/or other applications in a machine, permanent fault detection must be executed periodically and within an allotted time budget in order to allow for accurate testing, but also to allow the application to perform properly—e.g., with low latency. To do this, coverage from end-to-end may be required, with low latency, while meeting a running time budget of each particular application. Conventional approaches use built-in self-test (BIST) to identify faults, but these BIST techniques either do not include adequate coverage, introduce too much latency into the system, and/or do not meet running time budgets for certain applications.

SUMMARY

Embodiments of the present disclosure relate to improvements to vector processing units (VPUs), to decoupled accelerators that may be used to handle offloaded processing from the VPU, and to a direct memory access (DMA) system that supports data movement between memory and the VPU. To account for various drawbacks of conventional or existing solutions, the VPU of the present disclosure may include a min/max hardware collector that is included in a data path from the VPU to memory such that min/max values may be stored prior to storage in the memory. In this way, the min/max values may be available immediately upon the memory write operation being completed, thereby reducing the latency of determining min/max after the values have been stored to memory. In addition, the VPU may include an automatic predication function that may apply a predication flag by setting a predication bit for each value computed at iterations beyond a final iteration. As a result, each set of iterations may include a same number of executed iterations, but one or more of the values from the final set of iterations may not be written out to memory due to the predication flag. To account for the restrictions in sharing among data lanes of existing solutions, the SIMD architecture of the present disclosure may define slices in a processor that each include a plurality of lanes, and each of the lanes may be configured to communicate among one another. As such, operands from one lane may be used by other lanes, thus removing the requirement that each of the operands be copied to each lane for processing. To account for the inefficiencies of loading from a single wide memory bank, the VPU may include a plurality of smaller memory banks to allow for smaller bit alignments—e.g., 16 bit alignments where memory banks are each 16 bits. In this way, the example of reading values 4 to 67 may take place in a single memory read, rather than two memory reads of 0-63 and 64-127. In addition to this memory bank organization, the VPU may include transposed load and/or store functionality to allow for stored values to be offset in memory banks such that bank conflicts do not occur and more data may be read or written per cycle. To account for the data manipulation drawbacks of conventional instruction sets, a load with permute instruction may be used to send a permute pattern along with a memory address to local memory in order to retrieve the data from memory according to the permute or data manipulation pattern. As such, the data manipulation and data loading may be executed in a same cycle, thereby reducing latency. In order to address the drawbacks of table replication per value or additional read ports for table lookups, a two point or two by two point lookup may be executed such that two or four points may be looked up per table per cycle, respectively. To accomplish this, an offset storage pattern for the table and per-memory bank address buses and associated logic and routing may be used to allow for parallel lookups of two points or four points. In embodiments, each memory bank may include an associated data cache that may be enabled or disabled depending on a given operation. For example, for filtering operations where a lot of data overlap exists between iterations, the data caches may be used to store values from one or more prior lookups such that only a minimal reads are required from each bank, thus conserving energy and power for the system.

To address the drawbacks of conventional ISAs for VPUs or other processor types, the systems and methods of the present disclosure may use decoupled accelerators that may be configured by and communicate with the VPU via shared memory, but may execute specific tasks independently of the VPU to allow the VPU to continue other processing tasks in parallel with the accelerator(s). For example, a decoupled lookup table (DLUT) accelerator may be used to increase the performance of the system when performing table lookups. In this way, instead of the VPU performing memory bank conflict detection and resolution in line, the DLUT accelerator may identify conflicts, work around conflicts, and increase throughput of the system.

To account for the drawbacks of traditional DMA systems, the systems and methods of the present disclosure may include a hardware sequencer that operates on frame data including a sequence of commands for the hardware sequencer. For example, the hardware sequencer may operate at a frame level rather than a tile level, and may perform sequencing for a DMA engine to remove the programming complexity for programming the DMA engine to perform the same operations—such as padding, address manipulation, etc. In some embodiments, the DMA system may include a DMA trigger mode, where the DMA engine controls the movement of tiles to vector memory (VMEM), rather than requiring the VPU to trigger the DMA to load a next tile. As such, the command sequence is reversed, and the DMA becomes the trigger for the VPU. To account for the drawbacks of region dependent data movement operations in a DMA system, the DMA system may use the DMA and the VPU to operate in a tightly coupled loop without requiring processing controller intervention. For example, the VPU may update location information in VMEM for the various features and/or objects being tracked, and the DMA may use this updated information to update descriptors in descriptor memory such that the next data provided to the VPU for processing corresponds to the next location for the feature or object. This process may repeat until the processing is complete, thereby removing the requirement of processing controller intervention, and decreasing latency of the system.

In addition, to account for the deficiencies of conventional approaches to BIST, the present systems and methods may execute a multiple input signature register (MISR) BIST—e.g., to perform fault detection of a programmable vision accelerator (PVA) of a system on a chip (SoC). For example, in various embodiments of the present disclosure, a PVA may include one or more DMA systems and one or more VPUs that are controlled using one or more processing controllers (or control processors), such as an R5 processor, and ARM processor, a CPU, and/or the like. As such, each component of the PVA may require testing, and the present systems and methods execute the MISR BIST to detect permanent faults in an end-to-end fashion. In this way, the permanent fault detection may be executed to cover end-to-end blocks for both control and data logic, with direct error reporting to a safety processor to reduce latency, and with customization for particular applications to satisfy associated running time budgets.

BRIEF DESCRIPTION OF THE DRAWINGS

The present systems and methods for improvements to vector processing units (VPUs) are described in detail below with reference to the attached drawing figures, wherein:

FIG. 2B is a table illustrating a sequence of state changes over time, in accordance with some embodiments of the present disclosure;

FIG. 3A is an illustration of an example single instruction multiple data (SIMD) data path organization, in accordance with some embodiments of the present disclosure;

FIGS. 3B-3D illustrate operand sharing among slices of a SIMD architecture for a filtering operation, a dot product operation, and a sort with payload operation, respectively, in accordance with some embodiments of the present disclosure;

FIG. 4A is a logical view of transposed loads for reading from and writing to memory and a memory bank view of the transposed loads corresponding to the logical view, in accordance with some embodiments of the present disclosure;

FIG. 4B is a logical view of transposed loads with various line pitches and stride parameters for reading from and writing to memory and a memory bank view of the transposed loads corresponding to the logical view, in accordance with some embodiments of the present disclosure;

FIG. 4D is a flow diagram showing a method of performing write operations of transposed loads with a stride parameter, in accordance with some embodiments of the present disclosure;

FIGS. 5A-5B illustrates tables of data and coefficient layouts in a SIMD architecture for different functions, in accordance with some embodiments of the present disclosure;

FIG. 6A illustrates 16-way parallel table organization for a one point lookup, in accordance with some embodiments of the present disclosure;

FIG. 6B illustrates an 8-way parallel table organization for two point lookup, in accordance with some embodiments of the present disclosure;

FIG. 6C illustrates a logical view of 2-way parallel word type tables for 2×2 point lookup, in accordance with some embodiments of the present disclosure;

FIG. 6D illustrates a memory view of the 2-way parallel word type tables for the 2×2 point lookup of FIG. 6C, in accordance with some embodiments of the present disclosure;

FIG. 6G is a flow diagram for a method of performing multiple point lookups, in accordance with some embodiments of the present disclosure;

FIG. 7A illustrates elements of data and coefficient arrays, in accordance with some embodiments of the present disclosure;

FIGS. 7B-7C illustrate read operations required for data operands and coefficient operands, respectively, using data caches for memory banks, in accordance with some embodiments of the present disclosure;

FIG. 7D illustrates a memory bank organization for use with load caches, in accordance with some embodiments of the present disclosure;

FIG. 9B is a table illustrating actions of different components of a decoupled lookup table accelerator when performing various operations, in accordance with some embodiments of the present disclosure;

FIG. 10I is a frame format for storing sequencing commands for a hardware sequencer control of the DMA system of FIG. 10H, in accordance with some embodiments of the present disclosure;

FIG. 10J is an example of the frame format of FIG. 10I for a raster scan sequence, in accordance with some embodiments of the present disclosure;

FIG. 10K is an example tile structure with hardware sequencing in the raster scan sequence with frame address processing using the example frame format of FIG. 10J, in accordance with some embodiments of the present disclosure;

FIG. 11B is a table illustrating a VPU configuration format written by a VPU in vector memory (VMEM) and read by a DMA system, in accordance with some embodiments of the present disclosure;

FIG. 11C is a flow diagram for a method of configuring a DMA system using a VPU, in accordance with some embodiments of the present disclosure;

DETAILED DESCRIPTION

Figure 1A:
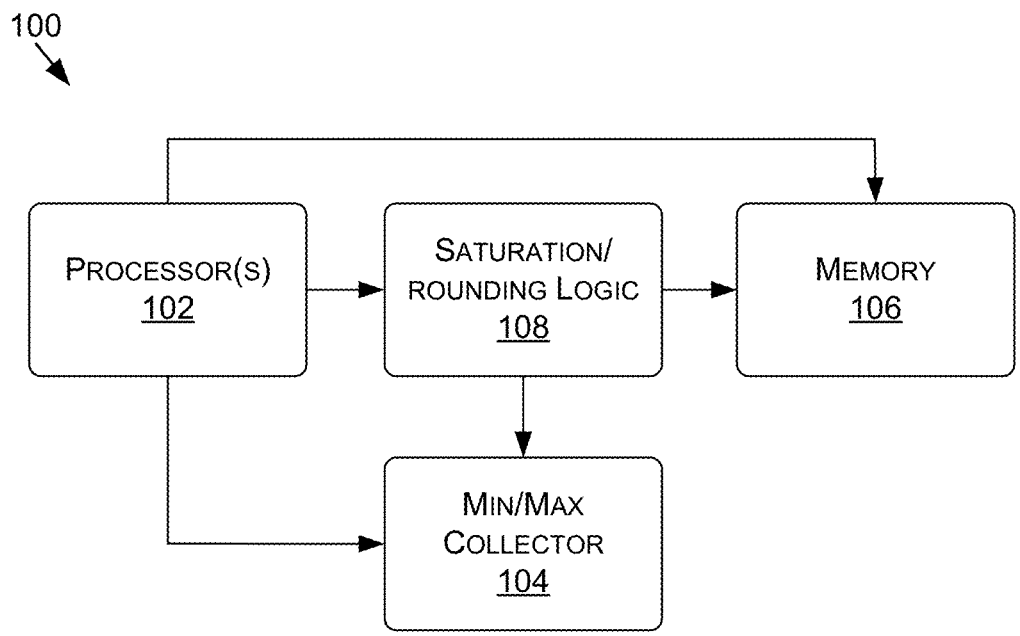
FIG. 1A is an example minimum/maximum collection system, in accordance with some embodiments of the present disclosure.

Systems and methods are disclosed related to various components of a system on a chip (SoC)—such as a vector processing unit(s) (VPU), a direct memory access(s) (DMA) controller, and a hardware accelerator(s) (e.g., a programmable vision accelerator (PVA), such as a PVA including one or more pairs of VPUs and DMAs). For example, in various embodiments of the present disclosure, a PVA may include one or more DMA systems and one or more VPUs that are controlled using one or more processing controllers (or control processors), such as an R5 processor, and ARM processor, a CPU, and/or the like. Although the present disclosure—including the various components of an SoC—may be described with respect to an example autonomous vehicle 1300 (alternatively referred to herein as "vehicle 1300" or "ego-vehicle 1300," an example of which is described with respect to FIGS. 13A-13D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to computer vision, machine learning, artificial intelligence, image processing, and/or the like, this is not intended to be limiting, and the systems and methods described herein may be used in augmented reality, virtual reality, mixed reality, robotics, security and surveillance, autonomous or semi-autonomous machine applications, and/or any other technology spaces where a vector processing unit (VPU), a direct memory access (DMA) system, an instruction set architecture (ISA), a programmable vision accelerator (PVA), a decoupled accelerator, a decoupled lookup table, a hardware sequencer, a single input multiple data (SIMD) architecture, and/or a one or more other components of a SoC may be used. Further, although the components and associated processes described herein may be described with respect a SoC, this is not intended to be limiting, and these components may be implemented as standalone components, as discrete components of a system, and/or as integrated components on a SoC. In some embodiments, systems, components, features, functionality, and/or methods of the present disclosure may be integrated into example autonomous vehicle 1300 of FIGS. 13A-13D, example computing device 1400 of FIG. 14, and/or example data center 1500 of FIG. 15.

Min/Max Hardware Collector for Anomaly Detection

In computer vision applications, for example, and especially in safety critical vision applications, computing dynamic ranges of intermediate results are is an important task. For example, to detect noise or errors in intermediate computations, known or expected dynamic ranges of values may be used to identify values that fall outside of these ranges. In such an example, where a value falls outside of a known or expected dynamic range, these values may be flagged as corresponding to noise, an error, and/or another issue. As such, it may be desirable to collect minimum (min) and maximum (max) values on intermediate results to detect data anomalies. In practice, these anomalies may be caused by, without limitation, noise in image sensors, algorithm corner cases, or data corruption in memory or interconnects. To account for these issues, collecting of min/max values is an effective method to detect anomalous values in this data. Min/max is also used in certain algorithms.

For a particular example, in autonomous vehicle applications, runtime exceptions—such as infinity or not a number—may be invalid values or produce errors, cause faults, or otherwise undesirable results. To account for this, algorithms executed as part of the autonomous vehicle platform may be evaluated to determine the range of values—intermediate or otherwise—that may result during processing. Once the range of values is known, the actual computed values may be compared against the known range, and values outside of a min or max threshold may be flagged as an error. Where an error is flagged, a change in the processing may be executed—such as to ignore the data for a given iteration, identify and remedy the issue, etc. In this way, runtime exceptions are not allowed because potential runtime exceptions are accounted for and not relied upon by the autonomous vehicle.

As another example, min/max collection may be used in certain algorithms to normalize intermediate results to a certain numerical range to achieve higher accuracy in processing—e.g., block floating point. This normalization process may include a dynamic range collection step to collect min and/or max values of an array, and an adjustment step that applies a scaling factor to the array. However, to collect the min/max values, traditional processes require that all values be written out to memory, then the values be analyzed for min/max and adjusted for scaling.

As such, these traditional approaches to min/max evaluation are executed in software, and require additional processing cycles. For example, the algorithm itself may run to compute values, and then software may be run to determine the min/max values and to compare the min/max to a known range of values to identify anomalies. This software requires executing additional instructions to read elements in the intermediate results array and then to perform min/max operations. As a result, the runtime of the system for detecting anomalies is increased, as the algorithm is executed to completion, and then additional processes are executed to compute the min/max of the outputs of the algorithm. This may result in downstream processing being delayed until the min/max values are computed and compared to threshold values, or may result in downstream tasks beginning to perform computations on data including errors while the min/max evaluation takes place. This not only results in increased runtime, but also increases the processing requirements and energy consumption of the system as these additional cycles are executed to identify anomalous data.

With reference to FIG. 1A, FIG. 1A is an example processor architecture 100 for min/max collection, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the architecture 100 may include similar components, features, and/or functionality to that of example autonomous vehicle 1300 of FIGS. 13A-13D, example computing device 1400 of FIG. 14, and/or example data center 1500 of FIG. 15.

To account for the deficiencies of traditional min/max evaluation processes, such as those described herein, the present disclosure includes systems and methods for min/max collection using hardware. For example, during computation, the values of the computation may be written out to memory 106—e.g., local memory—and used for downstream computations within a same algorithm or another algorithm. To reduce runtime and processing, min/max collection hardware (e.g., min/max collector 104) may be employed to capture min/max values before or as they are written out to memory 106—e.g., rather than waiting for values to read out of memory 106 and then analyzing the values for min/max. For example, an enable bit may be used to enable the min/max collection functionality of the min/max collector 104 and, once enabled, the min/max collector 104 may update min/max values as the values are computed using processor(s) 102 and written out to memory 106 (e.g., prior to storage or concurrently with storage to memory 106). In embodiments, the enable bit may indicate the type of array being computed—e.g., signed or unsigned—such that the min/max collector 104 is configured to collect min/max for the particular type of array. For example, an enable bit(s) or another type of control feature may be used to disable the min/max collector 104 and/or to configure the min/max collector 104 to collect for unsigned min/max values or to collect for signed min/max values. In the data store data path, min/max collection logic of the min/max collector 104 may be included that reads values as they are computed using the processor(s) 102—and stored in a register file—to update or maintain the min/max values.

For example, during operation, a current min and/or a current max value may be maintained in the min/max collector 104, and the current min and/or current max may be updated as new, lower min values and/or new, higher max values are written out to memory 106. Where newly computed values are greater than the min and/or less than the max, the current min and/or max may be maintained by the min/max collector 104. In this way, the min/max collector 104 may maintain the current min and/or max value as each value is computed throughout a full computation. Once the computation is complete for a given iteration, the min/max values are immediately available in the min/max collector 104, and software and/or hardware may be used to compare these stored values to the min and/or max thresholds associated with the particular algorithm or computation executed to determine whether an anomaly exists. For example, a mechanism may be included that allows for the collected min/max values to be read for evaluation. As such, in comparison to prior approaches, another cycle(s) is not required to compute the min/max after the algorithm has been fully executed as the min/max values are available immediately. Further, in embodiments, the min/max collector 104 (e.g., including hardware and/or logic) may be aware of store predication such that if a particular data item is prohibited from storing to the memory 106 via, e.g., per-lane store predication, the min/max collection may exclude that particular data item. For example, where an address from an address generator includes a store predication flag, the computed values may be ignored both for storing to memory 106 but also for updating the min/max collector 104.

In some embodiments, the min/max collector 104 may be implemented as a feature of a system including an address generator—such as the address generator(s) described in U.S. Non-Provisional application Ser. No. 15/141,703, filed on Apr. 28, 2016, which is hereby incorporated by reference in its entirety. The address generator may be included in any type of processor(s) or other processing unit(s)—such as a vector processing unit (VPU), a central processing unit (CPU), a graphics processing unit (GPU), a digital signal processor (DSP), a data processing unit (DPU) and/or another processing unit type (such as those described with respect to FIGS. 13A-13D, 14, and/or 15). In some embodiments, one or more VPUs may be included in a programmable vision accelerator (PVA), and/or as part of a system on chip (SoC).

As a non-limiting example, inputs for a particular sensor type or algorithm may be restricted to units of 16 bits. To determine the dynamic range for this particular sensor and/or algorithm, the operations associated with the algorithm processing the sensor input may be evaluated. In such an example, assuming the first operation is to add two 16 bit numbers, the first intermediate result is a 17 bit number. The 17 bit number may then be multiplied by a 5 bit number to produce a 22 bit number. If this is the end of the algorithm, it may then be determined that the output may not exceed 22 bits. Similarly, a minimum value may be evaluated. As such, during deployment, where a min/max value is outside this known range—e.g., 22 bits—the output may be flagged.

In some embodiments, a store data path (e.g., between the processor(s) 102 and the memory 106) may include saturation and/or rounding logic 108 to cause values stored out to memory 106 to be between some upper and lower bound or threshold, or to be rounded based on some particular convention. As such, in traditional approaches, the evaluation for min/max may be after saturation and/or rounding. Where anomalies are present, these traditional approaches may not detect the anomalies as the saturation and/or rounding may hide the anomaly—e.g., the low and/or high value(s) may be saturated between the upper and lower bounds the saturation logic is configured for.

However, it may be the unsaturated, unrounded, or absolute min/max values that are valuable or desired for a particular implementation—e.g., in addition to or alternatively from the saturated min/max values. As such, the min/max collector 104 of the present disclosure may collect the min/max values from the raw or unsaturated data (e.g., prior to the values being manipulated using the saturation/rounding logic 108) for use in anomaly detection. In embodiments, collection of average values of data, or average absolute values of data may be executed. The average value may be computed, e.g., by summing up elements, reading back a sum from an address generator configuration register, and performing a division by a number of data items stored out (which may be known to the application). In this way, min/max of absolute values, sums of values, and/or sums of absolute values may be added to a processor store data path, and configuration and collection of resulting statistics may be executed—e.g., may be added to the address generator configuration feature set, or may be separately managed. In some embodiments, the min/max collector 104 may collect the values prior to and/or after saturation, rounding, or other computation using the saturation/rounding logic 108.

Figure 1B:
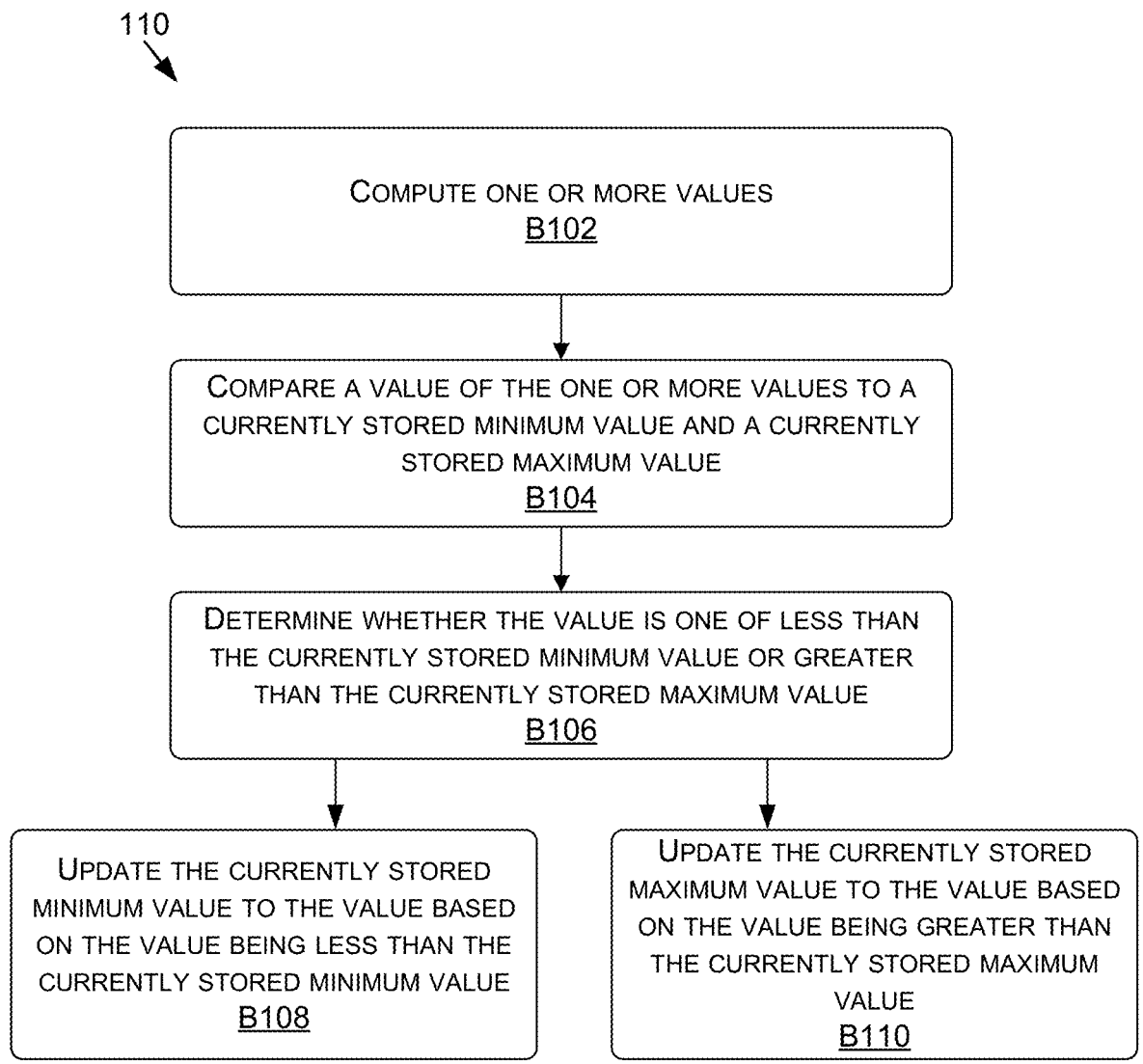
FIG. 1B is a flow diagram showing a method for a min/max collection, in accordance with some embodiments of the present disclosure.

Now referring to FIG. 1B, each block of method 110 described herein comprises a computing process that may be performed using any combination of hardware, firmware, and/or software. For instance, various functions may be carried out by a processor executing instructions stored in memory. The method 110 may also be embodied as computer-usable instructions stored on computer storage media. The method 110 may be provided by a standalone application, a service or hosted service (standalone or in combination with another hosted service), or a plug-in to another product, to name a few. Although described with respect to the architecture 100 of FIG. 1A, the method 110 may be executed by any one system, or any combination of systems, including, but not limited to, those described herein.

FIG. 1B is a flow diagram showing a method 110 for a min/max collection in accordance with some embodiments of the present disclosure. The method 110 at block B102 includes computing one or more values. For example, when executing one or more algorithms—e.g., neural networks, computer vision algorithms, filtering algorithms, etc.—one or more values may be computed using the processor(s) 102.

The method 110, at block B104, includes comparing a value of the one or more values to a currently stored minimum value and a currently stored maximum value. For example, the min/max collector 104 may compare each value of any number of the values that are to be stored to memory 106—e.g., values that are in a register file—to a currently stored minimum value and a currently stored maximum value (e.g., currently stored by the hardware min/max collector 104). In such an example, as the values are computed and prior to or at the same time as the values are being stored to memory, the min/max collector may compare the values to currently stored min and/or max values. In one or more embodiments, the min/max collector may be included along a data path between a hardware unit computing the one or more values and a memory unit storing the one or more values.

The method 110, at block B106, includes determining whether the value is one of greater than the currently stored maximum value or less than the currently stored minimum value. For example, based on the comparing of block B104, the system (e.g., the hardware min/max collector 104) may determine whether each value to be stored to memory is greater than a currently stored maximum value or less than a currently stored minimum value.

The method 110, at block B108, includes updating the currently stored minimum value to the value based on the value being less than the currently stored minimum value. For example, where a computed value to be stored to memory is less than the currently stored minimum value of the hardware min/max collector, the hardware min/max collector may update to the currently stored minimum value to the computed value.

The method 110, at block B110, includes updating the currently stored maximum value to the value based on the value being greater than the currently stored maximum value. For example, where a computed value to be stored to memory is greater than the currently stored maximum value of the hardware min/max collector, the hardware min/max collector may update to the currently stored maximum value to the computed value.

In this way, the min/max may be dynamically updated during the storing out of the values, such that once some number (e.g., all) of the values are stored out, the min/max is immediately available by reading the min/max out from the currently stored values of the min/max collector.

Automatic Store Predication

Among high clock rate processors, a popular implementation is to configure the processor into multiple pipelined stages. As a result, there may be latency between when an instruction is issued to load a register from local memory to when the register is available for another instruction to operate on—e.g., load-to-use latency. To achieve high throughput in spite of load-to-use latency, processor compilers and application development may employ software pipelining and/or loop unrolling. For example, software pipelining may be used to overlap the execution of multiple iterations of the loop, and loop unrolling may be used to expand a loop body by repeating the contents of the loop body many times. Together, these techniques may allow multiple iterations of loop contents to be executed concurrently, so that there are fewer idle cycles—ideally none—in the schedule. When performing loop unrolling, a compiler may divide the loop interaction count by an unrolling factor. For example, the compiler may assume that the original iteration count is a multiple of the unrolling factor, so that the unrolled loop can be carried out with equivalent functional behavior. In such an example, if the original iteration count is 60, and the loop is to be unrolled by a factor of 6, the unrolled loop may be run for 10 iterations. However, if the original loop iteration count is 64, with normal integer division, 64/6 also results in 10, so the loop would not be executed sufficiently many times (e.g., the extra 4 iterations may not be executed), resulting in different code behavior after the unrolling which may lead to failure in the application. In some techniques, an assertion statement is added to ensure that the iteration count is indeed a multiple of the unrolling factor.

The collection of steps or operations in a loop body may have a narrow range of optimal or desired unrolling factors. For example, the unrolling factor may be lower-bounded by a minimal number of copies of loop code to schedule in order to fill gaps due to various latencies and to achieve best performance, and also may be upper-bounded by a maximal number of copies to schedule with limited capability in the register files—e.g., which may lead to excessive register spilling (saving to and restoring from stack) and resulting in suboptimal scheduling. As a further example, due to the feasibility of choosing a combination of tile width and tile height that allows for an iteration count that is some power of 2 (e.g., 2, 4, 8, etc.), unrolling by a power of 2 is acceptable for many applications. However, in embodiments, a loop body may also be unrolled 6 or 7 times optimally, while unrolling by 4 or 8 may not be as efficient. In any case, loop unrolling to achieve optimal scheduling may cause inconvenient restrictions on the number of iterations. As such, conventional techniques to address this issue may lead to performance degradation and code size increase.

For example, the restriction of iteration count is not convenient, so the programmer may write two loops—e.g., a "multiple" loop and a "remainder" loop—when there should not be such restriction on the iteration count. As examples, the following illustrative, example code segments show: Code 1—a vector addition loop without loop unrolling; Code 2—the same loop with loop unrolling by 6 that may only work if the iteration count is a multiple of 6; and Code 3—a two-loop solution that works with any iteration count, but the remainder loop is not unrolled and thus is less efficient, also resulting in a larger code size due to the additional loop and iteration count calculation.

Code 1:
```
for (i=0; i<niter; i++) chess_prepare_for_pipelining {
    dva=dvshort_load(agen_a);
    dvb=dvshort_load(agen_b);
    dvc=dva+dvb;
    vstore(dvc, agen_c);
}
```
Code 2:
```
assert((niter/6)*6==niter); // niter must be a multiple of 6
for (i=0; i<niter; i++) chess_prepare_for_pipelining
    chess_unroll_loop(6) {
    dva=dvshort_load(agen_a);
    dvb=dvshort_load(agen_b);
    dvc=dva+dvb;
    vstore(dvc, agen_c);
}
```
Code 3
```
int niter_multiple=(niter/6)*6;
int niter_remainder=niter-niter_multiple;
for (i=0; i<niter_multiple; i++) chess_prepare_for_pipelining
    chess_unroll_loop(6){
    dva=dvshort_load(agen_a);
    dvb=dvshort_load(agen_b);
    dvc=dva+dvb;
    vstore(dvc, agen_c);
}
for (i=0; i<niter_remainder; i++) chess_prepare_for_pipelining {
    dva=dvshort_load(agen_a);
    dvb=dvshort_load(agen_b);
    dvc=dva+dvb;
    vstore(dvc, agen_c);
}
```

Using a vector processing unit (VPU) of the present disclosure, Code 1 may achieve 6 cycles per iteration, Code 2 may achieve 1 cycle per iteration, and Code 3 performance may depend on the iteration count. For a number of iterations (niter), niter=60 (multiple of 6 so the remainder is not run), Code 3 may achieve 1.0 cycles per iteration, and for niter=64 (with remainder loop run 4 times), Code 3 may achieve 1.3125 cycles (e.g., (60*1+4*6)/64=84/64=1.3125) per iteration on average.

Figure 2A:
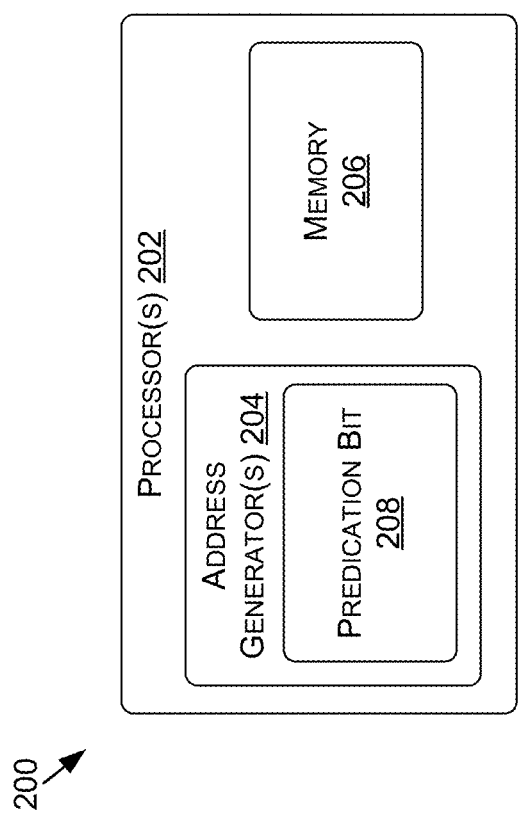
FIG. 2A is an example system including a processor having an address generation unit with automatic predication capability, in accordance with some embodiments of the present disclosure.

With reference to FIG. 2A, FIG. 2A is an example system 200 including a processor 202 (such as a VPU) including an address generation unit with automatic predication capability, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the processor 202 may be included in, and/or may include similar components, features, and/or functionality to that of example autonomous vehicle 1300 of FIGS. 13A-13D, example computing device 1400 of FIG. 14, and/or example data center 1500 of FIG. 15.

In embodiments of the present disclosure, loads and stores in the code segments may use an address generator(s) 204 in the processor(s) 202 (e.g., a VPU). For example, in each load and store, an address generator (agen) argument (agen_a, agen_b, agen_c) may be supplied to the load/store functions. The argument may identify an address generator register that contains parameters that may be used for address calculation of the particular load and/or store operation—e.g., address pointer, number of iterations, current loop variable values, etc. In some embodiments, the VPU may be designed such that each address generator register supports 6 (or other value) dimensions of addressing, thus including 6 (or the other value) iteration counts and 6 (or the other value) loop variables.

To account for the restriction on the number of iterations with loop unrolling, systems and methods of the present disclosure may include an address generator 204 with logic (e.g., a predication flag or bit 208) for automatic predication of stores from the address generator 204. For example, predication may be used to provide an indication for conditional execution such as whether (or not) to execute something. A value (e.g., 0 for store or 1 for prevent storing, or vice versa) of a predication bit 208 may be used to indicate whether an instruction will be executed or not.

Execution may not refer to actual execution of the iteration, but may refer to whether the resulting values from execution of the iteration are stored to memory. As such, in embodiments, an instruction not being executed due to a predicate flag may refer to an instruction or iteration being executed, but with the results of the execution being prevented or precluded from making a change to the state of the memory 206. Predication may include instruction level predication and lane level predication. Instruction level predication may be used to indicate whether an entire instruction should be executed or not, while lane level predication may be used to indicate which lanes of data should be executed or not.

In some embodiments, after the loop variables exhaust the iterations count, any subsequent execution of the store instruction is automatically predicated off to prohibit further writes to memory 206. In this way, the automatic store predication feature may allow code to be written clearly by rounding up an iteration count that is not a multiple of, e.g., 6 (or another unrolling factor) to the next multiple of 6, and by not altering an iteration count that is not a multiple of 6 (or another unrolling factor). Although a factor of 6 is used, this is not intended to be limiting, and any unrolling factor may be used without departing from the scope of the present disclosure. Code 4, below, includes an example of vector addition with automatic store predication Code 4:
int niter_roundup=((niter+5)/6)*6; // ceiling(niter/6)*6
for (i=0; i<niter_roundup; i++) chess_prepare_for_pipelining
    chess_unroll_loop(6){
    dva=vshort_load(agen_a);
    dvb=vshort_load(agen_b);
    dvc=dva+dvb;
    vstore(dvc, agen_c);
    }

Code 4, with an original number of iterations (niter) of 64, may run the unrolled loop 11 times at 1.03125 cycles per iteration (e.g., 11×6/64=1.03125). Another way to account for the restriction on iteration count being a multiple of the unrolling factor is to calculate the necessary predication flag in the loop, and to supply the predication flag in the store instruction. For example, Code 5 depicted below illustrates an example implementation of predication flag calculation.

Code 5:
int niter_roundup=((niter+5)/6)*6; // ceiling(niter/6)*6
int j=0;
for (i=0; i<niter_roundup; i++) chess_prepare_for_pipelining
    chess_unroll_loop(6){
    dva=vshort_load(agen_a);
    dvb=vshort_load(agen_b);
    dvc=dva+dvb;
    pred=(j++<niter) ?−1:0;
    vstore(dvc, agen_c, pred);
    }

Code 5 may compile into 1.5 cycles per iteration in the VPU of the present disclosure, so the automatic predication may include a performance advantage over predication calculated in the loop. In embodiments, the VPU may include a 7-way very long instruction word (VLIW) instruction scheme, and may include 2 scalar slots per cycle for scalar operations needed for the predication calculation. If the loop has more vector operations per iteration, there may be sufficient scalar slots so that the predication calculation may fit into available slots and not cause performance degradation. Even in the compute loops where there is no performance impact to calculate predication in real-time, having automatic predication may still have an advantage in code size and energy consumption.

As such, software may be used to configure a number of iterations (e.g., N1-N6), and software may cause execution of an address generator based load/store—typically in a loop. The address generator hardware may maintain loop variable (e.g., variable I1-I6), and may advance the address pointer appropriately. When the address generator based load/store has been executed over the pre-configured number of iterations, the address pointer may be stuck at a last valid address, and automatic predication may be turned off (e.g., by setting a predication flag) to block subsequent stores to memory. As such, an "auto predication off" internal Boolean state may be included in the address generator 204, and the loop variable iteration logic may be configured to support auto predication being turned off. For example, and with respect to FIG. 2B, when an address generator is initialized, a value of parameter auto predication off ("auto_pred_off") (e.g., the predication bit 208) may be initialized or reset to "0," in addition to loop variables I1-I6. After the loop variables exhaust the programmed iteration counts, auto_pred_off may be updated to "1." Any subsequent execution of the store instruction may then be automatically predicated off as a result of the predication bit being "1," and further writes to memory may be prevented.

In the example of FIG. 2B, the address generator number of iterations for registers N1-N6 may be programmed as N1=4, N2=2, N3=N4=N5=N6=1. The total programmed iteration count may thus be 4*2*1*1*1*1=8, and the sequence as illustrated in FIG. 2B may be executed as a result. As illustrated, the initial state and the following 7 executions (e.g., the first 8 iterations) may correspond to an auto_pred_off bit value of 0, and the eighth and ninth executions (e.g., the last 2 iterations) may correspond to an auto_pred_off bit value of 1, thus blocking the results of the ninth and tenth executions from being stored to memory.

In practice, a VPU may be configured to process some number of vector units working at a same time—e.g., 8, 16, etc.—and thus the VPU may require an array to be a multiple of the number of vector units. Where an array is a multiple of the number of vector units, this setup works well. Commonly, however, an array may not be a multiple of the vector units (e.g., because there is no guarantee data will be computed according to a same size array) and, as a result, the array is padded so that the processing is always executed on a same size batch. For example, the remaining iterations may be padded with "0" values, but this still requires additional cycles in software to process the padded values. As such, padding may be inefficient as the added data results in wasted computations and also complicates the software—a common problem in single instruction multiple data (SIMD) software. As such, automatic store predication may be used to account for this issue.

For a non-limiting example, where batches of 16 are used, as many batches of 16 may be generated from an array, and the remaining values may be included in a final batch with the leftover or remaining space within the batch of 16 predicated off using a predication flag. For a specific example, if an array size is 82, 5 full sets of 16 may be generated, and in the last iteration the remaining 2 elements may be included and the other 14 may be automatically predicated off—thus minimizing the wasted computation of padding the batch with 14 values and performing unnecessary computations on the padded data. As a further example, where a vector processing granularity includes a width of 32, and an array has 100 elements, 3 full 32 element vectors may be processed and the remaining 4 elements may be processed through 4 of the 32 lanes (e.g., a predication flag may be on) while the other 28 lanes may be predicated off. In this way, a programmer may be able to vectorize arrays that are not a multiple of the number of units in the sample. For example, for every store, the hardware may actually compute how many elements to write to memory, and communicate this information to the store unit. As such, even if the math on padded or additional elements can be executed and stored, this extra computation and storage is inefficient. Thus, the predication flag may be set such that the extra reads are not required, and writing of computed values to memory from padded values does not take place (e.g., is prevented or precluded). This automatic predication may take place at the instruction level, and software may be added to additionally perform lane level predication.

In addition, for automatic predication, no additional information may be required in that the address generator may program a number of iterations—so the address generator has the memory to support automatic predication—and software instructions may be added to automatically move a predicate and predicate off the store. In this way, at a final iteration, the hardware may determine when to store a full result or when to store less than a full result—e.g., due to predication being turned or otherwise signaled off—and this may be executed at zero cost while maintaining performance. Where software alone is used, the process would require extra cycles, thereby slowing the process.

In some embodiments, predication may be used at a per-lane level, so that not only can these implementations handle iteration counts that are not a multiple of a loop unrolling factor, but any problem size that is not a multiple of the vector width may be handled efficiently. In such embodiments, per lane predication may be driven using a vector register which may provide an advantage in that the information is computed in real-time, and by using a vector register a shortcut may be realized that removes a requirement to copy from vector register to a scalar predicate register and then using the scalar predicate register to apply the predicate flag per-lane. For example, per-lane predication may be executed from the vector register which may be beneficial when per-lane predication information is computed in the loop, and the computation may be vectorized.

For example, where certain value replacement in an array is to be executed—such as replacing any value over 100 with 999—the code may be written as below:

```
for (i=0; i<len_arr; i++)
{
    if (array[i]>100) array[i]=999;
}
```

While this code may be functionally correct, but may lead to poor performance. As such, the code may be vectorized with per-lane predication by incorporating, for example, the following code:

```
vint*vptr=(vint*) array; // type cast scalar pointer into
    vector pointer
agen aout=init(array); // configure agen as output pointer
aout.n1=len_arr/vecw;
aout.mod1=sizeof(vint);
vrep1=replicatew(999); // initialize each lane as 999
for (i=0; i<len_arr/vecw; i++)
{
    vintx vdata=sign_extend(*vptr++); // vector load
    vintx vtemp=vbitcmp(vdata, 100); // compute per-lane
        predicates and bit-pack
    int pred=smovb(vtemp); // move from vector lane0 to
        scalar register
    vstore(vrep1, aout, pred); // predicated vector store
}
```

When predicate calculation is vectorized in this way, and per-lane predication can only be conveyed via a scalar predicate register, predication information would need to be copied from the vector register to the scalar predicate register, thus adding to the execution time.

However, per-lane predication driven directly from vector register feature described herein can be used in this example to achieve better performance than performing bit-packing and moving the predication mask from vector lane 0 to scalar register, as illustrated in the below code:

```
vint*vptr=(vint*) array; // type cast scalar pointer into
    vector pointer
agen aout=init(array); // configure agen as output pointer
aout.n1=len_arr/vecw;
aout.mod1=sizeof(vint);
vrep1=replicatew(999); // initialize each lane as 999
niter=((len_arr/vecw+5)/6)*6;
for (i=0; i<niter; i++) chess_prepare_for_pipelining chess_unroll_loop(6)
{
    vintx vdata=sign_extend(*vptr++); // vector load
    vintx vpred=vdata>100; // compute vector predicate
    vstore(vrep1, aout, vpred); // predicated vector store
}
```

Figure 2C:
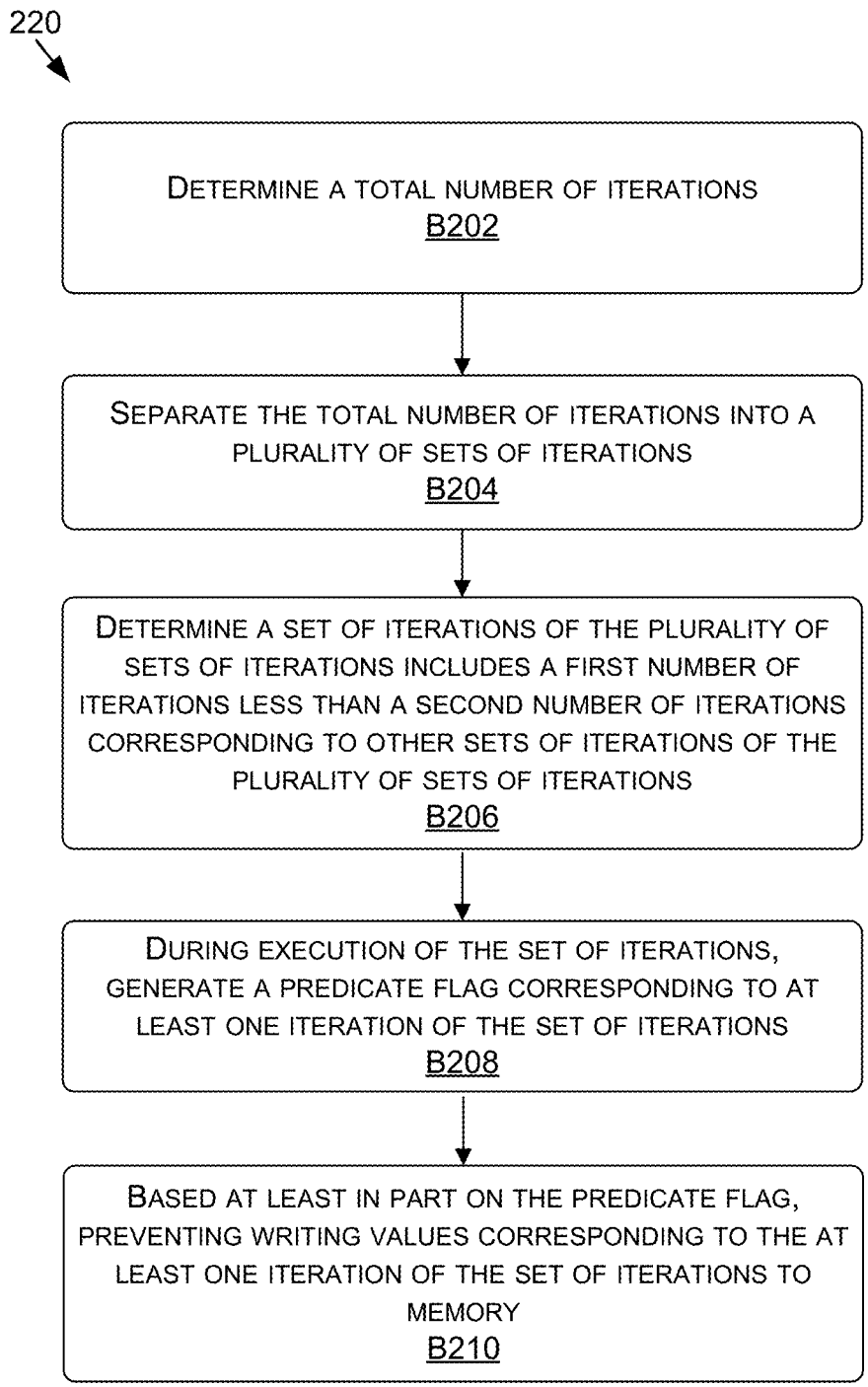
FIG. 2C is a flow diagram showing a method for automatic store predication, in accordance with some embodiments of the present disclosure.

Now referring to FIG. 2C, each block of method 220, described herein, comprises a computing process that may be performed using any combination of hardware, firmware, and/or software. For instance, various functions may be carried out by a processor executing instructions stored in memory. The method 220 may also be embodied as computer-usable instructions stored on computer storage media. The method 220 may be provided by a standalone application, a service or hosted service (standalone or in combination with another hosted service), or a plug-in to another product, to name a few. Although described with respect to the system 200 of FIG. 2A, the method 220 may be executed by any one system, or any combination of systems, including, but not limited to, those described herein.

FIG. 2C is a flow diagram showing a method 220 for automatic store predication, in accordance with some embodiments of the present disclosure. The method 220, at block B202, includes determining a total number of iterations. For example, the address generator 204 may determine a total number of iterations to be executed for a given instruction.

The method 220, at block B204, includes separating the total number of iterations into a plurality of sets of iterations. For example, the address generator 204 may separate the iterations by an unrolling factor to generate loop bodies including a number of iterations of a loop.

The method 220, at block B206, includes determining a set of iterations of the plurality of sets of iterations includes a first number of iterations less than a second number of iterations corresponding to other sets of iterations of the plurality of sets of iterations. For example, the address generator 204 may determine that after the separation of the iterations by the unrolling factor, a set of iterations includes less iterations than other sets. For example, where the unrolling factor is 6 and the number of iterations is 62, there may be 11 sets of iterations—10 including 6 iterations and 1 including 2 iterations. As such, the address generator 204 may determine that the 2 iterations of the set of iterations including the remaining 2 iterations should be executed and the other four should be predicated off.

The method 220, at block B208, includes during execution of the set of iterations, generating a predicate flag corresponding to at least one iteration of the set of iterations. For example, upon determining that the set of iterations does not include a full set of a same number of iterations as the other sets of iterations, the address generator 204 may enable a predication flag (change a value of a predication off bit 208) to indicate that the results of the excess iterations should be stored or written to memory.

The method 220, at block B210, includes, based at least in part on the predicate flag, preventing writing values corresponding to the at least one iteration of the set of iterations to memory. For example, based on the predicate flag being set, the values computed may be prevented or computed from being written to memory.

Enhanced SIMD Data Path Organization for Vector Processors

In a conventional single instruction multiple data (SIMD) architecture, each SIMD processing unit operates in parallel and independently of one another on its own data lane. Some machines allow each SIMD processing unit to communicate directly with close neighbors (e.g., left neighbor and right neighbor as a linear array of processing units, or north, south, east, and west neighbors in a two-dimensional (2D) array or processing units). However, communication only among neighboring data paths is restrictive and makes implementation of operations that require more than a few input operands expensive. As an example, convolution is a common operation in image processing, computer vision, machine learning, and the like. During convolution, various filters may be applied to neighboring pixels such as, for a non-limiting example, a three-tap one-dimensional (1D) filtering that involves three data operands and three coefficient operands. If these operands cannot be shared among data lanes of a SIMD architecture, six operands are required to be brought into each data lane to produce the outcome of that particular lane. To account for this, some common approaches implement multiple read ports on a register file, but this requires additional surface area for the SIMD architecture as well additional power to operate.

To account for the deficiencies of conventional SIMD architectures, the SIMD architecture of the present disclosure may allow for communication among lanes by defining slices in a processor—such as a vector processing unit (VPU)—that consists of multiple lanes as a group. For a non-limiting example, in a processor, the SIMD lane organization may include a hierarchical organization including a 384 bit data path that may be partitioned into, e.g., 8 lanes of 48-bits (extended word), 16 lanes of 24-bits (extended halfword), or 32 lanes of 12-bits (extended byte). In such examples, each byte may be extended by 4 bits. A first tier of communication above individual lanes may be referred to as a SIMD slice, and may be (for example without limitation) 96-bits wide, consisting of two extended word lanes (e.g., two 48-bit lanes), four extended halfword lanes (e.g., 4 24-bit lanes), or eight extended byte lanes (e.g., 8 12-bit lanes). The entire processor data path may include four SIMD slices, in non-limiting embodiments, and a second tier of communication may be global, among all four (or other number of) SIMD slices and all lanes. In this way, sharing of operands between lanes of each slice may be accomplished, which may be useful in instructions such as filtering, dot product, sort-with-payload, etc. The SIMD architecture may be included in a VPU or other processor type, such as a processor of example autonomous vehicle 1300 of FIGS. 13A-13D, example computing device 1400 of FIG. 14, and/or example data center 1500 of FIG. 15.

The instruction set architecture (ISA) of the SIMD may allow sharing between some number—e.g., 8—lanes within a slice due to the physical routing of the SIMD architecture. For example, as illustrated in FIG. 3A, within each slice, communication between 32 bit word data types, 16 bit halfword data types, and 8 bit byte data types may be possible. As a result, in an example, such as a filtering operation illustrated in FIG. 3B, where there are four input operands and four coefficients, 8 bit by 8 bit multiplication and accumulation may be executed in halfword, where coefficients may be shared with data from different lanes. In a traditional SIMD architecture, each lane would require all 8 operands to be loaded to perform the same computation that can be performed using only three input operands in the SIMD architecture of the present disclosure. As a result, and because each read port is associated with increased surface area and energy consumption, only requiring three read ports saves space and energy for executing such instructions. In operation, due to the sharing among the lanes within a slice, the four accumulators—e.g., 0, 1, 2, and 3—may be populated with the results of the below computations.

$$ACC[0]+=D[0]*C[0]+D[1]*C[1]+D[2]*C[2]+D[3]*C[3]$$

$$ACC[1]+=D[1]*C[0]+D[2]*C[1]+D[3]*C[2]+D[4]*C[3]$$

$$ACC[2]+=D[2]*C[0]+D[3]*C[1]+D[4]*C[2]+D[5]*C[3]$$

$$ACC[3]+=D[3]*C[0]+D[4]*C[1]+D[5]*C[2]+D[6]*C[3]$$

As illustrated, for example, ACC[0] may access other lanes of src1a including D[1], D[2], and D[3] and may also access other lanes of src2, including C[1], C[2], and C[3]. Similarly, the other accumulators (ACCs) may access various lanes of src1 and src2. In a conventional vector processor with limited or minimal sharing among lanes, this type of operation would not be possible. These computations may, for example, include a sliding window approach where each accumulator includes the results of moving a sliding window with respect to a previous accumulator. For example, the first accumulator operates on D[0], D[1], D[2], and D[3], the second accumulator operates on D[1], D[2], D[3], and D[4], and so on. Each accumulator uses the same coefficients, C[0], C[1], C[2], and C[3]. This is possible due to the shared physical routing between the lanes of the slice of the SIMD architecture.

As another example implementation of the SIMD architecture of the present disclosure, and with respect to FIG. 3C, a dot product in vector multiplication operation may be performed using lane sharing. In such an example, the two indices—e.g., D[0][0]—indicate which lane the data belongs to and what set of outputs that data belongs to. For the dot product computations, each lane uses the data operands from its own lane only, but the coefficients are shared among the lanes. As such, the outputs from each lane may use all four coefficients at some time during the dot product operation. In operation, due to the sharing among the lanes within a slice, the four accumulators—e.g., 0, 1, 2, and 3—may be populated with the results of the below computations.

$$ACC[0]+=D[0][0]*C[0]+D[1][0]*C[1]+D[2][0]*C[2]+D[3][0]*C[3]$$

$$ACC[1]+=D[0][1]*C[0]+D[1][1]*C[1]+D[2][1]*C[2]+D[3][1]*C[3]$$

ACC[2]+=D[0][2]*C[0]+D[1][2]*C[1]+D[2][2]*C[2]+D[3][2]*C[3]

ACC[3]+=D[0][3]*C[0]+D[1][3]*C[1]+D[2][3]*C[2]+D[3][3]*C[3]

As another example operation that may benefit from the SIMD architecture of the present disclosure, a two point sorting operation of FIG. 3D may be executed. With two point sorting, two values are used to sort a payload. This two point sorting takes advantage of the communication between lane pairs within a slice, and is useful in, e.g., various computer vision applications. For example, in lane 0, there are keys for item 0, and in lane 1 are corresponding payloads, and so on, so the payloads may be sorted according to the comparison of the keys—e.g., as in the code below for each key/payload pair:

```
if (key1[i]<=key2[i]) { // compare keys
    out_key1[i]=key1[i]; // move both key and payload
    out_key2[i]=key2[i];
    out_payload1[i]=payload1[i];
    out_payload2[i]=payload2[i];
}
else {
    out_key1[i]=key2[i];
    out_key2[i]=key1[i];
    out_payload1[i]=payload2[i];
    out_payload2[i]=payload1[i];
}
```

Figure 3E:
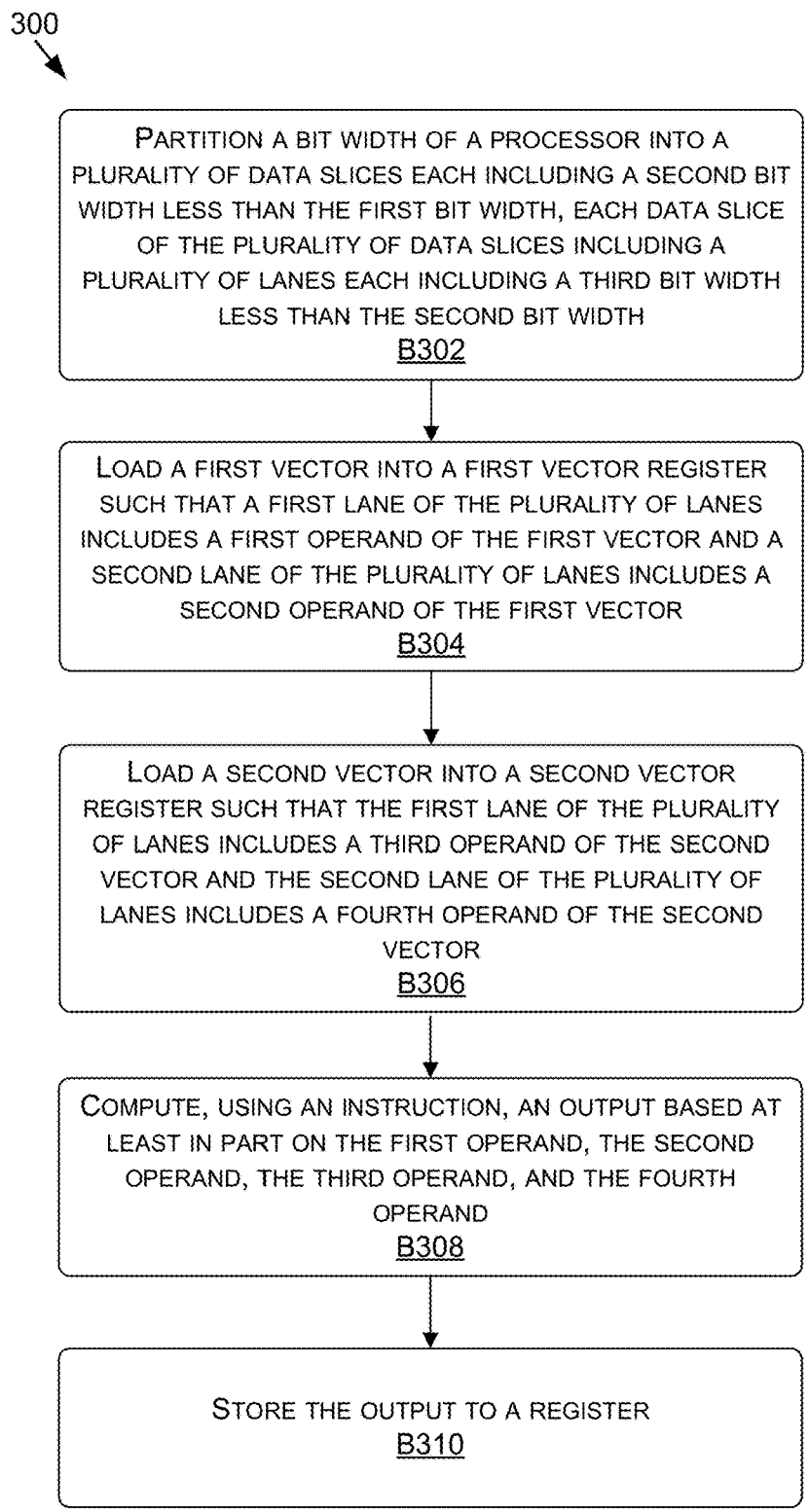
FIG. 3E includes a flow diagram for a method of computing outputs using shared operands across lanes of a SIMD architecture, in accordance with some embodiments of the present disclosure.

Now referring to FIG. 3E, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. Although described with respect to the SIMD architecture of the present disclosure, the method 300 may be executed by any one system, or any combination of systems, including, but not limited to, those described herein.

FIG. 3E includes a flow diagram for a method 300 of computing outputs using shared operands across lanes of a SIMD architecture, in accordance with some embodiments of the present disclosure. The method 300, at block B302, includes partitioning a bit width of a processor into a plurality of data slices each including a second bit width less than the first bit width, each data slice of the plurality of data slices including a plurality of lanes each including a third bit width less than the second bit width. For example, a vector processor may be partitioned into some number—e.g., 4—slices, and each slice may include some number of lanes.

The method 300, at block B304, includes loading a first vector into a first vector register such that a first lane of the plurality of lanes includes a first operand of the first vector and a second lane of the plurality of lanes includes a second operand of the first vector. For example, with respect to FIG. 3B, a first data operand D[0] of a first vector may be loaded into a first lane and a second data operand D[1] corresponding to the first vector may be loaded into a second lane.

The method 300, at block B306, includes loading a second vector into a second vector register such that the first lane of the plurality of lanes includes a third operand of the second vector and the second lane of the plurality of lanes includes a fourth operand of the second vector. For example, with respect to FIG. 3B, a first coefficient operand C[0] of a third may be loaded into the first lane and a second coefficient operand C[1] corresponding to the third vector may be loaded into the second lane.

The method 300, at block B308, includes computing, using an instruction, an output based at least in part on the first operand, the second operand, the third operand, and the fourth operand. For example, with respect to FIG. 3B, the first accumulator (ACC[0]) may receive the results of the computation ACC[0]+=D[0]*C[0]+D[1]*C[1]+D[2]*C[2]+D[3]*C[3], which includes the values of D[0], D[1], C[0], and C[1], in addition to others. This computation may take place due to internal sharing and routing between lanes of each slice.

The method 300, at block B310, includes storing the output to a register. For example, with respect to FIG. 3B, the output of the computation may be stored to the accumulator register ACC[0], and then may be stored to memory.

Transposed Load and Store Operations with a Stride Parameter

In a conventional vector single instruction multiple data (SIMD) processor, local data memory may be sized to match a vector processing width. For example, for a 256 bit vector SIMD processor capable of processing 32 lanes of 8 bits, 16 lanes of 16 bits, or 8 lanes of 32 bits, for example, the local data memory may include a 256 bit wide memory or a 512 bit wide memory (e.g., twice as wide as the processing bit width). In such examples, the local data memory is organized as a single bank of memory having the full width memory words. However, a wide vector SIMD processor having a single bank of full width memory words may be inefficient—especially for misaligned memory accesses. For example, to load an array for a 16 element 32 bit array at byte addresses 4 to 67, the processor may require two memory reads—e.g., one reading addresses 0 to 63 (including addresses 0 to 3 including data that is not required for the current operation) and a second reading addresses 64 to 127 (including addresses 68 to 127 including data that is not required for the current operation). As such, without the banked memory architecture of the present disclosure, the access pattern may be achieved via multiple loads or stores, which may result in slowing down a compute kernel, decreasing performance, and increasing power consumption.

To account for this, the single wide memory bank may instead be organized as a plurality of memory banks—such as 16 bit memory banks (e.g., 32 banks of 16 bit memory, supplying 512 bit memory bandwidth per clock cycle). In this way, read and/or write operations may take place within any 16 bit alignment—thereby reducing the amount of excess read/write operations such as those described in the above example. With such memory organization, reading addresses 4 to 67 may require only a single memory read. In addition to the memory bank organization including smaller individual memory banks, transposed load and/or store functionality may be implemented. For example, a lane offset parameter, K, may be used to define a row address offset that is applied to each subsequent lane in memory. The lane size may correspond to a data element size—e.g., 8 bit, 16, bit, 32 bit, etc. A staggered access pattern may translate to a vertical pattern when a 2D array is stored in memory with a line pitch of W*K+1 elements, where K is the offset parameter and W is 64/lane size (or size of the data elements). For example, for a 32 bit data element, the line pitch may be 16*K+1. In some embodiments, the SIMD processor may be included as a component of, and/or may include similar components, features, and/or functionality to that of example autonomous vehicle 1300 of FIGS. 13A-13D, example computing device 1400 of FIG. 14, and/or example data center 1500 of FIG. 15.

As an example, and with respect to FIG. 4A, table 400 may include an illustration of a logical view of transposed loads and a memory bank view of transposed loads with a line pitch of 17 over 256 bits. The memory banks end at 18 separate 16 bit banks in the memory bank view, and this is for illustrative purposes only. For example, the memory bank may be 256 bits total, 512 bits total, or some other number of total bits—e.g., where each memory bank may be 16 bits wide. In the memory bank view using the transposed loads, with a line pitch of 17, a single load operation may be executed to retrieve each of the highlighted values of the array.

Although transposed loads using the technique are beneficial for many operations, certain algorithms—such as some computer vision algorithms—may need to access data patterns that cannot be accomplished with a single read and/or write even with the transposed load techniques described with respect to FIG. 4A. As an example, instead of loading a 16 tall vertical vector, there may be instances where loading an 8 tall by 2 element wide submatrix, a 4 tall by 4 element wide matrix, or another matrix or submatrix size may be required. In a dot product operation, for example, the accumulation may be toward two rows of 16 elements with 16 bits each at a time such that when storing out, a T16 transposed store option with proper line pitch may be desirable so that two rows may be written out as one memory write transaction. To account for this, a stride parameter may be used with the transposed load and/or store. In some embodiments, the stride parameter may include a power stride of two (although this is not intended to be limiting), such as a stride of 2, 4, 8, 32, etc., which may be referred to as T2, T4, T8, T32, etc. Examples of different transposed loads with stride parameters are illustrated in table 410 of FIG. 4B, which includes a logical view of the transposed loads and a memory bank view. The example of FIG. 4A, mirrored in FIG. 4B, includes a stride parameter of 1, however, the other stride parameters are multiple of 2. For example, T2, with a line pitch of 18, allows for the 2 element wide by 8 tall matrix to be stored as a transposed load such that a single load transaction may be used to retrieve each of the values. Similarly, for T4, with a line pitch of 20 and a stride of 4, the 4 elements wide by 4 tall matrix may be stored such that a single load transaction may be used to retrieve each of the values, and so on. Although described as load transactions, this type of format may be used for store transactions as well, to store the data in memory according to the transposed plus stride parameter.

In such examples, the line pitch constraint may be adjusted according to the stride. For word type T-transposed access, the line pitch may be 16K+1, for word type T2-transposed access (e.g., for a stride of 2), the line pitch may be 16K+2, for word type T4-transposed access (e.g., for a stride of 4), the line pitch may be 16K+4, and so on. As such, the line pitch may be equal to 16K+stride value, or 16K+1+(T−1), where T is the stride parameter.

In operation, an architecture of the VMEM of the VPU and an instruction set architecture (ISA) of the VPU may be configured to perform the transposed load and/or store operations, with or without a stride parameter, to allow for reading or writing data organized in columns in logical view in a single read operation. For example, the ISA may be configured to receive information indicating a starting address for reading data from or writing data to (e.g., for reading or writing data from a register file), an indication of the write type (e.g., a transposed write operation, with or without stride parameter), a line pitch value (e.g., the value of K in 16*K+1), and/or a stride parameter value. It should be noted that the value of 16 corresponds to number of data elements of a particular implementation, but the value of 16 (or W) may be different in different embodiments. As such, when writing data to memory according to a transposed write operation, the ISA may receive the starting address to write to in VMEM, the line pitch, and/or the stride parameter. As a result, when writing the values, rather than writing them out in a single column of data into a single memory bank, the data may be written out according to a transposed or offset as illustrated, for example, in FIGS. 4A and 4B. Where a stride parameter is used, a first value of the stride may be written to memory, followed by the next number of elements corresponding to the stride, and then the line pitch may be applied to write a next set of values to memory banks such that each of the values may be written to memory in a single cycle. Similarly, during the read operation, with the data organized or written out according to the transposed store, the ISA may receive the starting address, the load type (e.g., a transposed load, with or without a stride parameter), the line pitch value (e.g., the value of K), and the stride parameter value (e.g., a data type indicator, such as byte, halfword, etc.). The ISA may then access the data from the various memory banks according to the transposed load instruction (and/or the stride parameter) in order to retrieve a column (or columns) of data in a single read cycle. In this way, a single vector may be returned from a single read operation by retrieving one element from each memory bank.

Figure 4C:
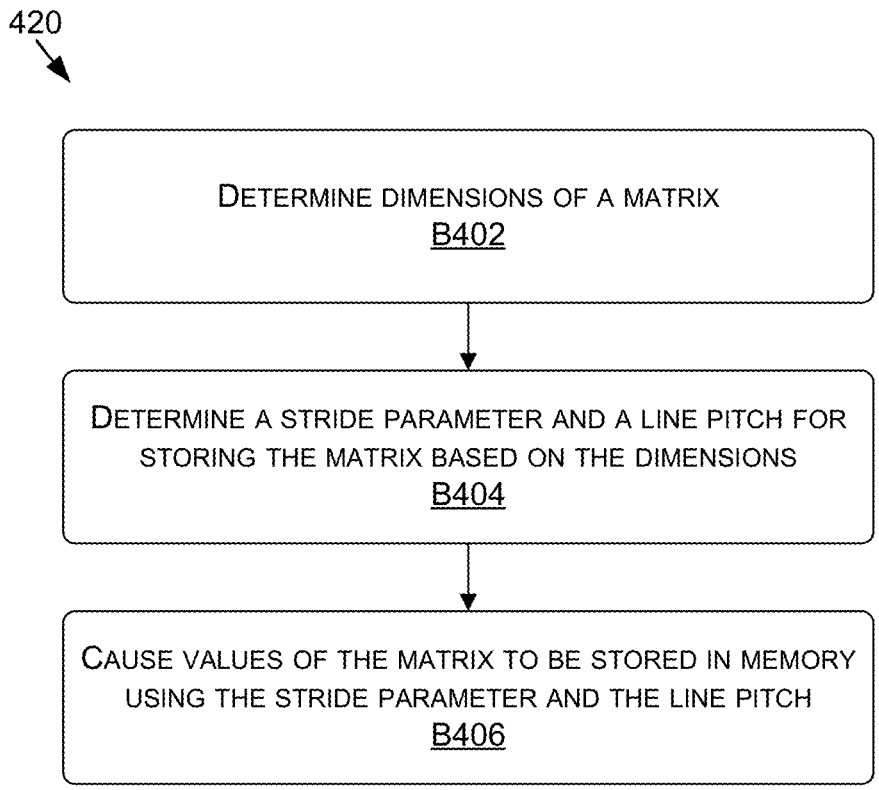
FIG. 4C is a flow diagram showing a method of configuring write operations of transposed loads with a stride parameter, in accordance with some embodiments of the present disclosure.

Now referring to FIGS. 4C-4D, each block of methods 420 and 430, described herein, comprises a computing process that may be performed using any combination of hardware, firmware, and/or software. For instance, various functions may be carried out by a processor executing instructions stored in memory. The methods 420 and 430 may also be embodied as computer-usable instructions stored on computer storage media. The methods 420 and 430 may be provided by a standalone application, a service or hosted service (standalone or in combination with another hosted service), or a plug-in to another product, to name a few. Although described with respect to the SIMD architecture of the present disclosure, the methods 420 and 430 may be executed by any one system, or any combination of systems, including, but not limited to, those described herein.

FIG. 4C includes a flow diagram for a method 420 of configuring transposed store operations using a stride parameter, in accordance with some embodiments of the present disclosure. The method 420, at block B402, includes determining dimensions of a matrix. For example, a width of a matrix may be determined.

The method 420, at block B404, includes determining a stride parameter and a line pitch for storing the matrix based on the dimensions. For example, a line pitch may be determined using 16K+stride value, and the stride value may be determined based on the width of the matrix.

The method 420, at block B406, includes causing values of the matrix to be stored in memory using the stride parameter and the line pitch. For example, once the line pitch and stride are determined, the values of the matrix may be stored in memory such that the line pitch and stride parameter values result in no bank conflicts when reading the matrix values from memory.

Now referring to FIG. 4D, FIG. 4D includes a flow diagram for a method 430 of configuring transposed store operations using a stride parameter, in accordance with some embodiments of the present disclosure. The method 430, at block B408, includes receiving data representative of a line pitch and a starting memory address in a memory bank of a plurality of memory banks, the starting memory address corresponding to an element of a plurality of elements corresponding to a column of an array.

The method 430, at block B410, includes reading, in a single read operation, the plurality of elements from the plurality of memory banks, each element of the plurality of elements being read from a respective memory bank of the plurality of memory banks based at least in part on the line pitch.

Load with Permute and Zero Insertion in a Single Instruction

In a conventional processor instruction set, a load instruction may form a memory address through some indexing calculation, read the requested memory data from local memory, and deposit the memory data into a register. If the application requires additional data manipulation, additional instructions may be used to operate on the memory data in the register. In some instances, data manipulation may include simple data reorganization. In a traditional processor, even this simple data manipulation in the register file requires additional instructions and thus additional latency. For example, conventional systems may load the data, perform the permutation on the loaded data, and then use the reorganized data to perform one or operations. If a load instruction is enhanced with this data reorganization capability, some processing time may be saved, and the compute kernels may be executed with higher performance and lower power consumption.

To account for these drawbacks, systems and methods of the present disclosure add a load with permute instruction that sends a permute pattern along with a memory address to the local memory. As a result, existing data routing and multiplexing used to handle misaligned loads may be used to perform the permutation without a significant amount of additional logic. In addition to saving instructions that would otherwise be spent—e.g., permute with double vector inputs and double vector outputs, taking five instructions to carry out—the overall latency of the permute operations may be reduced. For example, instead of having load-to-use latency and compute latency (e.g., for performing permutations), the only latency is the load-to-use latency. In some embodiments, the load with permute and/or zero insertion described herein may be included in, or may be similar to, components, features, and/or functionality of example autonomous vehicle 1300 of FIGS. 13A-13D, example computing device 1400 of FIG. 14, and/or example data center 1500 of FIG. 15.

As such, the load with permutation feature may be useful in manipulating loaded data from the memory into a desired format for operating on. As an example, coefficient data needed for various filtering and dot product instructions may include specific repeating patterns that may be implemented with load and permutation. With respect to a filtering operation, such as described with respect to FIG. 3C, coefficients of 0, 1, 2, and 3 may be repeated across a vector width (e.g., 16 bits)—e.g., as illustrated in FIG. 5A. In such an example, the write out to a first register may start with D[0]-D[15], then a sliding window of 4 may be used to start a next register with D[0]-D[19], and so on. In this filtering example, the coefficients C[0]-C[3] may be repeated across the width of the vector, so loading with permute may be helpful in writing the coefficients in this order directly from a load, rather than loading all of the data, then performing permutation, and then writing the vector to the register. As such, in this example, the permutation pattern for the coefficient data may include {0, 1, 2, 3, 0, 1, 2, 3, 0, 1, 2, 3, 0, 1, 2, 3}. In this same example, the permutation pattern of the data operand may be {0, 1, 2, 3, 4, 5, 6, 7, 8, 9, 10, 11, 12, 13, 14, 15, 4, 5, 6, 7, 8, 9, 10, 11, 12, 13, 14, 15, 16, 17, 18, 19}. As such, the data operands and the coefficient operands may be read out according to the permutation order, rather than being read out in order and then permutated prior to being written to the registers for computation. As another example, such as illustrated in FIG. 5B, a filtering instruction may include a double vector coefficient operand, and thus may include a permutation pattern such as {0, 1, 2, 3, 0, 1, 2, 3, 0, 1, 2, 3, 0, 1, 2, 3, 4, 5, 6, 7, 4, 5, 6, 7, 4, 5, 6, 7, 4, 5, 6, 7}. The permute pattern may be static or fixed, or may be computed algorithmically on the fly, which allows the permute patterns to be flexible and dynamic. Where a pattern is a repeated pattern, a first instance of the repeated elements may be loaded and then replicated, in embodiments, and then written out to the SIMD lanes of the SIMD unit.

In some instances, it may be preferable to mask out certain portions of memory data to zero values. For example, for easier visualization in software development or to consume less energy (e.g., versus leaving random data values), zeroes may be inserted for unused entries. In other examples, zeroes may be inserted to delineate chunks of data in a data structure, such as where the length of each chunk of data is not fixed. In such examples, the zero values may indicate a gap between two chunks of data. When processing an image patch of a constant size, for example, where some variable length information (e.g., locations of feature points) is extracted from each image patch, zeroes may be used to pad the remainder of the data that does not correspond to the extracted information.

In practice, permutation indices may normally include 32 or 16 elements in the readout—e.g., in the range of 0-31 or 0-15, respectively. In order to include zero values in the readout, negative index values may be included in the load with permute operations in order to write zeroes in the corresponding lanes of the destination register. As such, during the write operation, negative values may be written instead as zeroes in the corresponding lanes of a SIMD architecture, for example.

As an example, an image patch of 30 wide by 30 tall may be processed by vector operations using 16 consecutive entries at a time. Since the width of 30 is not divisible by 16, each row may be processed by two vector operations, first time processing a full vector width of 16 entries, and second time processing a partial vector width of 14 entries. In such an example, it may be beneficial if loading of the second 14 entry vector is padded with zeroes to fill the final two vector lanes, instead of the random data values that may currently exist in memory.

In one or more embodiments, the padded zeroes may be inserted into desired lane locations of a SIMD architecture, for example, to save the processing time otherwise needed to write zeroes to these lane locations. Where 16 lanes are present, normal permutation patterns may consist of 16 lane indices—e.g., 0-15. In such an example, where the values of {100, 101, 102, 103, 104, 105, 106, 107, 108, 109, 110, 111, 112, 113, 114, 115} are present, and indices provided as the permutation pattern are {0, 1, 2, 3, 4, 5, 6, 7, 8, 9, 10, 11, 12, 13, −1, −11}, the values ultimately loaded into the destination register shall be {100, 101, 102, 103, 104, 105, 106, 107, 108, 109, 110, 111, 112, 113, 0, 0}. As such, the two values of −1 are converted to 0 in the destination register automatically based on the permutation pattern including negative values. In prior approaches, the −1, −1 would include 14, 15, respectively, and the values in memory at 14, 15 would be written out to the register. However, these may include random values that may require additional processing time as compared to including 0 values.

To implement the load with permutation feature, routing and multiplexing in memory logic may be used—e.g., similar routing and logic used to carry out non-aligned memory load. For example, to support loading a full memory width (e.g., 32×16 bit) from any 16 bit address (or 16×32 bit lanes from any 32 bit address), the memory logic may include multiplexing logic to select any of 32 lanes of memory data to route into any destination register lane. For non-aligned memory loads, for example, the logic may be driven according to the below:

output_lane[0]=select(start_lane, memory_lane[0 . . . 31]);
output_lane[1]=select((start_lane+1) % 32, memory_lane[0 . . . 31]);
output_lane[2]=select((start_lane+2) % 32, memory_lane[0 . . . 31]);
. . .
output_lane[31]=select((start_lane+31)% 32, memory_lane[0 . . . 31]).

The total number of lanes may be wrapped around using a modulo operator (%), in embodiments. As such, where a start lane is lane 3, for example, lanes 3, 4, 5, . . . , 31, 0, 1, 2, would be used to as output to register lanes.

For a load with permutation feature, this same logic may be substantially reused, but may include a revised logic to perform the permutation operation. An example of the revised logic is included below:

output_lane[0]=select((start_lane+permute[0]) % 32, memory_lane[0 . . . 31]);
output_lane[1]=select((start_lane+permute[1]) % 32, memory_lane[0 . . . 31]);
output_lane[2]=select((start_lane+permute[2]) % 32, memory_lane[0 . . . 31]);
. . .
output_lane[31]=select((start_lane+permute[31])% 32, memory_lane[0 . . . 31])

Figure 5C:
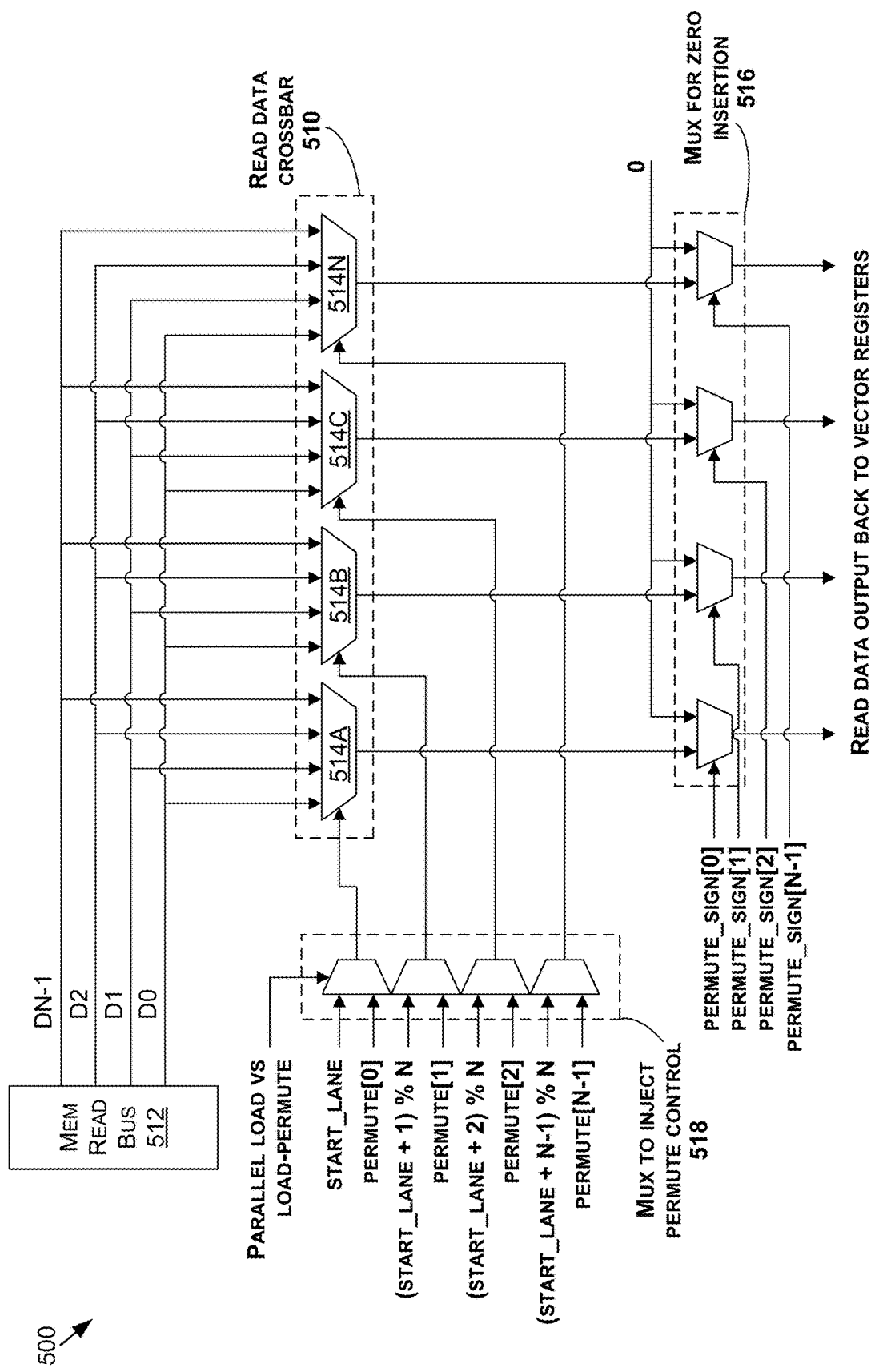
FIG. 5C illustrates a hardware architecture for performing load with permute and zero insertion, in accordance with some embodiments of the present disclosure.

As an example, and with respect to FIG. 5C, a hardware structure 500 (which may be included as part of a VPU, a SIMD unit, a SoC, or other device type) with a crossbar 510 (e.g., a crossbar switch) may be used to take data from any location in memory 512 and drive the data to any lane in the SIMD through a respective multiplexer(s) (mux(es)) 514A-514N. In this way, any of 16 inputs (or other width memory or register) may be capable of being written to any of 16 output locations or lanes. This may aid in non-aligned accesses, such that a load operation may start from any address and then be aligned down. For example, where data in memory is read from locations 2-18, the data may be read out from 2-18 but aligned with lanes 0-16 (e.g., 2 goes to lane 0, 3 goes to lane 1, and so on). This was not possible in conventional systems where vector loads were required to start at locations that were multiples of 16, such as 0, 16, 32, etc. Within this structure of FIG. 5C, permutation may also be completed as data from any memory index can be output to any lane in the SIMD unit of, e.g., a VPU. The muxes 518 may be used to inject or insert permute control for each lane, to inform the muxes 514 of the crossbar 510 which memory location to read data from based on the start location (which may be aligned or misaligned) and the permute pattern. As such, instead of simply pulling data from aligned locations, the permute pattern may be used to update the location for memory reads such that each mux 514 sends the proper data to each of the lanes of the SIMD unit. In addition, the muxes 516 may be used to insert zeroes for permute patterns that include negative values or other values indicative of zero insertion (e.g., where a value other than a negative value is used to cause zero insertion). As such, once the memory access locations are sent to the crossbar 510 from the muxes 518, and the values from the memory accesses are sent to the muxes 516 for zero insertion, the values corresponding to negative values in the permute pattern may be converted to zero values to pad the values for the respective SIMD lanes. Although only four sets of lanes, muxes, and memory indices are illustrated in FIG. 5C, this is not intended to be limiting, and any number of sets may be included without departing from the scope of the present disclosure.

Figure 5D:
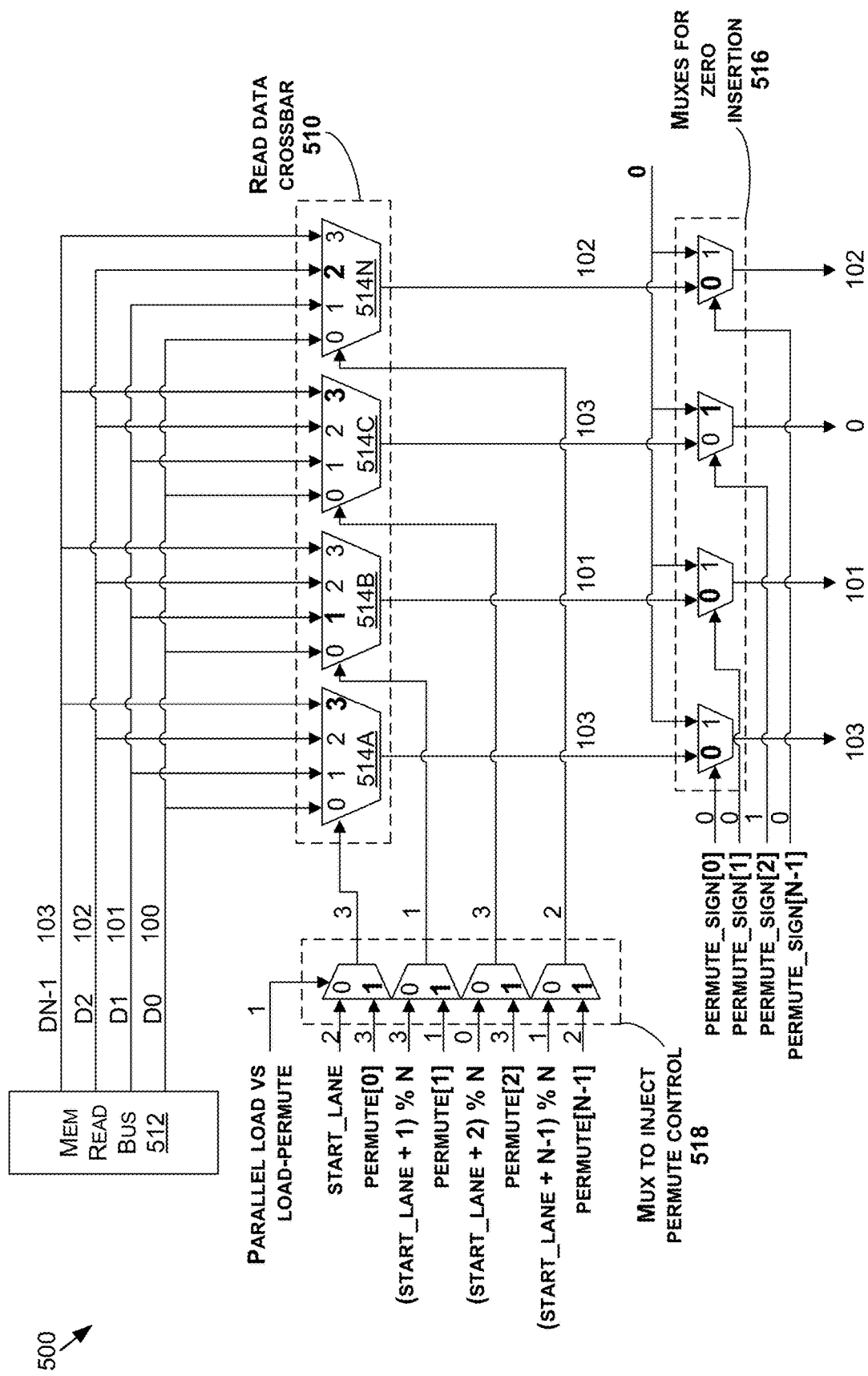
FIG. 5D illustrates an example use of the hardware architecture of FIG. 5C, in accordance with some embodiments of the present disclosure.

FIG. 5D illustrates an example use of the hardware architecture 500. For example, the illustration in FIG. 5D may be based on the following information:

crossbar_mode=1;
start_lane=2;
permute pattern={3, 1, −1, . . . , 2}={011b, 001b, 111b, . . . , 010b};
mem read bus={100, 101, 102, . . . , 103}
permute_low={3, 1, 3, . . . , 2}; // lower 2-bit of permute
permute_sign={0, 0, 1, . . . , 0}; // bit 3 of permute
read data output={103, 101, 0, . . . , 102}

In addition, the following C code may describe the logic circuit of the hardware architecture of FIGS. 5C and 5D:

```
log 2N=fp_int_round(log 2(N)); // e.g. N=16, log 2N=4
for (i=0; i<N; i++) {
   permute_low[i]=permute[i] & (N−1);
   permute_sign[i]=(permute[i]>>log 2N) & 1;
   if (crossbar_mode==0)
      crossbar_select[i]=(start_lane+i) % N;
   else
      crossbar_select[i]=permute_low[i];
}
for (i=0; i<N; i++) {
   crossbar_out[i]=D[crossbar_select[i]];
}
for (i=0; i<N; i++) {
   if (crossbar_mode && permute_sign[i]==0)
      zero_insert_out[i]=crossbar_out[i];
   else
      zero_insert_out[i]=0;
}
```

As such, in the example of FIG. 5D, the bit value of 1 in the muxes 518 may indicate that the load permute value should be selected, and these values {3, 1, 3, . . . , 2} may be transmitted to the respective muxes 514 of the crossbar 510. As such, the values of {103, 101, 103, . . . , 102} may be read out of memory and sent to the muxes 516, where the permute pattern may include a −1 for the third value, and thus the value of 103 may be converted to a 0 with zero insertion. As such, the final values of {103, 101, 0, . . . , 102} may be read back out to the vector registers.

Figure 5E:
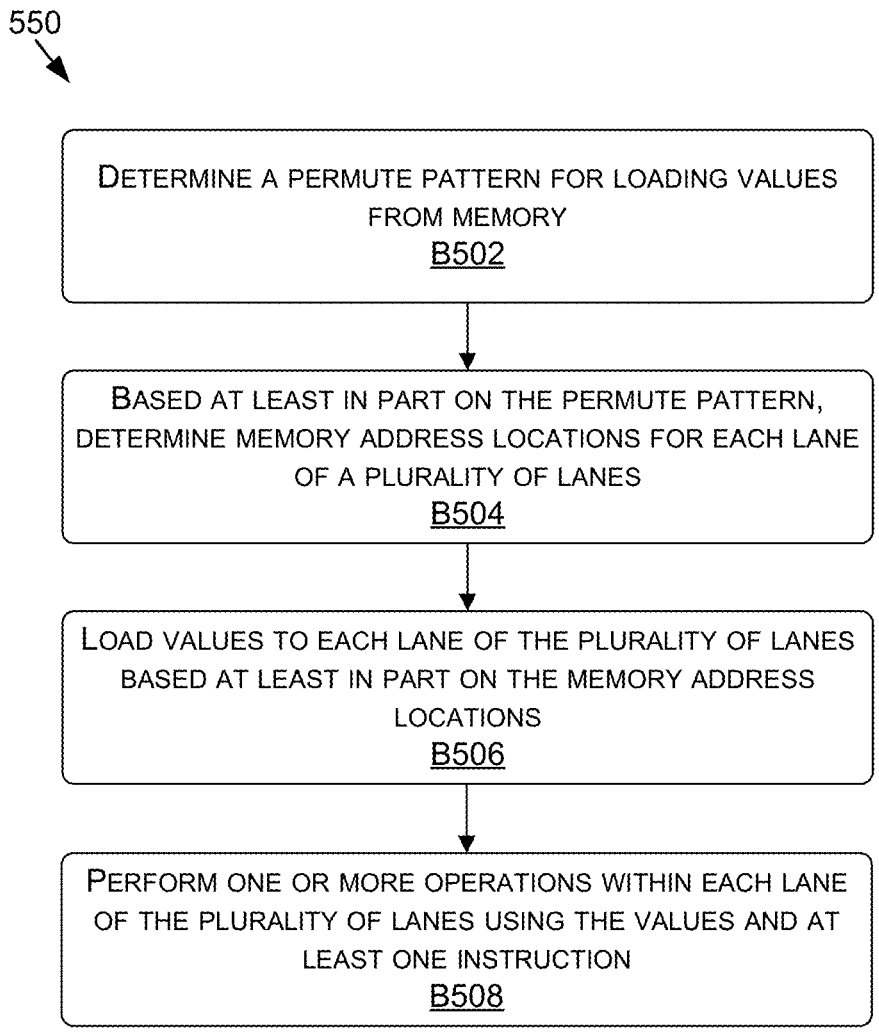
FIG. 5E is a flow diagram showing a method for load with permute, in accordance with some embodiments of the present disclosure.

Now referring to FIG. 5E, each block of method 550, described herein, comprises a computing process that may be performed using any combination of hardware, firmware, and/or software. For instance, various functions may be carried out by a processor executing instructions stored in memory. The method 550 may also be embodied as computer-usable instructions stored on computer storage media. The method 550 may be provided by a standalone application, a service or hosted service (standalone or in combination with another hosted service), or a plug-in to another product, to name a few. In addition, method 550 is described, by way of example, with respect to the hardware structure of FIG. 5C. However, this method 550 may additionally or alternatively be executed by any system, structure, or component, or any combination of systems, structures, or components, including, but not limited to, those described herein.

FIG. 5E is a flow diagram showing a method 550 for performing load with permute operations, in accordance with some embodiments of the present disclosure. The method 550, at block B502, includes determining a permute pattern for loading data from memory. For example, a permute pattern may be static or may be computed dynamically. The permute pattern may be aligned (e.g., 0 to 16, or 0 to 32), misaligned (e.g., 2 to 18), repeating (e.g., 0, 1, 2, 3, 0, 1, 2, 3, . . . and so on), and/or another pattern type.

The method 550, at block B504, includes, based at least in part on the permute pattern, determine memory address locations for each lane of a plurality of lane. For example, the permute pattern may indicate which memory address locations the data for a particular lane or register should be loaded from. The permute pattern may be implemented using the muxes 518, so that the proper memory addresses in accordance with the permute pattern are sent to the crossbar 512.

The method 550, at block B506, includes loading values to each lane of the plurality of lanes based at least in part on the memory address locations. For example, based on the memory address locations, the muxes 514 from the crossbar 512 may retrieve the corresponding values from memory for writing to one or more lanes within one or more vector registers. In some embodiments, the muxes 516 may also be used to convert values associated with negative values in the permute pattern (or other values that indicate padding with zero) to zeroes. As such, where one or more negative values are included in the permute pattern, the values loaded from memory may be converted to zeroes prior to being written to the vector register(s).

The method 550, at block B508, includes performing one or more operations within each lane of the plurality of lanes using the values and at least one instruction. For example, once the vector registers or the processing lanes of the SIMD unit are populated, one or more operations—e.g., arithmetic instructions, logical instructions, shift/rotate instructions, bit operation instructions, compare instructions, conversion instructions, constant generation instructions, and/or the like—may be executed using one or more processing units corresponding to the one or more processing lanes.

Multiple Point Lookup with Blending for Performing Table Lookups

In a conventional processor with vector SIMD computation, local memory may include a bit width that matches the bit width of the vector SIMD. As a result, these processors may generally only support read and/or write alignment and granularity corresponding to the bit width. However, table lookup is a common technique in, e.g., digital signal processing (DSP) and computer vision for embedded environments such as to implement various nonlinear functions. For example, square root, log, sine, and cosine functions may require table lookups to be executed. To perform these functions, an input space may be sampled evenly in a one-dimensional (1D) grid, and the outputs may be recorded at these input points in a 1D table. When a nonlinear function is implemented with a table lookup, however, there is often a tradeoff between table size (e.g., a number of entries in the table) and accuracy. To improve accuracy without requiring a large table size, an interpolated lookup may be performed, where two points are looked up around a fractional index for linear interpolation, or three points are looked up around a fractional index for quadratic interpolation.

As an example, where a sine function is implemented using a lookup table, and the sine values are tabulated at integer degrees, then table[0]=sin(0 deg), table[1]=sin(1 deg), table[2]=sin(2 deg), and so on. In such an example, where the evaluation is of sin(1.7 deg), interpolation may take place between the two integer degree entries linearly using the fraction as table[1]*0.3+table[2]*0.7. In this example, the second entry for table[2] gets the fraction as weight, and the first entry gets 1 minus the fraction, so that the closer the fraction is to 1.0 or to the position the second entry corresponds to, the higher the second entry is weighted.

As another example, an image or a patch of an image may be resampled, which may involve looking up available pixels around some fractional pixel coordinate, and then performing an interpolated lookup. In such example, the table may include an image patch, and may be two dimensional. In this case, bilinear interpolation may be performed to interpolate in two dimensions, each linearly. As an example, a patch at location Y=5.1, X=7.6, may be interpolated according to the below computation:

(patch[5][7]*0.4+patch[5][8]*0.6)*0.9+
(patch[6][7]*0.4+patch[6][8]*0.6)*0.1

However, performing this type of interpolated lookup in a conventional processor is expensive, as separate lookups need to be performed for each value from each table. To speed up this process, a table may be replicated to allow for any number of lookups at a same time using different instances of the table. For example, in the above example, when looking up patches at 5, 6, 7, and 8, a table may be replicated at least 4 times, to allow for the parallel lookup in the four tables. Where a processor—such as a VPU—supports 32 way parallelism, for example, the table may be replicated 32 times. However, while replicating the table may increase throughput per cycle, the replication also requires additional memory capacity and use, which may not be available or optimal in certain implementations.

To account for this, the systems and methods described herein use two point and/or two by two (2×2) point lookup operations to increase throughput (or match throughput of 32 way parallelism, for example) while saving memory space. For example, using per-memory bank address buses and associated logic and routing, parallel lookups of two points or 2×2 points (e.g., 4 points) may be executed with less memory usage. As such, a single lookup to a table may yield two points in two point lookup or four points in 2×2 point lookup. This may be accomplished based on the hardware setup—e.g., bank addresses, logic, routing, etc.—and the pattern of storage in memory that allows for reading out multiple data without bank conflicts. Without these features, as mentioned above, to achieve, e.g., 32 way parallel lookup, a table would need to be replicated 32 times. For example, this 32 way parallel lookup may be executed using the below C code:

```
for ( . . . ) {
    . . .
    entry1=dvlut_32h(table, idx); // get first entry in 32
        lanes
    entry2=dvlut_32h(table+32, idx); // get second entry in
        32 lanes, adding 32
        // to table pointer instead of adding
        // indices to save time
``` out=dvblend(entry1, entry2, frac); // double vector blend to get 32 outputs
...
}

In this example, the lookup portion of the loop may perform 32 lookups per cycle for two cycles (with lookup and blending executed in memory and vector math slots, respectively, and pipelined to two cycles per iteration), and interpolated to produce 32 outputs. The lookup/interpolation throughout is thus 16 outputs per cycle, and requires 32 time replication of the table.

Figures 6A, 6B:
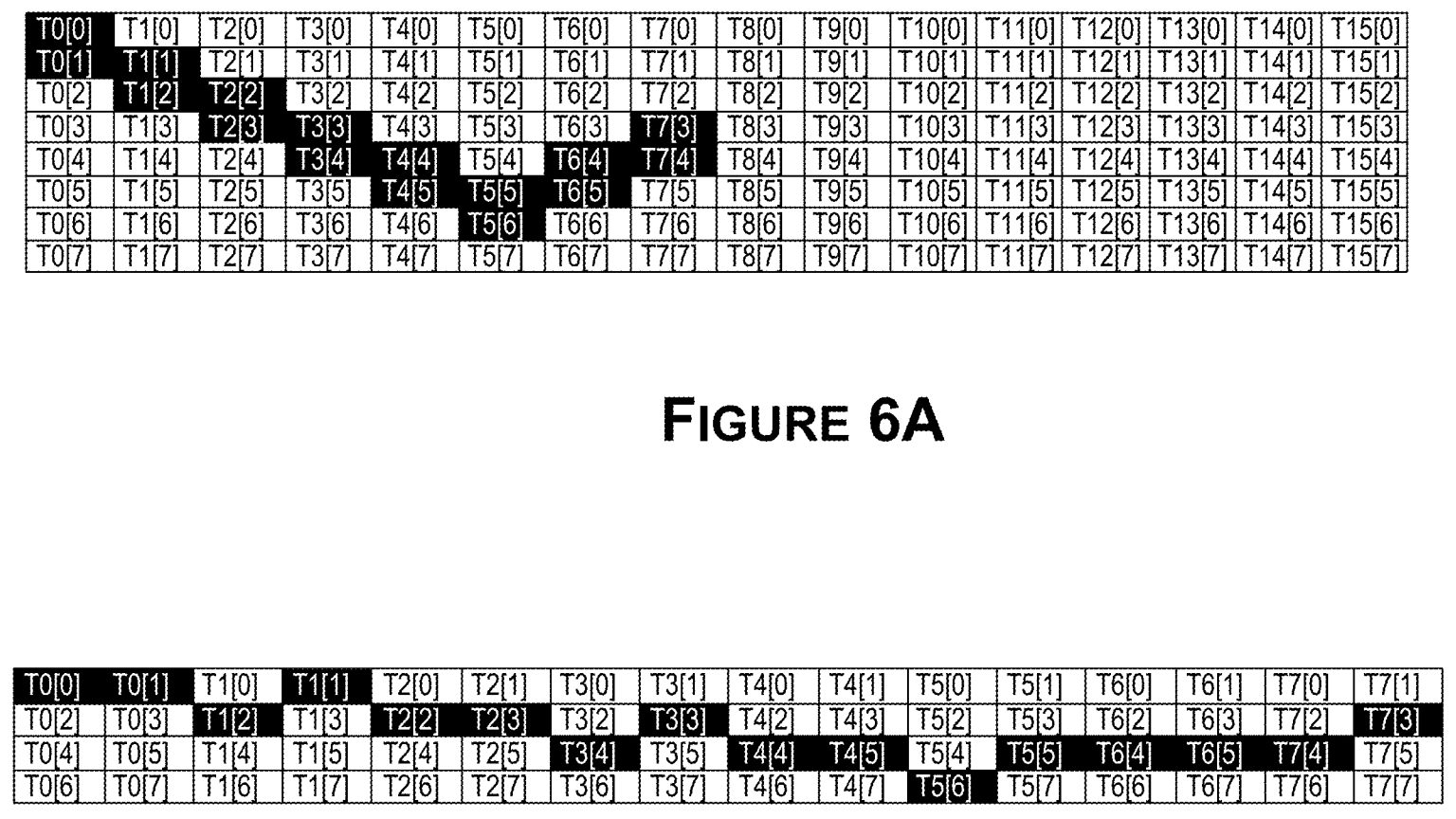

As a further example, and with respect to FIG. 6A, a 16-way parallel table organization is illustrated for performing a one point lookup with index vector {0, 1, 2, 3, 4, 5, 4, 3, . . . }. In such an example, using conventional architectures and memory layout techniques, the first lookup and a second lookup would need to be performed sequentially to read the two entries from each memory bank. For example, a first memory bank T0 includes values at T0[0] and T0[1] that are to be read out in the lookup operation, but because the values are both in a same memory bank, T0 (which may include only a single read port), the first value T0[0] is read in a first pass and the second value T0[1] is read in a second, sequential pass. With such a memory layout, if two reads were to take place in the same memory bank, a bank conflict would occur, which may introduce a delay in processing and/or cause an algorithm or other computation to be executed improperly.

However, using the architecture of the present disclosure, the same 32 lookups may require only 16 table replications for two point lookup or only 8 times for 2×2 point lookup. For example, with two point lookup, the same performance of 16 outputs per clock cycle may be achieved with only 16 time replication of the table, thus reducing the memory footprint by a factor of two. A 16 way parallel variant of the instruction may return a double vector, with first entries in a lower single vector, and second entries in a higher single vector. In C code, this 16 way parallel lookup and interpolation may be represented as below:

for ( . . . ) {
...
entry12=dvlut_2pt_16h(table, idx); // get first entry in 16 lower lanes,
// second entry in 16 upper lanes
out=vblend(entry12.lo, entry12.hi, frac.lo); // blend to get 16 outputs
...
}

In such an example, the lookup and interpolation portion of the loop may require only a single clock cycle (with lookup and blending executed in memory and vector math slots, respectively, and pipelined to one cycle per iteration), and interpolated to produce 16 outputs. Lookup/interpolation is thus 16 outputs per cycle. As an example, and with respect to FIG. 6B, an 8 way parallel table organization is illustrated for performing two point lookup with index vector {0, 1, 2, 3, 4, 5, 4, 3, . . . }. In such an example, because each memory bank, T0, T1, T2, and so on, includes only a single value to be read out during a lookup operation, all 16 values may be read out in a single pass, as opposed to the example of FIG. 6A where only 8 values may be read out in each of two passes due to the potential for bank conflicts. To do this, in embodiments, the instructions for the lookup may include a single index and a pattern which includes retrieving not only the index but the index plus one location as well. As such, the instructions may cause the read of the two values for two point lookup, and the values may be written to the lookup table in this format to allow this single read to be executed with no bank conflicts.

As an example, when performing vector operations, each lane of a VPU may process a set of pixel values that are retrieved from memory. In some instances, a lane may process multiple values from a same memory bank, which may result in a bank conflict, because the memory bank may include only a single read port. As such, the methods and systems of the present disclosure distribute the values across memory banks such that bank conflicts will not occur, and each of the values for a single processing lane of a VPU, for example, may access each corresponding value in a single read cycle.

In conventional systems, where 2D bilinear interpolated lookups are performed, four lookups (e.g., 2×2) are required for each output, allowing for an optimal throughput of 8 outputs per clock cycle with 32 copies of the table. With 2×2 point lookup, 8 outputs per cycle may be achieved with 8 time replication of the table (as compared to 32), thus reducing the memory footprint needed for parallel sub-tables by a factor of four. For example, with 2×2 point lookup, two entries may be read from one row of a 2D table and then 2 entries from a next row. To avoid memory bank conflicts within any memory bank, a line pitch in the 2D table may be constrained to m*k+2, where m is the number of entries in each sub-table stored horizontally, and k is any integer sufficient to store one row of the table. For an 8 way parallel 16 bit table, m=32 (16 bit memory words)/8 (parallelism)=4. For a 2 way parallel 32 bit table, m=16 (32 bit memory words)/2 (parallelism)=8.

Figures 6C, 6D:
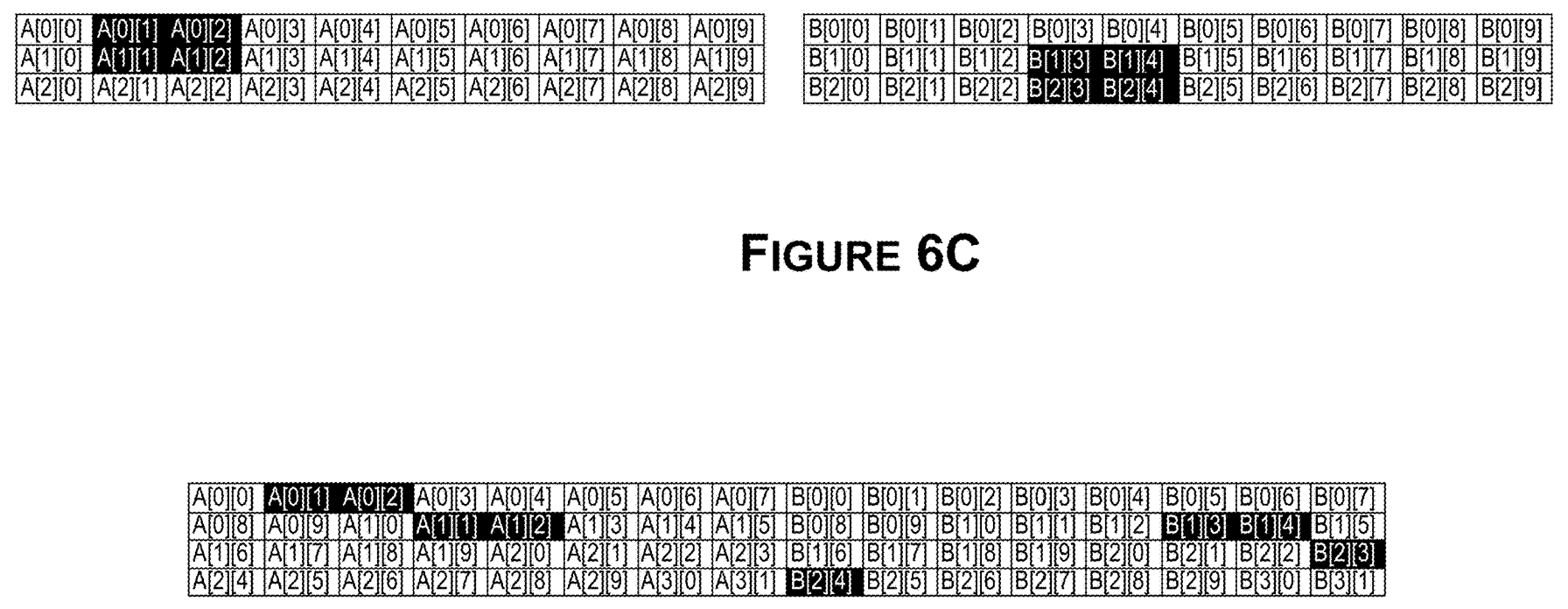

As an example, and with respect to FIG. 6C-6D, the line pitch constraint may be used to avoid memory contention. In such an example, a 2 way parallel word type table for 2×2 point lookup is illustrated, with a line pitch of 10. The number of consecutive elements in a subtable (m) is 8, with A[0][0 . . . 7] being placed consecutively in a subtable, complying with the formula of 8 k+2, where k may be any integer. As such, whichever index value is used to start, the 2×2 points to be retrieved may be placed in different banks, which is ensured by math. For example, bank numbers for the 2×2 points relative to the subtable are outlined below:

index % 8,
(index+1) % 8,
(index+line_pitch) % 8=(index+8 k+2) % 8=(index+2) % 8,
(index+line_pitch+1) % 8=(index+8 k+2+1) % 8=(index+3) % 8

Generally there are 4 entries to be retrieved with 2×2 lookup in bank numbers relative to the subtable being index % m, (index+1) % m, (index+2) % m, (index+3) % m). As long as m>=4, there should be no bank conflicts. In the example of FIGS. 6C-6D, the lookup may include 2D indices of (0, 1) and (1, 3), using Y then X as the convention to store pixels in row major order. In FIG. 6C, a logic view of two 2D tables is illustrated, and in FIG. 6D, a memory layout view of the values from the tables is illustrated. In the logical view, the lookups are 2×2, as illustrated, and the memory layout view illustrates the four points each in a different memory bank (or different column in the illustration), such that each of these values may be read out in a single cycle or pass. The values from the tables may be stored in memory in this way based on instructions that use indices (e.g., (0, 1) and (1, 3)) and a read pattern to read each of the values from the memory in a single pass. As such, using this memory layout and read instruction, four entries per sub-table may be returned in the following format at each cycle:

Destination lower single vector: A[0][1], A[0][2], B[1][3], B[1][4], (rest filled with zero)

Destination higher single vector: A[1][1], A[1][2], B[2][3], B[2][4], (rest filled with zero)

Although illustrated as two 2D tables of 10 elements wide by 3 tall—e.g., an A table and a B table—in FIG. 6C, this is not intended to be limiting, and the tables may be any width and/or height depending on the embodiment. Similarly, the memory layout in FIG. 6D includes a 16 element wide by 3 tall layout, but this is not intended to be limiting, and the memory width and/or height may be any configuration depending on the embodiment.

In some implementations, such as when sampling an image patch, interpolation between a fraction of a pixel may be executed. In some embodiments, to interpolate looked up values without additional instructions to manipulate data, a vector horizontal blending with interleaving (VHBlend_I) instruction may be executed, which may include horizontal blending with interleaving data to blend between lane pairs. For example, with this instruction, post-lookup bilinear interpolation may be executed in a same loop. This instruction may process each lane pair according to the layout of the table of FIG. 6E. In this way, the computations of Y0 and Y1 may be computed as below:

$$Y0 = x*(1-\text{alpha}0) + y*\text{alpha}0$$

$$Y1 = z*(1-\text{alpha}1) + w*\text{alpha}1$$

As such, the instruction may cause horizontal blending between lane pairs x and y, z and w, and may cause the outputs to be interleaved in the destination register. For example, the following C code segment may be used to achieve optimal performance on an 8 way parallel table using 2×2 point lookup.

```
for ( ... ) {
    ...
    entries1=dvlut_2x2pt_8h(table, idx.lo); // 8 indices→32 entries
    entries2=dvlut_2x2pt_8h(table, idx.hi); // 8 indices→32 entries
    y_intrp1=vhblend_i(entries1.lo, entries1.hi, x_frac.lo); // horz intrp 32→16
    y_intrp2=vhblend_i(entries2.lo, entries2.hi, x_frac.hi); // horz intrp 32→16
    out=vhblend_i(y_intrp1, y_intrp2, y_frac); // vert intrp 32→16
    vstore(out);
}
```

Figures 6E, 6F:
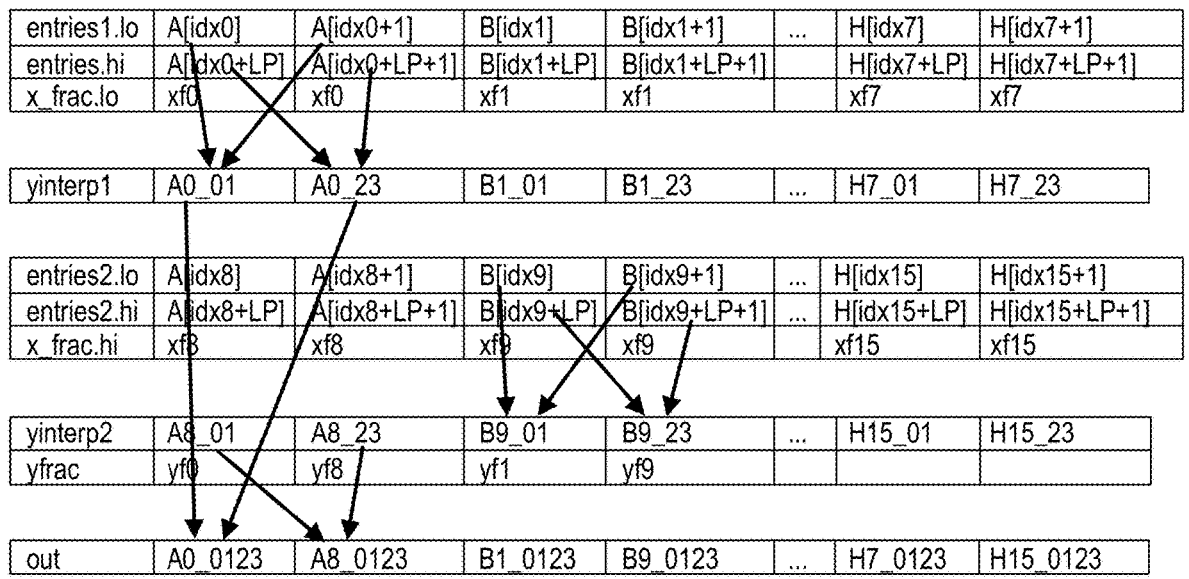
FIG. 6E illustrates a layout for processing lane pairs using a horizontal blending with interleaving data operation, in accordance with some embodiments of the present disclosure.
FIG. 6F illustrates intermediate and final outcomes of a horizontal blending with interleaving data operation, in accordance with some embodiments of the present disclosure.

In this 8 way parallel table organization, with sub-tables designated as A, B, . . . , H, a loop may perform lookup and interpolation resulting in 16 outputs per iteration. In such an example, inputs may be organized according to the below:

idx.lo={idx0, idx1, idx2, idx3, idx4, idx5, idx6, idx7, (rest ignored)} idx.hi={idx8, idx9, idx10, idx11, idx12, idx13, idx14, idx15, (rest ignored)} x_frac.lo={xf0, xf0, xf1, xf1, . . . , xf7, xf7} // note the repeat pattern x_frac.hi={xf8, xf8, xf9, xf9, . . . , xf15, xf15} // note the repeat pattern y_frac={yf0, xf8, yf1, yf9, . . . , yf15} // note the interleaving pattern An example illustration of the intermediate and final outcomes of this instruction are illustrated in FIG. 6F, which includes arrows indicating the blending and interleaving patterns of the data.

Now referring to FIG. 6G, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 600 may be executed by any one system, structure, or component, or any combination of systems, structures, or components, including, but not limited to, those described herein.

Figure 9A:
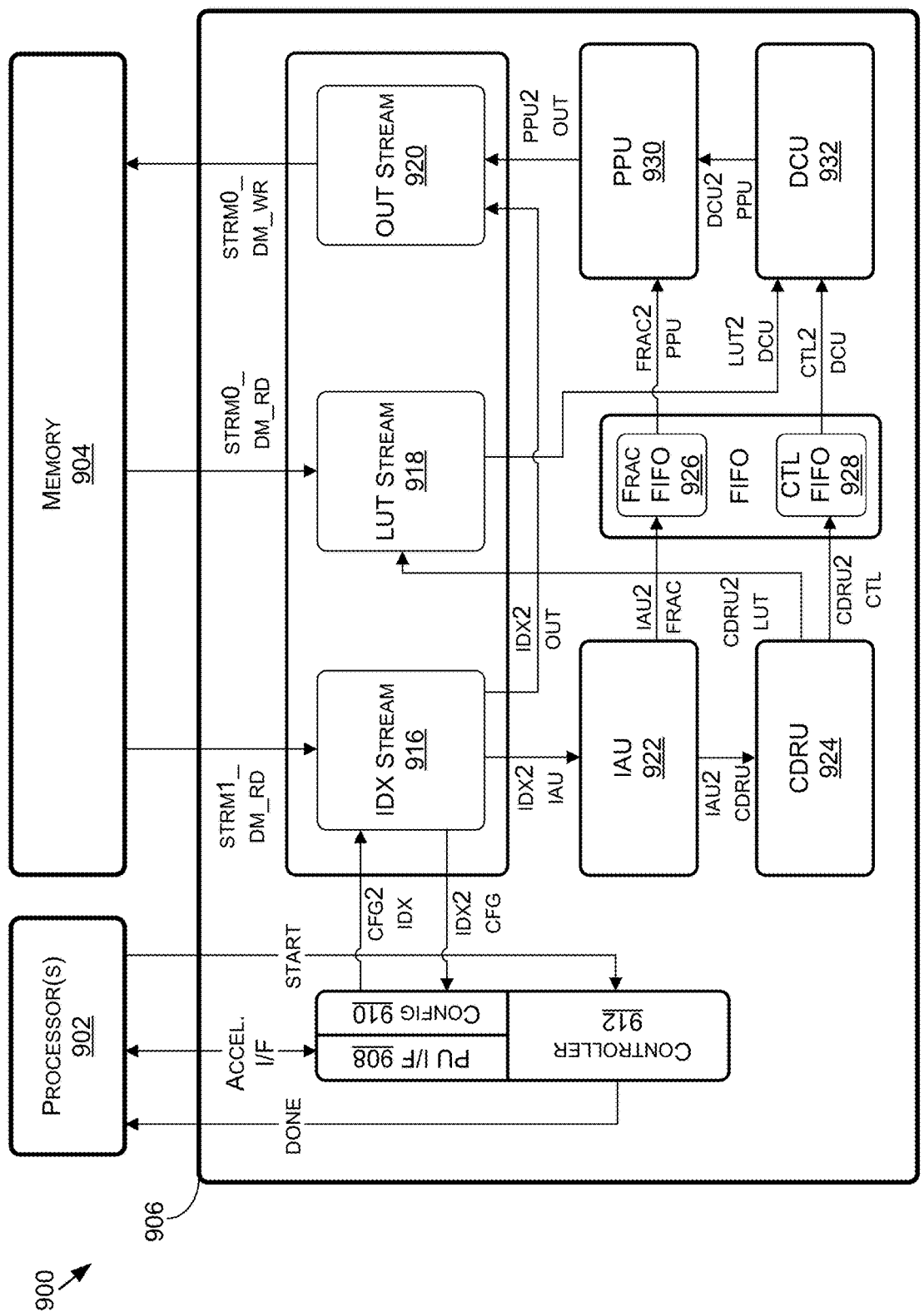
FIG. 9A illustrates a system including a decoupled lookup table accelerator, in accordance with some embodiments of the present disclosure.
Figure 9C:
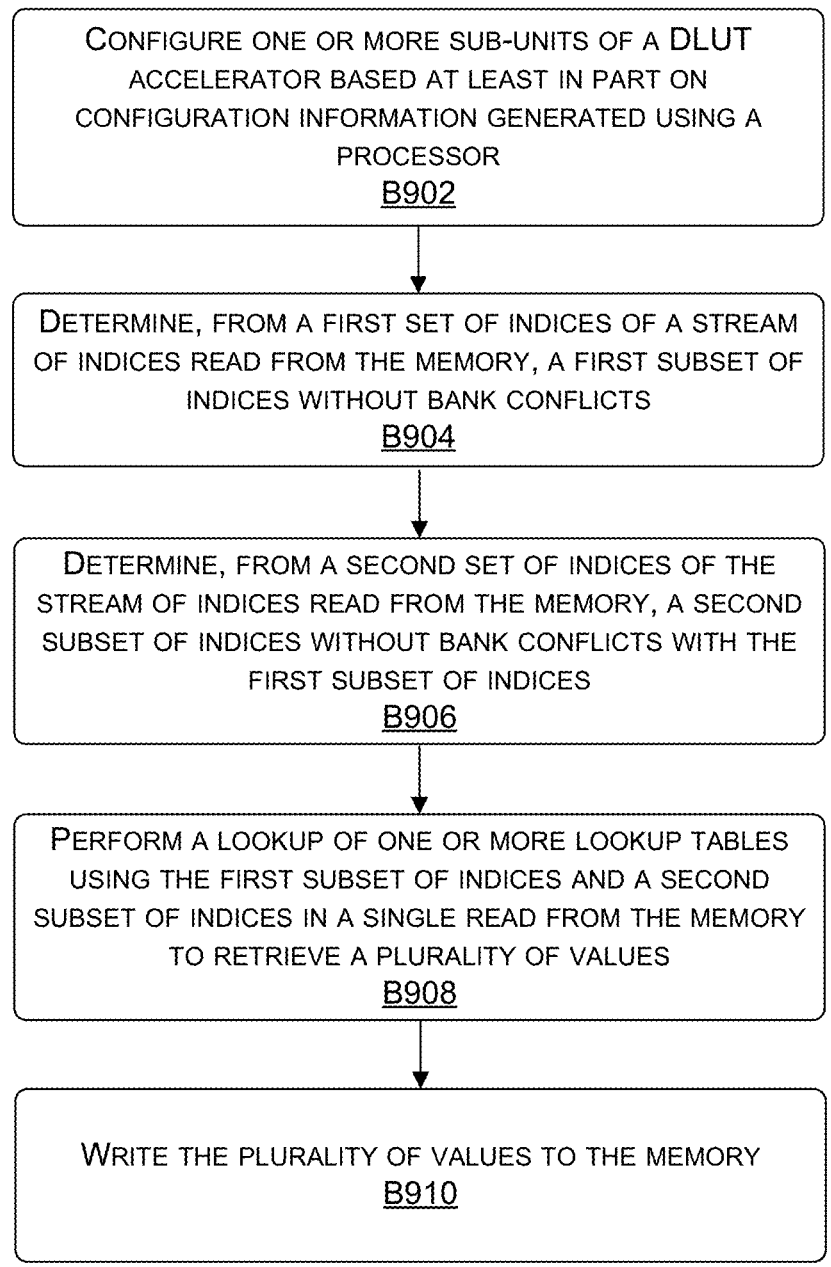
FIG. 9C is a flowchart for a method of using a decoupled lookup table accelerator to perform one or more operations, in accordance with some embodiments of the present disclosure.

FIG. 6G is a flow diagram showing a method 600 for performing multiple point lookup (e.g., in a single clock cycle in a decoupled lookup table (DLUT) accelerator, such as described with respect to FIGS. 9A-9C), in accordance with some embodiments of the present disclosure. The method 600, at block B602, includes replicating a table to memory to include a first value at a first physical address in a first memory bank and a second value at a second physical address in a second memory bank, the first value and the second value included in a same column in a logical memory view of the table. For example, a table may be replicated to memory any number of times to take advantage of memory access parallelism of a system. The table may include a first value at first logical address and a second value at a second logic address in a same column as the first value which, if stored to memory in this configuration, may result in bank conflicts as the two values may be stored to a same memory bank. As such, when replicating the table to memory, the write instructions may write the first value to a first physical address that is adjacent—e.g., in another memory bank—as a second value such that the two values may be retrieved in a same cycle.

The method 600, at block B604, includes determining a first index corresponding to the first physical address in memory. For example, a read operation may use an index indicating a first location in memory to begin reading values from.

The method 600, at block B606, includes, based at least in part on a read instruction corresponding to a multi-point lookup, reading the first value located at the first physical address and the second value at the second physical address during a single cycle. For example, when replicating a table to memory, the table may be replicated such that pairs of points that are in a same column or a table (e.g., corresponding to pixels in a same column of pixels) are stored in separate memory banks. As such, using a read instruction for two point lookup that uses an index of a first point of the pair of points to cause the first point and an adjacent, second point stored in a different memory bank to be read, the first value and the second value may be read in single cycle from a first memory bank storing the first value and a second memory banks storing the second value. This operation may be performed for each pair of values in each replicated table to produce a high vector including the first values from each table and a low vector including the second values from each table, and these vectors may be used as vector registers in a VPU, in addition to an instruction (e.g., interpolation, etc.) to generate outputs.

The method 600, at block B608, includes performing one or more operations using the first value and the second value. For example, the first value and the second value may be loaded to one or more lanes of a VPU, and a square root, log, sine, and cosine function may be executed, linear or bilinear interpolation may be executed, and/or another operation type may be executed. Where interpolation is performed, and a table is replicated 16 times, as an example, 16 two point lookup operations may take place to produce 32 values—2 values for each vector lane of a VPU—and interpolation may be executed on each lane to output 16 results. As such, 16 interpolated outputs may be produced per cycle using only 16 time replication of a table. This may be the result of using two point lookup, as the table including the values may only need to be replicated half as many times (e.g., 16 times instead of 32) as in traditional single point lookup operations to allow for a same 32 value throughput with half the memory footprint.

Per Memory Bank Load Caches in Vector Memory

In a conventional processor, a data cache may have a width of, for example, 32 bytes per cache line. A cache line is a unit of data that hardware keeps track of. For example, the hardware may keep track of the cache lines usage information in tag memory, including the full system address, whether the cache line has been written, when the cache line was last read relative to other cache lines to determine when to evict the cache line, etc. In some implementations, the data cache is the local memory, or part of the local memory, to map a larger data structure stored in external memory temporarily to the local memory such that the data can be processed without suffering long memory latency of processing external memory directly. In conventional desktop or laptop computers, data caches of this type are often employed.

A programmable vision accelerator and/or VPU, as non-limiting examples, include an embedded processor intended for running a smaller set of highly optimized code. In such processor types, data caches may not be implemented as programmers may manage contents in the local data memory. Systems and methods of the present disclosure may include local memory managed by a programmer instead of being cached, but may also include an added data caching capability in one or more—e.g., each—memory banks. The data caches may be narrow, such as, without limitation, 16 bits wide, as compared to more conventional data caches that include 32 bytes, for example. The data caches may be used to reduce power consumption primarily, as opposed to the primary goal of traditional data caches which is to reduce latency.

In computer vision processing, for example, data access patterns often have a degree of locality (e.g., staying in some neighborhood for some time before moving to the next neighborhood). For example, when performing 7×7 2D filtering using the VFilt4HHW instruction described herein (which computes 4 taps at a time), the data read stream may read from a neighborhood for three memory reads, and then move to another neighborhood and read three more times, and so on. In the coefficient read of the operation, a same array of zero padded values may be used (e.g., 7*2*4=56 halfwords), advancing four halfwords at a time until the last group of 4 halfwords are read, and then starting back from the beginning of the 56 halfword array again, until the filtering kernel is completed.

As such, to take advantage of these local access patterns and to reduce power consumption due to memory accesses, load data caching in each memory bank with two way set associativity (holding, e.g., a total of 64 halfwords) may be implemented. When the load cache is enabled, the most recently read sets (e.g., most recent, two most recent, three most recent, etc.) of read data may be recorded in the cache, as well as the row addresses and most recently read entry in the tag memory. As a result, when the same memory address is read again, a cache hit may be present, and the cache may furnish the data instead of requiring the data to be read again from local memory. In embodiments, the load cache may be situated between memory logging logic and the memory itself, such that whenever there is a cache hit, the memory read for that particular address or value will be stopped, or will not take place, in order to conserve power.

Using this cache structure, and with respect to the 7×7 2D filtering example above, the load cache may allow the system to skip almost two thirds of the data reads and almost all of the coefficient reads in steady state. An illustration of the use of the data cache in each bank is illustrated in FIGS. 7A-7C. For example, a VFilt4HHW instruction may carry out 4-tap of a potentially larger filtering task, and may consume two single halfword vectors of data—e.g., data [0-15] and data [4-19]—and one single halfword vector of coefficients—e.g., coef [0-3]—repeated four times to fill the 16-element single vector. In a 7×7 2D filter implementation using VFilt4HHW instruction in both vector math slots, the elements of data and coefficient arrays of FIG. 7A may be used. Since the VPU of the present disclosure may be configured to read a double vector, data[y][0-15] and data [y][16-31] may be read as a double vector. Similarly, data [y][4-19] and data[y][20-35], and data[y][8-23] and data[y] [24-39] may be read as double vectors. As such, the data and coefficient read patterns may correspond to those of FIGS. 7B-7C, respectively, assuming a line pitch for the data is 100, and the line pitch for the coefficients is 8.

FIG. 7D illustrates memory bank organization. For example, 2-entry fully associative caching retains two locations worth of data in any superbank, and data and coefficients may be placed into different superbanks to allow caching to work effectively. In coefficient reads, banks 0-3 may first retain coefficient elements 0-3, adding elements 32-35, and then reading elements 64-67 would evict elements 0-3, which are to be read again in a next coefficient read as the pattern is repeated. In steady-state with load cache enabled, only four banks may be read from for each sweep of the coefficient read pattern. As a result, the memory bank read savings by using a load cache for data may be (3*32−(32+4+4))/(3*32)=58.3% and for coef may be (14*16−4)/(14*16)=98.2%.

As such, in certain algorithms—such as computer vision algorithms with sliding windows—the load cache may be useful in conserving power. For example, without a load cache, each bank would need to be read at each cycle, even though much of the data is the same. In an example where 512 bits are read out at each iteration, the first 512 bits may be read out, and then another 512 may be read out, and so on. If the sliding window is only 8 bytes, for example, then only 64 bits are new at each iteration and the remaining 448 bits are the same. Without a data cache, these 448 bits would need to be read out of the data banks again. However, using a data cache for each memory bank, these 448 bits may be pulled from the load cache and only the 64 new bits would need to read out of the other memory banks. As such, the power required to read the 448 bits from the memory banks is saved. Examples of algorithms that may benefit from the use of load caches are spatial filtering operations, deep learning inference operations (such as convolutional operations), and/or the like.

Figure 7E:
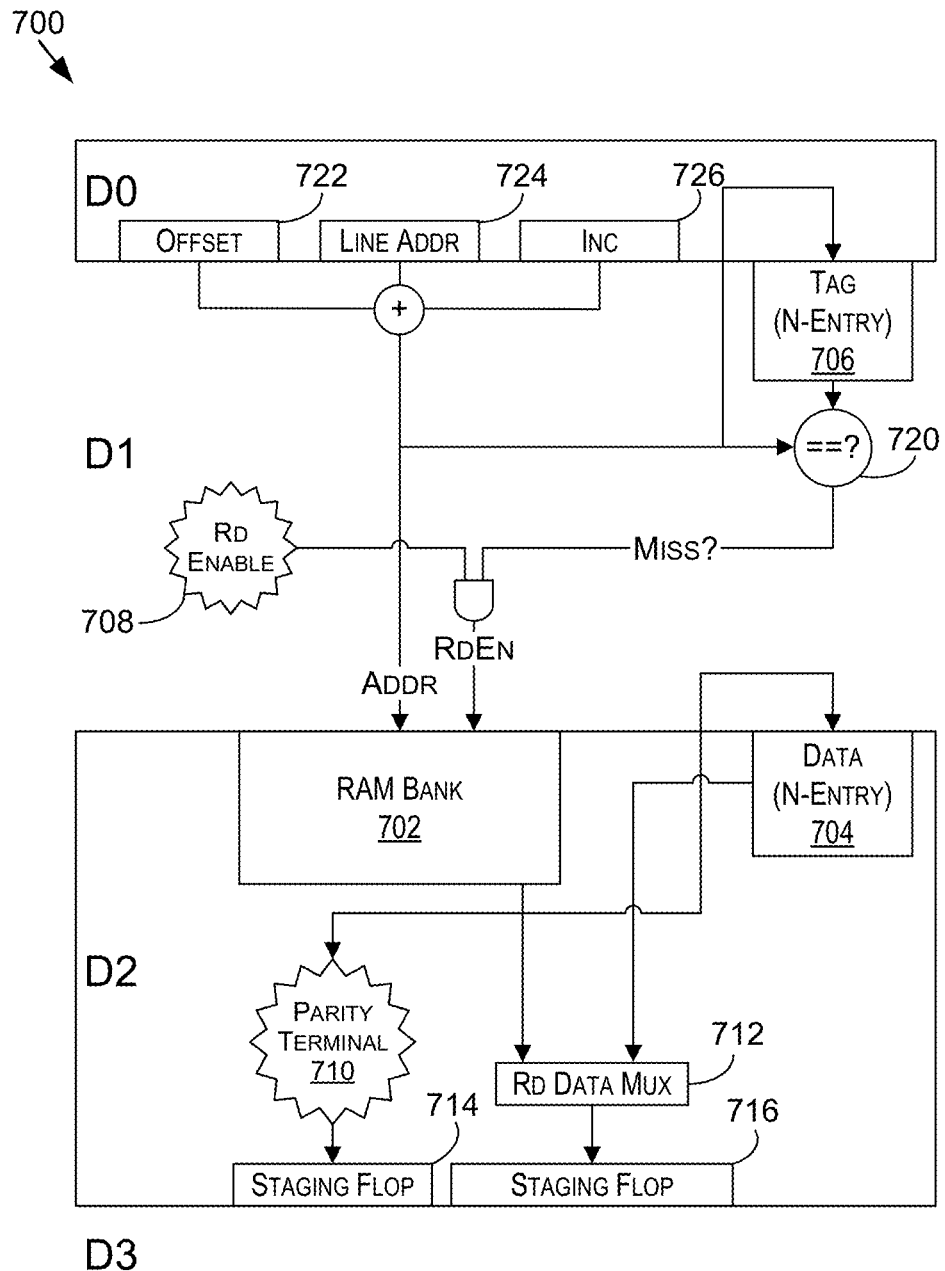
FIG. 7E illustrates a hardware architecture for using data caches in memory banks, in accordance with some embodiments of the present disclosure.

With respect to FIG. 7E, hardware architecture or logic for a memory bank with a load cache is illustrated. For example, for unaligned access support in memory (e.g., vector memory (VMEM)), sliding window data accesses may be accelerated. This is a key memory access pattern for many computer vision algorithms, including filtering and convolution. For sliding window vector loads, most of the data from random access memory (RAM) banks 702 remains the same. In such an example, only 4B of data changes in a 64B vector load when sliding by 4B, so only 4B worth of new data is read from the RAM banks 702. To optimize power for VMEM RAMs, a tiny cache called a "load cache" may be attached to each bank for each superbank—so a total of 3 superbanks×32 banks=96 load caches for each VMEM. The configuration of each of the load caches may, in non-limiting embodiments, include a two line (2×2B=4B) capacity, full associativity, and a pseudo least recently used (pLRU) replacement policy.

Where the data caches store latest accesses is split into two parts—a tag storage 706 and a data storage 704. In tag storage 706, the cached addresses and control information corresponding to previous accesses may be stored, and in data storage 704, the data from the previous accesses may be stored. The control information in the tag storage 706 may include a valid flag (e.g., whether the entry is valid), dirty flag (e.g., whether the entry has been modified and needs to be written back to memory), and/or a last use flag (e.g., to indicate which entry to replace if an entry is to be replaced, with a least recently used policy). Because the cache is a load cache, write data may not update the cache, but the valid and last use flags may be included in the tag storage 706. The valid flag or bit may be used to qualify address matching, and any write should invalidate the entry. With every access, the last use flag may be updated.

As described herein, for the caching scheme to be effective, the storage capability of the load cache is much smaller than that of the memory or RAM bank 702, in order to reduce access times and to save power. In one embodiment, each load cache may correspond to a single RAM bank 702, the RAM banks 702 may each be 2048×16 bit memory, and the load caches may each be 2×16 bits of data storage 704 with 23 bits of tag storage 706 (e.g., 2 entries×(11 bit address+1 bit valid)+1 bit last use)).

In operation, offset 722, line address 724, and increment 726 may be used to generate a memory address for a memory access. This memory address may be tapped off to compare with the tag storage 706—e.g., to compare with some number of prior access addresses (e.g., 2 prior accesses). The arrow into the top of the tag storage 706 may represent the memory address. In some embodiments, the entire memory address may be used by tag storage 706 to compare to the stored memory addresses from the prior access(es). In other embodiments, a subset of address bits from the memory address may be used to address a subset of the tags, so only a subset of the tags are compared to the memory address. For example, where a larger number of prior access tags are stored in tag storage 706, only a subset of the tags may be compared against using a subset of the memory address bits to reduce area and save power. In load cache designs with less tags—such as tags corresponding to two prior accesses—the entire tag of prior entries may be compared to the entire memory address. The "==?" decision block 720 compares the current memory address for the RAM bank 702 with the addresses stored in the tag storage 706. When there is a miss (e.g., a tag and memory address don't match), the reading of the RAM bank 702 may be enabled using read enable 708, and read data multiplexer (rd data mux) 712, the RAM bank 702 may be selected and read out to send to staging flop 716. When there is a hit (e.g., a tag and memory address match), the data storage 704 may be addressed with a 0 or 1 (in embodiments with two entries) to indicate which prior access the hit corresponds to. The corresponding entry in the data memory may be sent through the rd data mux 712 and to the staging flop 716. The staging flop 716 may return the read-back data to the processor pipeline, to be routed eventually to a destination scalar or vector register of the load instruction.

Staging flop 714 may correspond to parity checking. For example, large enough memories may be required to have parity bits (e.g., in a parity terminal 710) to allow error detection and/or error correction. In the memory (e.g., VMEM), error detection may be used, and/or error correction logic may be implemented on the read-back data.

As such, the load cache may include tag bits in tag storage 706 for way0 and way1, each of which may include 11 bits of address and a 1 bit valid bit. The load cache may further include a 1 bit pLRU, and data bits in data storage 704 for way0 and way1 that each include 16 bits of data and 2 bits of parity. The load caches, when enabled, may be looked up in the D1 stage. To minimize power consumption, only the load cache for the RAM banks 702 that are participating in a load may be enabled. For example, for a single vector load only 16 of the 32 load caches may be looked up. On a load hit (e.g., where the load cache includes the data to be accessed), read enable for a given RAM bank 702 may be suppressed thus preventing lighting up of the RAM bank 702. pLRU 720 may also be updated at the D1 stage. In the D2 stage, the data and the parity bits may be read from the load cache hit way and multiplexed with the RAM result.

On a load cache miss, in D1 stage, in the victim way, an existing entry to be evicted to make room for a new entry may be determined based on the valid bits and the pLRU. The tag for the victim way may then be updated with the miss address and the read enable 708 for the RAM bank 702 may not be suppressed. In the D2 stage, the data/parity from the RAM bank 702 is not only sent to the read data crossbar, but also to fill the data into the evicted cache line. Stores may also lookup the load caches when enabled and participating. A store hit may cause the hit way to be invalidated, and store misses may be ignored.

On a hit in the load cache, the power to read the RAM banks 702 is saved. A miss in the load cache, on the other hand, not only incurs the power from reading the RAM banks 702, but also burns power to lookup the load cache to fill the victim way. Since not all types of memory access patterns get high hit rates in load cache—especially when accessing the superbank in indexed addressing modes—only vector linear loads may be looked up in the load caches.

All stores may be looked up in the load cache, when enabled, to ensure load caches are never out of sync with the data in the, e.g., VMEM RAM banks 702. For applications that expect low hit rates for load caches for a given superbank, software may be used to disable the load caches for the RAM banks 702 for that superbank to minimize store lookup power, as described in more detail below.

For example, in some embodiments, the use of the data cache may not provide a benefit. For example, in operations where access patterns are not repetitive, the data cache may not be useful, so performing an extra task of checking the cache prior to a read may waste time and/or energy, as the data banks may need to be read to access the proper data. As such, load caching may be enabled or disabled, thereby reducing the power penalty due to access patterns where the load cache miss rate is high, but also allowing for the use of the load cache for access patterns where the data cache can be used to save power. In some embodiments, the enable or disable may be programmed using application code, so the programmer may program the code to enable the data cache when desired and to disable the data cache when not desired. In other embodiments, the enable or disable may be executed by hardware analyzing the read patterns and detecting an overlapping pattern. For example, for a threshold amount of overlap between successive read operations, the hardware may enable the load cache. However, where the overlap is less than the threshold(s), the load caches may be disabled. The threshold may be, as non-limiting examples, 25%, 40%, 50%, 75%, or a different threshold amount of overlap between reads.

When the load caches are disabled, and with respect to FIG. 7E, the tag storage 706 may not be accessed, and the read enable 708 may be set such that reads to the RAM bank 702 are enabled for each read. Similarly, the data storage 704 may not be accessed, and the read data mux 712 may always pass the RAM bank 702 data through to the staging flop 716.

Further, in some embodiments, the memory bank structure may include a plurality of superbanks—e.g., three superbanks—and the individual superbanks may have the load caches enabled or disabled depending on the particular access patterns within each superbank. For example, where three superbanks are used, each superbank may include 32 RAM memory banks, and the data cache for each memory bank may include two entries where each entry is one word, so 16 bits. Where two or more superbanks are used, the superbanks may be of any size, different sizes, a same size, or a combination thereof. For example, a first superbank may be 128 KB, a second superbank may be 256 KB, and a third superbank may be 512 KB.

Figure 7F:
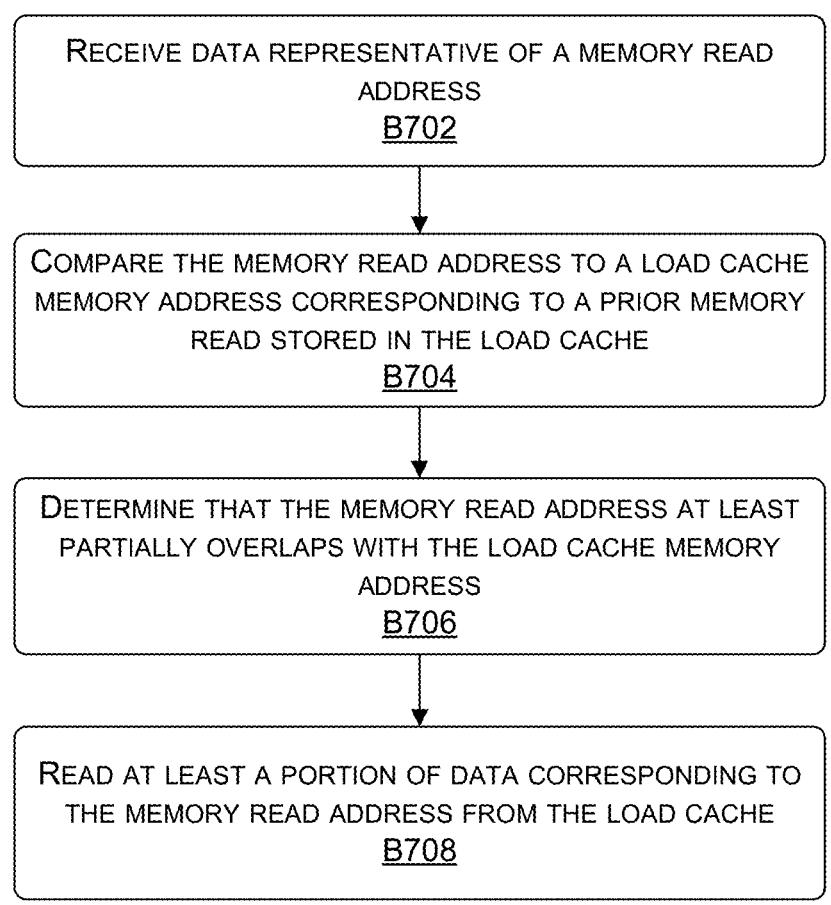
FIG. 7F is a flow diagram for a method of using data caches for memory banks, in accordance with some embodiments of the present disclosure.

Now referring to FIG. 7F, each block of method 750, described herein, comprises a computing process that may be performed using any combination of hardware, firmware, and/or software. For instance, various functions may be carried out by a processor executing instructions stored in memory. The method 750 may also be embodied as computer-usable instructions stored on computer storage media. The method 750 may be provided by a standalone application, a service or hosted service (standalone or in combination with another hosted service), or a plug-in to another product, to name a few. In addition, method 750 may be executed by any one system, structure, or component, or any combination of systems, structures, or components, including, but not limited to, those described herein.

FIG. 7F is a flow diagram showing a method 750 for using data caches for read operations, in accordance with some embodiments of the present disclosure. The method 750, at block B702, includes receiving data representative of a memory read address. For example, after a first read operation using some number of memory banks, a second read operation may be executed that includes one or more of the memory banks in addition to one or more additional or other memory banks. Because the first read operation may have included storing the outputs of the read in the data cache corresponding to each respective memory bank, these values may be reused instead of requiring another read of the memory bank. As such, the memory read address may be received corresponding to a next read operation, and the load caches—when enabled—may be accessed to determine if any of the data is stored in the load caches.

The method 750, at block B704, includes comparing the memory read address to a load cache memory address corresponding to a prior memory read stored in the load cache. For example, after a prior memory read, the data from the memory read may be stored in the load cache corresponding to the particular RAM bank 702. To memorialize this information, the tag storage 706 may include the memory address corresponding to one or more prior reads from the RAM bank 702.

The method 750, at block B706, includes determining that the memory read address at least partially overlaps with the load cache memory address. For example, the memory read address may be compared to the prior memory read address of a prior read as stored in the tag storage 706. If there is a hit, the load cache may be used to read out at least some of the data corresponding to the memory read address for the current memory read.

The method 750, at block B708, includes reading at least a portion of data corresponding to the memory read address from the load cache. For example, due to the hit in the load cache as determined from the tag storage 706, at the portion of the data from the overlapping memory addresses may be read out of the load cache, and the remainder of the data—if any—may be read out of the RAM bank 702.

Decoupled Configurable Accelerators

To optimize performance of processors for specific applications—such as real-time applications—an instruction set architecture (ISA) may be enhanced to create custom instructions to accelerate commonly occurring operations. This allows the processor to reduce the number of cycles needed to execute a particular task. The process of customizing an ISA is performed until performance goals of the system are met. However, these new instructions are added to operate on data either in the processor register file or directly as memory as an operand, which are executed using the existing processor controller as well as the existing memory addressing and access hardware. In such examples, it is desirable that the new instructions fit within the processor's register file read/write operand counts (e.g., to reuse existing ports), fit within the register file width (e.g., to fit within the processor data types), and fit within the processor pipeline stages. Due to these requirements for successful addition of instructions to the ISA, the amount of flexibility for adding new instructions is limited. In addition, when creating an ISA for processing pipelines that are many stages (e.g., 30, 40, 50, etc. stages), the ISA becomes complex to configure.

Moreover, processors provide a high degree of flexibility at the expense of power dissipation—since every added instruction requires fetching, decoding/dispatching, reading from/writing to register files and/or memory, and so on. As such, adding additional function units to implement these custom instructions adds pressure on register file read/write ports, which results in an increase in required area (e.g., additional read/write ports may be required) and power (e.g., extra loading on register files may be realized). Also, processing pipelines for embedded application generally have multiple stages—where output from one stage feeds the input to a next stage. Techniques like executing multiple threads (e.g., for different processing stages) in a processor can reduce extension time thereby providing decreased latency. However, multithreading comes at the expense of hardware—having to fetch/decode/dispatch instructions from multiple threads, keep the state information (e.g., in register files) for each of the states of each thread, as well as include control logic to handle multiple threads in the processor. This results in increased area and power requirements while making the processor more complex to verify and program. As such, although various methods exist for decreasing latency in processing pipelines, the existing methods require additional surface area for the processor hardware, require additional power consumption due to the additional hardware, and increase the complexity of programming the processors to execute the various tasks.

To account for the limitations of primary processor configurations, and the deficiencies of a multi-threaded processor, the systems and methods of the present disclosure use one or more units of a primary or main processor—such as a single-threaded processor like a VPU—in addition to domain specific accelerators or co-processors that are decoupled from the main processor and communicate with the main processor through shared memory—such as vector memory (VMEM). As such, the accelerators may operate as sub-units of the main processor(s), but instead of requiring processor instructions to execute, once configured, the accelerators may execute independent of the instructions of the main processor(s). For example, accelerator access instructions may be used to allow the main processor(s) to configure and sequence the accelerators, and the shared memory may allow inter-stage data structures to be shared between the main processor(s) and the accelerator(s). Once the main processor(s) kicks off or starts the accelerator (e.g., via a common accelerator interface, and using one or more load/store instructions), the main processor(s) is free to either process a different stage (thereby providing the ability to work on multiple stages of a processing pipeline simultaneously with reduced run time) or transition to a low or lowest power state waiting for the accelerator(s) to complete processing (e.g., to minimize the use of power when not actively processing). As such, once configured by the main processor(s), each of the one or more accelerators may operate independently and concurrently with the main processor(s). The main processor(s) and the accelerator(s) may synchronize via a handshake interface during processing, so that the main processor(s) is aware of when the accelerator(s) has finished processing and/or is ready for a new task, or vice versa. The shared memory may store configuration messages (e.g., for configuring the accelerator(s) when the configuration instructions are not as efficiently sent via the accelerator interface due to size constraints), input buffers (e.g., to store the data for processing by the accelerator(s)), and/or output results for the accelerator(s) (e.g., after processing is complete, the data from, e.g., register files, of the accelerator(s) may be stored back to shared memory at a location indicated in the configuration instructions from the main processor(s)). Thus, once triggered, the accelerator(s) may read from the shared memory for configuration parameters and/or input data structures, and may write to shared memory the output result data structures.

As a result, this combined system of main processor(s), shared memory, and decoupled accelerator(s) allows for the flexibility of the programmable main processor(s) while achieving power consumption levels of fixed function hardware (e.g., since high computational processing stages of a processing pipeline may be implemented as accelerators), without requiring substantial increases in the complexity of the main processor(s) (e.g., because the main processor(s) may only require additional accelerator configuration or access instructions to program the accelerator(s)). For example, the pipeline and data types (e.g., data widths) of the accelerator(s) may be independent of those of the main processor(s), allowing for further customization and optimization that may not be possible with a main processor(s) alone that requires instructions to fit within the processor's register file read/write operand counts, register file width, and pipeline stages.

In some embodiments, the accelerator(s) and the main processor(s) may be coupled at instruction execution in order to realize some of the power saving of an accelerator while coupling the execution to the main processor pipeline. However, in such embodiments, the ability to concurrently process different stages of a pipeline would be reduced, as the instructions would be interleaved between the accelerator(s) and the main processor(s). In one or more embodiments, instead of being connected via a shared memory, the accelerator(s) and the main processor(s) may be coupled through a higher level second level (L2) memory. However, in such embodiments, the higher level of decoupling (e.g., removing the coupling through shared memory to a higher level) may increase communication overhead with the main processor(s).

The decoupled accelerators may be used for any task within any domain, such as, for non-limiting examples, performing 1D, 2D, etc. lookups as a decoupled lookup table accelerator to detect and resolve bank conflicts, perform 1D/2D interpolation, and/or the like, for computer vision algorithms such as feature tracking, object tracking, image warping, pyramid creation, and/or the like, for sensor processing such as matrix multiplication or other operations on LiDAR data, RADAR data, and/or the like, and/or for machine learning or deep learning applications. As such, the topology described herein may be applied to any processing pipeline where a portion of the processing can be offloaded to an accelerator.

Depending on the implementation, there may be any number of decoupled accelerators on a chip(s) that communicate with a main processor(s) via shared memory. For example, a system on chip (SoC) or other integrated circuit (IC) may include the main processor(s) and one or more accelerators, and programmers may be aware of the various accelerators and write instructions or code that use the accelerators that may increase performance for any of various tasks of the system. Although the main processor(s) is described primarily as a VPU, this is not intended to be limiting, and the main processor may include any processor type, such as a CPU, GPU, DPU, or other processor, without departing from the scope of the present disclosure.

Figure 8A:
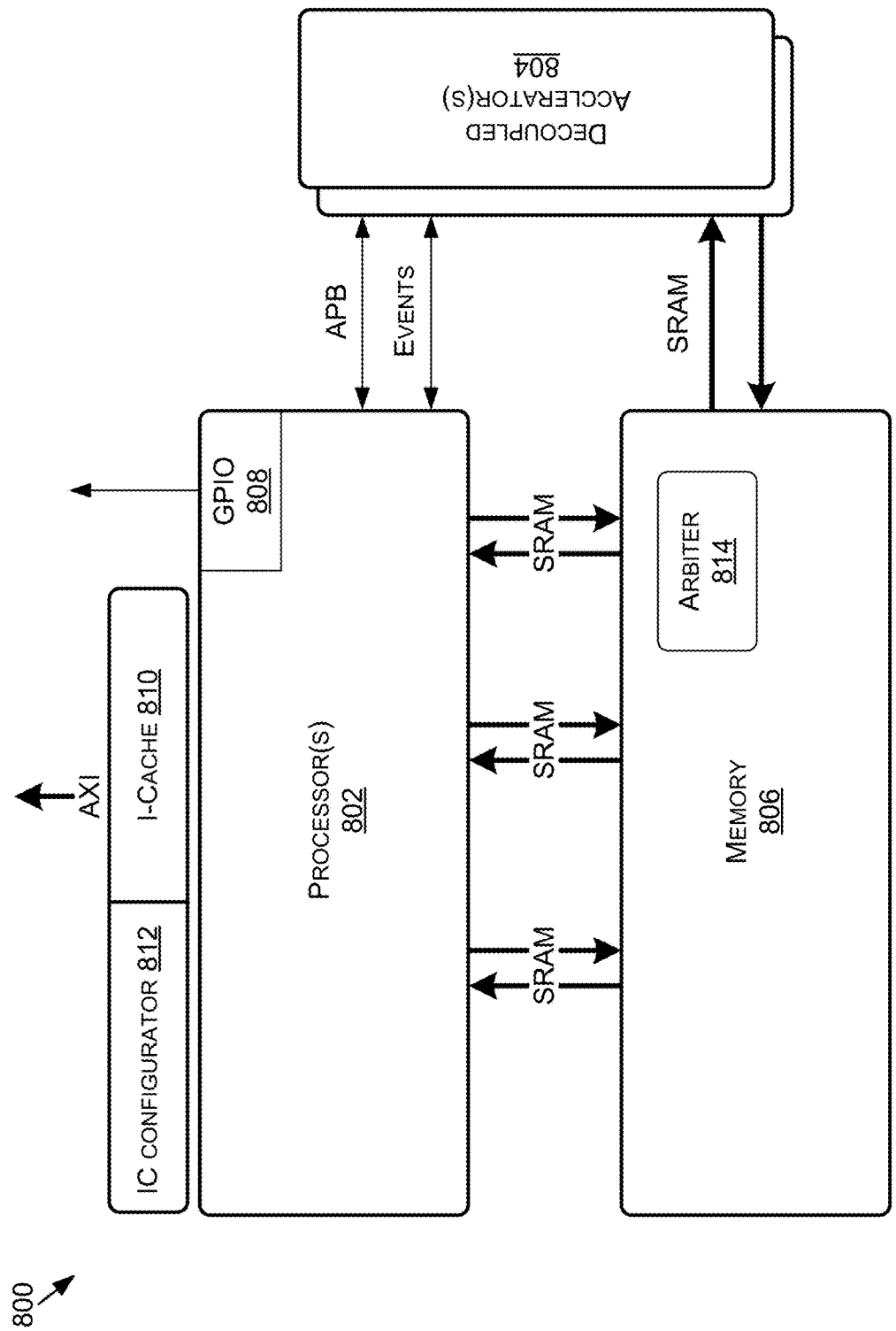
FIG. 8A illustrates a system including one or more decoupled accelerators, in accordance with some embodiments of the present disclosure.

Now referring to FIG. 8A, FIG. 8A illustrates a system 800 including one or more decoupled accelerators, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 800 may be included in, and/or may include similar components, features, and/or functionality to that of example autonomous vehicle 1300 of FIGS. 13A-13D, example computing device 1400 of FIG. 14, and/or example data center 1500 of FIG. 15.

The system 800 may include a processor(s) 802 (e.g., a main processor), such as a VPU, CPU, GPU, DPU, etc., a decoupled accelerator(s) 804, and/or shared memory 806 (e.g., vector memory, or VMEM). The processor(s) 802 may be coupled to an instruction cache (I-cache) 810 that may cache instructions for the processor(s) 802 to execute. The processor(s) 802 may include a general purpose input/output (GPIO) 808 (e.g., a digital signal pin on the IC which may be used as input, output, or both, and may be controllable at runtime), and an IC configurator 812. In some embodiments, as illustrated, the processor(s) 802 may communicate on-chip using an advanced extensible interface (AXI), such as, without limitation, a 256 bit AXI interface. IC configurator 812 may be used to configure the system 800.

The processor(s) 802 may communicate with the decoupled accelerator(s) 804 directly—e.g., via a co-processor or accelerator interface, such as an advanced peripheral bus (APB) interface, and/or a handshake, programming, or event interface. For example, the processor(s) 802 may configure the accelerator(s) 804 using the accelerator interface (or configuration bus), kick off or trigger processing of the accelerator(s) 804 using the event interface, and synchronize with the accelerator(s) 804 using the handshake or event interface. As such, each accelerator 804 may include a mechanism to be configured to communication with the processor(s) 802 through a respective accelerator interface or configuration bus. For example, when processing is complete, the accelerator(s) 804 may indicate the same to the processor(s) 802 via the handshake mechanism, or when the processor(s) 802 is waiting for the accelerator(s) 804 to finish processing, the processor(s) 802 may poll the accelerator(s) 804 periodically to request a status or end time. In some embodiments, the accelerator interface may include a 32 bit interface (or other smaller size interface) such that configuration instructions may be transmitted to the accelerator(s) 804. However, in some embodiments, the configuration message(s) may be large (e.g., greater than 32 bits, or some multiple thereof), and the configuration message(s) may instead be stored in shared memory 806, and the location of the configuration information in the memory 806 may be sent via the accelerator interface to the accelerator(s) 804 to indicate where to retrieve the configuration information.

The configuration bus may thus configure the accelerator(s) 804, and the event (or programming interface) may be used to allow the processor(s) 802 to trigger or start processing by the accelerator(s) 804. Once triggered or kicked off, the accelerator(s) 804 may operate on its own with the processor(s) 802 waiting for the processing to be completed and/or performing a different processing task or stage. For example, an application programmer may program the processor(s) 802 and the accelerator(s) 804 with knowledge of what each is capable of, so that the application program may be split into parts—some parts for the processor(s) 802 and some parts for the accelerator(s) 804. The processing may thus be executed in parallel, in embodiments, between the processor(s) 802 and the accelerator(s) 804 to decrease runtime and increase efficiency. A configuration message—shared via the accelerator interface and/or via shared memory 806—may be generated by the processor(s) 802 and used to indicate to the accelerator(s) 804 where the data to process starts in shared memory 806, how much data to process, and where to write the results back to in the shared memory 806. The processor(s) 802 may generate an input buffer in the shared memory 806 at the specified location that includes the data for the accelerator(s) 804 to operate on. Once the configuration message is transmitted and the input buffer(s) are stored in shared memory 806, the accelerator(s) 804 may receive a trigger signal from the processor(s) 802 via the event interface (e.g., a programming interface), and the accelerator(s) 804 may being processing the data. Once the accelerator(s) 804 is triggered, the processor(s) 802 may then perform other work or enter a low power state, and once the accelerator(s) 804 is finished processing, the accelerator(s) 804 may indicate the same to the processor(s) 802 and may wait for additional work.

The processor(s) 802 may set up the input buffers or input data structures for the accelerator(s) 804 to process, and store the same to memory 806. The accelerator(s) 804 may be configured using load/store operations by the processor(s) 802 that are specifically to configure and communicate with the accelerator(s) 804. The configuration message may configure the various registers (e.g., 256 32 bit registers, in an embodiment) of the accelerator(s) 804. For example, for a decoupled lookup table accelerator (as described herein in more detail), the configuration information may indicate whether the lookup is for a 1D lookup with interpolation, a 2D lookup with bilinear interpolation, and/or another type of lookup. The accelerator(s) 804, once aware of the particular mode or function, may configure the registers to properly read the data from memory 806, process, and write the data back to memory 806.

In some embodiments, the processor(s) 802 may configure the accelerator(s) 804 to execute a plurality of tasks at a time to increase efficiency. For example, where the accelerator(s) 804 is to perform various smaller tasks, individually configuring the accelerator(s) 804 may increase runtime as each task may be completed quickly, thereby requiring the processor(s) 802 to stop processing, configure the accelerator(s) 804 for another task, and so on. To do this, a first task message may include an address to a second task message allowing self-chaining of multiple tasks. As such, the processor(s) 802 may generate configuration messages for a plurality of tasks at once, and generate the configuration information and the input buffers for each task, such that the accelerator(s) 804 can perform the various tasks consecutively prior to indicating to the processor(s) 802 that processing is completed and that the accelerator(s) 804 is ready to receive more work. Further, to increase efficiency, the accelerator(s) 804 may be configured to overlap tasks, such that when a first task is nearing completion, the accelerator(s) 804 may begin decoding the next task and configuring the registers for the next task. Ultimately, by including separate instructions for the processor(s) 802 and the accelerator(s) 804, the accelerator(s) 804 may be capable of operating on data formats or types that are different than the processor(s) 802 would otherwise support. This may be a result of the architecture and layout of the registers of the accelerator(s) 804 being different and specialized for specific processing tasks.

In embodiments, the processor(s) 802 may communicate with the shared memory 806 via any number of memory interfaces (e.g., 512 bit static random access memory (SRAM) interfaces). Similarly, as illustrated, the accelerator(s) 804 may communicate with the shared memory 806 via any number of memory interface (e.g., 512 bit SRAM interface). The arbiter 814 may decide for each cycle which of the processor(s) 802 and/or accelerator(s) 804 is allowed to access the shared memory 806.

Figure 8B:
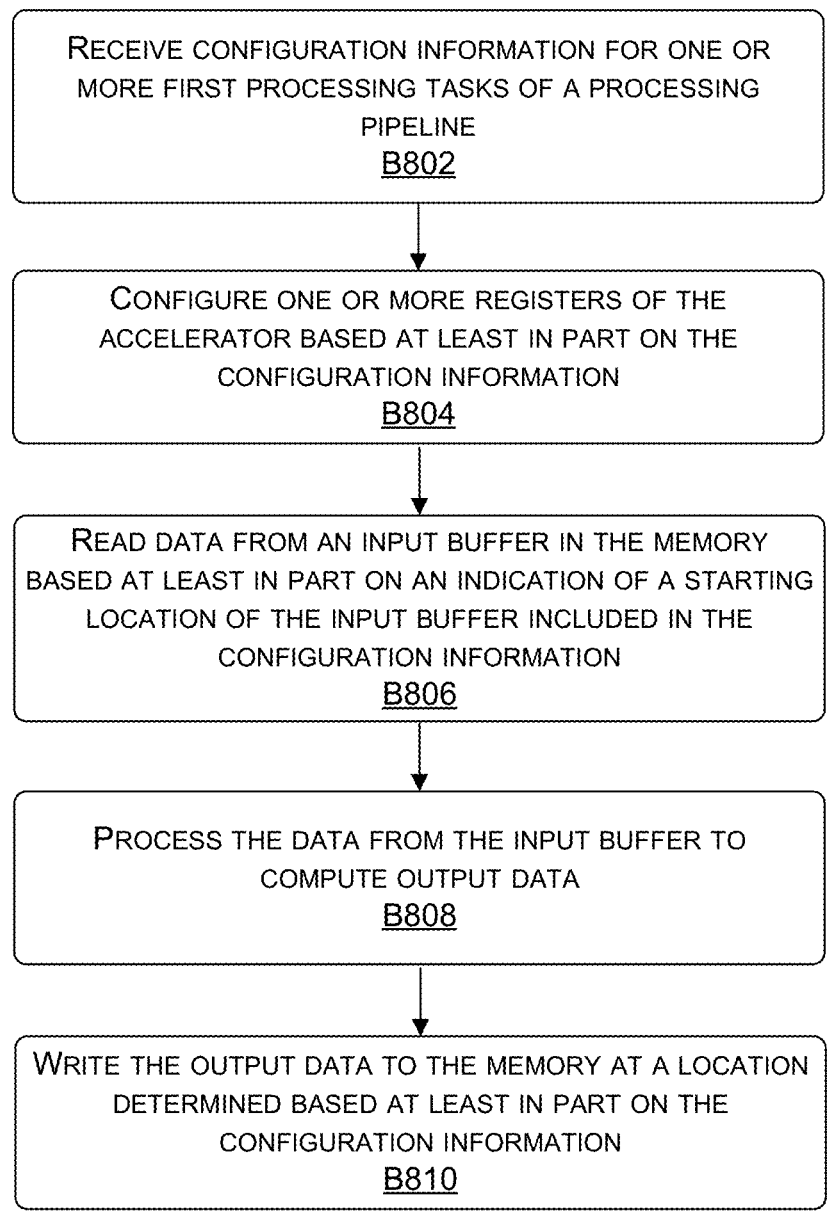
FIG. 8B is a flow diagram for a method of using a decoupled accelerator to perform one or more operations, in accordance with some embodiments of the present disclosure.

Now referring to FIG. 8B, each block of method 850, described herein, comprises a computing process that may be performed using any combination of hardware, firmware, and/or software. For instance, various functions may be carried out by a processor executing instructions stored in memory. The method 850 may also be embodied as computer-usable instructions stored on computer storage media. The method 850 may be provided by a standalone application, a service or hosted service (standalone or in combination with another hosted service), or a plug-in to another product, to name a few. In addition, method 850 is described with respect to system 800 of FIG. 8A, the method 850 may be executed by any one system, structure, or component, or any combination of systems, structures, or components, including, but not limited to, those described herein.

FIG. 8B is a flow diagram showing a method 850 for using decoupled accelerators, in accordance with some embodiments of the present disclosure. The method 850, at block B802, includes receiving configuration information for one or more first processing tasks of a processing pipeline. For example, the accelerator(s) 804 may receive configuration information (e.g., a configuration message via the accelerator interface) from the processor(s) 802.

The method 850, at block B804, includes configuring one or more registers of the accelerator based at least in part on the configuration information. For example, the accelerator(s) 804 may configure one or more registers based on the configuration information.

The method 850, at block B806, includes reading data from an input buffer in the memory based at least in part on an indication of a starting location of the input buffer included in the configuration information. For example, the configuration information may include an indication of where in memory 806 an input buffer is stored, and the accelerator(s) 804 may read the data from the input buffer into the registers.

The method 850, at block B808, includes processing the data from the input buffer to compute output data. For example, the accelerator(s) 804 may process the data from the input buffers to generate or compute outputs.

The method 850, at block B810, includes writing the output data to the memory at a location determined based at least in part on the configuration information. For example, the accelerator(s) 804 may write the results of the computations out to memory 806, and may indicate to the processor(s) 802 that the processing is complete. The processor 802 may then use the output data to perform one or more second processing tasks of the processing pipeline.

Decoupled Lookup Table Accelerator

Parallel processing is used to accelerate many compute tasks, including, without limitation: computer vision applications, deep learning applications, sensor processing applications, and/or other applications that benefit from parallelism (e.g., where processing tasks are independent of other processing tasks). Vector processors, for example, may operate on multiple elements in a same operation to gain efficiency that is required to execute these types of parallel processing algorithms in real time, while consuming low power. A common operation for computer vision or deep learning tasks, for example, is to perform a lookup from a lookup table, image patch, or surface based on an index or coordinate location. To do this, data from multiple elements may be accessed using a single vector load or store operation. Unless the indices being looked up are regular (e.g., consecutive or fixed integer stride in horizontal or vertical or depth direction), it leads to random indexed accesses from memory.

To support regular, but non-aligned vector accesses from memory, a processor may construct vector memory using smaller banks of RAM. In this way, the hardware is able to create interesting addressing patterns for the vector memory by generating unique addresses for each of the RAM banks independently. For non-regular indexed vector load operations from memory, since the indices for different vector elements can be independent of each other, this can lead to bank conflicts in one or more banks of the RAM. The bank conflicts may not be determined statically as they are data dependent, thus not allowing the compiler to schedule around the bank conflicts.

In some conventional systems, to support non-regular indexed vector load operations, various architectural designs may be implemented. For example, multiple read ports may be added to banks of the RAM. In such an example, if the hardware can process 32 vectors, each bank would require 32 read ports, which would add expense, area, and power, as well as increasing the place and route congestion around RAM banks. Another example includes reducing throughput of indexed lookups to perform a single scalar lookup per load. However, this creates a bottleneck for the vector execution and becomes the limiting factor of execution time. A further example includes making multipole copies of the data structure in memory such that each vector lane can access the data from a single bank. While this example may solve some throughput issues of other approaches, memory capacity is limited by taking up N times (where N is the number of entries to be accessed) the space for the data structure which can lead to overall performance degradation for an associated algorithm, in addition to the overhead of making copies. However, where the data structure is small, this method be suitable. In some examples, conflicts may be dynamically detected and resolved by serializing the lookups that are conflicting. However, this may result in increased hardware complexity as the bank conflicts have to be detected dynamically and resolved. Further, these additional stages increase the load-to-use latency for these operations, thereby affecting the ability of the compiler to efficiently schedule code. In addition, data dependent execution latency may be introduced, which is an issue for compilers for efficient scheduling. In some examples, combinations of these methods may be executed.

To account for these drawbacks of other architectures, the systems and methods of the present disclosure include a decoupled lookup table accelerator that is configured to support non-regular indexed vector load operations. The decoupled lookup table accelerator may be included as an accelerator 804 of the system 800, and may communicate with a processor 802—such as a VPU—through shared memory 806. The decoupled lookup table (DLUT) may support multiple modes for performing table lookups, such as a 1D lookup mode, a 2D lookup mode, a 2D conflict free lookup mode, a 1D lookup with interpolation mode, a 2D lookup with interpolation mode, a table reformatting mode, and/or other modes. In any lookup mode, the DLUT may accept an array of indices in VMEM, which may be in 1D (x) format or 2D (x, y) format. Each element may include 16 bits or 32 bits, for example, which may be unsigned. The DLUT may then perform a prescribed index calculation, which may include 2D to 1D mapping, truncate/round, integer/fraction split, and/or valid range detection, as non-limiting examples. For example, the DLUT may detect or consolidate duplicate reads, detect bank conflicts within indices, and issue read requests to VMEM to look up the requested table entries. Each element may include 8 bits, 16 bits, or 32 bits, which may be either signed or unsigned. The DLUT may then perform interpolation post-processing as configured and may write the output back to VMEM. Each of these processing operations may be executed in a pipeline to increase throughput, reduce latency, and reduce power consumption.

As a result, the DLUT accelerator overcomes the deficiencies of implementing dynamic conflict detection and resolution in the processor pipeline, allowing the compiler to efficiently schedule for the deterministic execution latencies for all memory operations while avoiding the complexity to do conflict detection in line. Since the accelerator operates as a tightly coupled accelerator—e.g., through shared VMEM with a VPU—the processor may configure and kick off the accelerator while continuing to process other independent parts or stages of a processing pipeline or algorithm.

In some embodiments, the accelerator may include additional features to further reduce the load on the main processor, such as offloading index generation for patches with specific lookup patterns, performing optional 1D blending and 2D interpolation on the data for the lookups, and/or providing table reformatting support without lookup or interpolation. In practice, the overall system—including a processor 802 and an accelerator 804 for performing lookups—has proven to accelerate processing of various computer vision algorithms (e.g., feature tracking, object tracking, image warping, pyramid creation, etc.) by a factor of two, while achieving over 50% reduction in energy consumption as compared to executing the entire algorithm exclusively on a main processor.

Now referring to FIG. 9A, FIG. 9A illustrates a system 900 including a decoupled lookup table (DLUT) accelerator, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 900 may be included in, and/or may include similar components, features, and/or functionality to that of the system 800 of FIG. 8A, example autonomous vehicle 1300 of FIGS. 13A-13D, example computing device 1400 of FIG. 14, and/or example data center 1500 of FIG. 15.

The system 900 may include one or more processors 902 (which may correspond to the processor(s) 802 of FIG. 8A), memory 904 (which may correspond to shared memory 806 of FIG. 8A), and a decoupled lookup table (DLUT) accelerator 906 (which may be included as an accelerator 804 of the accelerator(s) 804 of FIG. 8A). The processor(s) 902 may include a VPU, in embodiments, and the memory 904 may include a VMEM. The DLUT accelerator 906 (or "DLUT 906") may include a processing unit (PU) interface (I/F) 908 for communicating with the processor(s) 902, a controller 912 for communicating with the processor(s) 902, and a configurator 910 for configuring the DLUT 906 based on information from the processor(s) 902 shared across the PU interface 908 and/or from the memory 904 based on an indication from the processor(s) 902 of where the configuration message or information is stored in the memory 904. For example, the PU interface 908 and controller 912 may correspond to the advanced peripheral bus (APB) and the event or programing interface of the system 800, respectively. The controller 912 may receive kick off or trigger commands or signals (e.g., via the arrow labeled "start") from the processor(s) 902 indicating that the DLUT 906 may begin processing and/or may receive polling signals from the processor(s) 902 to aid in synchronizing the processor(s) 902 with the DLUT 906. Further, the DLUT 906 may generate a signal (e.g., via the arrow labeled "done") to the processor(s) 902 when the DLUT 906 has finished processing one or more assigned tasks, such that the processor(s) 902 may begin to configure the DLUT 906 for a next task(s).

During configuration, the processor(s) 902 may configure the DLUT 906 directly via the PU interface 908 and/or indirectly by indicating via the PU interface 908 a location of configuration information in the memory 904. In the latter example, the DLUT 906 may retrieve the configuration information from memory via, e.g., the shared read port strm1_dm_rd, and may use the stored configuration information to configure the DLUT 906 (e.g., to configure sub-units (e.g., IAU, CDRU, PPU, etc.) and/or other components of the DLUT 906) for performing one or more tasks. For example, the processor(s) 902 may set up data structures in the memory 904 that are needed to execute one or more tasks by the DLUT 906. For example, for a 1000 coordinate lookup, the processor(s) 902 may set up a data structure in the memory 904 with each of the 1000 coordinates, and may further allocate a buffer in the memory 904 where the DLUT 906 is to write outputs to. The processor(s) 902 may also indicate which operations are to be performed by the DLUT 906—e.g., 1D or 2D lookup, with or without interpolation, table reformatting, etc.—and the DLUT 906 may use this information to configure the sub-units. The configuration information set up by the processor(s) 902 may also include an indication of a bit width for the coordinate indices, and a bit width for entries of the table, and so on. As such, once the input buffer(s) and output buffer(s) are set up in memory 904, and the configuration information such as bit width, operation type, etc. are sent to the DLUT 906, the processor(s) 902 may kick off or trigger the DLUT 906 to begin processing. As a result, and in contrast to systems that rely on the processor(s) 902 alone, the processor(s) 902 may perform other tasks while the DLUT 906 is performing the lookups, interpolations, table reformatting, and/or the like, thereby decreasing runtime and improving efficiency.

In operation, a list of indices corresponding to coordinates may be received by the DLUT 906 from the memory 904, and the DLUT 906 may pull the values from a table corresponding to the indices (e.g., where the values are integer values) and/or may pull surrounding values (e.g., a left and right value for a 1D lookup or a left upper, left lower, right upper, and right lower value for a 2D lookup) for fractional values, and perform an interpolation or other operation on the surrounding values. Once the final values are determined (e.g., directly via the lookup where no post-processing is performed, or after processing by a post-processing unit (PPU) 930), the values may be written to an output buffer in the memory 904 with a one to one correspondence to the indices from the input buffer. To perform these tasks efficiently, in embodiments, an index address unit (IAU) 922, a conflict detection and resolution unit (CDRU) 924, a control (CTL) first in first out (FIFO) 928, a fractional (FRAC) FIFO 926, a post-processing unit (PPU) 930, a data coalesce unit (DCU) 932, and/or other components may be used.

For example, an index (IDX) stream 916 may include a stream of indices read out of the memory 904 (e.g., via a read port, strm1_dm_rd) that are to be looked up in one or more lookup tables, and the values corresponding to the indices may be read out of the memory 904 (e.g., via a read port, strm0_dm_rd) via the lookup table (LUT) stream 918. The output (OUT) stream 920 may be the values written back to memory 904 (e.g., via a write port, strm0_dm_wr) after processing using the DLUT 906.

The processor(s) 902, during configuration, may indicate to the IDX stream 916 how to access the data structure for the indices. For example, for a 1D lookup, where an interface with the memory 904 is 64 bytes wide, 64 bytes may be read out in each cycle. Where 1D lookup is performed, a single coordinate may be read out for each index value (e.g., an (x) value), and for 2D lookup, two coordinate indices may be read out for each index (e.g., an (x, y) value). Each index may be 16 or 32 bits, in non-limiting embodiments, so in each 64 byte read there could be 8, 16, or 32 coordinates coming out of the IDX stream 916.

The IDX stream 916 data may be sent to the IAU 922 in raw format, as raw indices, and each coordinate may be an integer value or a fractional value. The IAU 922, where the index is a fractional value, may split the fractional value to give the fractional bits to the FRAC FIFO 926 to aid in blending the looked up surrounding values in the table using the PPU 930. The IAU 922 may then determine a set of indices to send to the CDRU 924, where the number of indices sent may correspond to a number of lookups that the LUT stream 918 may perform in a single cycle. For example, if the LUT stream 918 can perform, e.g., 32 lookups in a cycle (based on the bit width of each value in the lookup table), then the IAU 922 may send 32 indices to the CDRU 924 at each iteration. In some examples, such as where the values to the IAU 922 from the IDX stream 916 are integer values, the IAU 922 may send each set of indices without any processing. However, where the values from the IDX stream 916 are fractional values, the IAU 922 may determine which indices need to be lookup up to get each of the surrounding values (e.g., 2 indices for 1D interpolation or 4 indices for 2D interpolation) required to perform interpolation or another operation in order to get the blended value corresponding to the fractional value. For example, where the fractional value is (5.3, 6.2) corresponding to an (x, y) coordinate for 2D lookup and interpolation, the IAU 922 may determine that lookups are to take place at (5, 6), (5, 7), (6, 6), and (6, 7), and then the PPU 930 may blend the values to generate a final value corresponding to the index (5.3, 6.2). For example, the values may be blended equally weighted, or may be blended using bilinear interpolation such that values closer to (5, 6), rather than (6, 7) are weighted more heavily for computing a final value for (5.3, 6.2).

The set of lookups (e.g., 32 lookup indices where the LUT stream 918 is capable of reading 32 values in each read cycle) may be sent to the CDRU 924 in a proper order that corresponds to the index order in the input buffer in memory 904 that is read using the IDX stream 916. The CDRU 924 then performs conflict detection and resolution by identifying bank conflicts that would result if the lookup table reads in the LUT stream 918 were to take place in the order received from the IAU 922, and resolving the bank conflicts by altering the order of the indices to avoid bank conflicts. For example, where the lookup of the set of indices would cause a bank conflict, and another (e.g., a later or prior) set of indices is available for another lookup cycle, the CDRU 924 may find non-conflicting lookups from the other lookup cycle(s) and exchange the non-conflicting lookups with the conflicting lookups for that cycle. As a result, one or more bank conflicts may be avoided, thereby increasing throughput. For an example, where the IAU sends 32 indices each cycle, and 6 of the indices for a given cycle have bank conflicts, the CDRU 924 may determine up to 6 indices from another lookup that would not cause a conflict in the current lookup, and may perform those 32 lookups—e.g., 26 lookups from the original 32 and 6 lookups from another set sent from the IAU 922. Once the set of lookups is determined (e.g., with or without substituting to account for conflicts), the set of lookups may be read out memory 904 using the LUT stream 918.

To account for the out of order lookups where substitutions take place, the CDRU 924 may use the CTL FIFO 928 to indicate to the data coalesce unit the order of the lookups of each set of lookups from the IAU 922. For example, for an initial set of 32 lookups, the DCU may determine that 8 were performed in first cycle, then 8 in another cycle, then 16 in another cycle, and may then determine that the entire set of 32 has been processed, and then may push the 32 lookups out to the PPU 930 for post-processing, where applicable, or may push them straight out to the OUT stream 920 for writing to the output buffer in memory 904. This additional information indicating the actual order of lookups determine by the CDRU 924 and read out to the LUT stream 918 may be communicated to the DCU 932 via the CTL FIFO 928. As such, whatever changes the CDRU 924 makes to the order of the indices received from the IAU 922, the DCU 932 may account for. The CTL FIFO 928 may be useful because the number of cycles to go through the IAU 922, the CDRU 924, etc. is non-deterministic and is data dependent. For example, because conflicts are not known ahead of time (e.g., because the data may be non-deterministic), and are a result of programming, there is no solution to avoid conflicts entirely, so the CTL FIFO 928 aids in indicating to the DCU 932 the organization of lookups as a result of conflict resolution.

Where needed—such as where an additional operation is required to be performed on the lookup table values—the PPU 930 may compute a final value(s) for each index that may be read out to the memory 904. Where no post-processing is required, the PPU 930 may not be required for anything than gathering results. For example, where normal 1D or 2D lookups are performed on indices that are integer values that map directly to locations in a lookup table, the PPU 930 and FRAC FIFO 926 may not be used to perform additional processing. Where interpolation—e.g., linear on 1D lookups or bilinear on 2D lookups—and/or other operations are performed, the PPU 930 and FRAC FIFO 926 may be used to convert gathered results into updated results or values for writing out to the memory 904.

In some embodiments, the DLUT 906 may be used in a table reformatting mode. For example, the IDX stream 916 and the OUT stream 920 may be used for updating addresses for access and/or transpose. In such an example, where there is a buffer in memory 904, and the indices in the buffer are to be transposed, this operation may be offloaded to the DLUT 906 (rather than having an address generation unit of the processor(s) 902 perform the transpose). The configuration information from the processor(s) 902—e.g., from an address generation unit—may indicate a read pattern for reading from a buffer in memory 904 and a write pattern to write the addresses back to memory 904 in a different pattern. For example, where a programmer knows that many conflicts will result from a particular access pattern, the programmer may program the processor(s) 902 to configure the DLUT 906 to perform table reformatting to shuffle the data such that less or no conflicts may occur.

As a further example, the DLUT 906 may be used for out of range detection sentinel return value, or out of range predicate off output write. As such, where coordinates in the IDX stream 916 are outside of a given image patch, for example, and the corresponding values should not be written, the DLUT 906 may write out a sentinel value instead that may indicate to the processor(s) 902 when processing the information in the output buffer that the sentinel values are not to be relied upon or used in processing. In some embodiments, this sentinel value may indicate to the processor(s) 902 that the values are not to be written to memory, so the values identified as error values may not be stored.

As such, the DLUT 906 may be implemented as a pipeline of sub-units that work together to execute particular tasks or operations. Each sub-unit may operate independently and communicate with other sub-units via shared interfaces. With respect to FIG. 9B, table 940 illustrates the tasks of various sub-units of the DLUT 906 during processing of particular operations.

As a result of the DLUT accelerator described herein, the processor pipeline may remain deterministic by offloading the dynamic conflict detection and resolution to the decoupled accelerator. In addition, the accelerator is able to operate independently and concurrently with the main processor (e.g., a VPU), thus decreasing runtime. The DLUT accelerator may further allow for 1D and/or 2D lookup from one common table, with conflict detection/resolution. The accelerator may perform various post-processing operations, such as 1D lookup with linear interpolation, 2D lookup with bilinear interpolation, out of range detection sentinel return (both 1D and 2D), and/or out of range predicate off output write (both 1D and 2D). The DLUT accelerator may be configured to perform interpolation with a configurable number of fractional bits, and may support various index and data formats—such as 8, 16, and 32 bit signed and unsigned data formats and 16 and 32 bit 1D and 2D coordinates for index formats. The DLUT accelerator may also be capable of using configurable X/Y offset to translate between global coordinates and local coordinates. The DLUT accelerator may further support data stream units to read index buffers from VMEM, perform lookup from VMEM, and write results (or lookup or interpolation) in the VMEM. The data stream units may support up to 2D addressing of linear and transpose accesses. To optimize the number of cycles needed for lookup/interpolation, indices for lookups may be out of order to minimize bank conflicts—e.g., if the VMEM supports N lookups, the accelerator may use M×N indices to maximize the number of indices that can survive conflict detection—and duplicate detection may be performed to filter out duplicate indices that are guaranteed to generate a conflict. Further, a 2D lookup and interpolation mode of the DLUT accelerator may include automatically generated indices (called auto index mode) within the accelerator from a few parameters, as opposed to a programmer supplying a block of index data. This offloads preparation of the index from the main processor to the accelerator.

Now referring to FIG. 9C, each block of method 950, described herein, comprises a computing process that may be performed using any combination of hardware, firmware, and/or software. For instance, various functions may be carried out by a processor executing instructions stored in memory. The method 950 may also be embodied as computer-usable instructions stored on computer storage media. The method 950 may be provided by a standalone application, a service or hosted service (standalone or in combination with another hosted service), or a plug-in to another product, to name a few. In addition, method 950 is described with respect to system 900 of FIG. 9A, the method 950 may be executed by any one system, structure, or component, or any combination of systems, structures, or components, including, but not limited to, those described herein.

FIG. 9C is a flow diagram showing a method 950 for using a decoupled lookup table accelerator, in accordance with some embodiments of the present disclosure. The method 950, at block B902, includes configuring one or more sub-units of a DLUT accelerator based at least in part on configuration information generated using a processor. For example, the DLUT 906 may configure the sub-units of the DLUT 906 using information received from the processor(s) 902 and/or retrieved from memory 904.

The method 950, at block B904, includes determining, from a first set of indices of a stream of indices read from memory, a first subset of indices without bank conflicts. For example, the IAU 922 may generate a set of indices for the CDRU 924 to process for conflicts, and the CDRU 924 may determine a subset of the indices in the set that do not have bank conflicts.

The method 950, at block B906, includes determining, from a second set of indices of the stream of indices read from the memory, a second subset of indices without bank conflicts with the first subset of indices. For example, the IAU 922 may generate another set of indices for the CDRU 924 to process for conflicts, and the CDRU 924 may determine to replace one or more of the indices with conflicts from the first set with one or more indices from the second set of indices that would not result in conflicts with the first set of indices.

The method 950, at block B908, includes performing a lookup of one or more lookup tables using the first subset of indices and the second subset of indices in a single read cycle from the memory to retrieve a plurality of values. For example, the DLUT 906 may read values from the memory 904 into the LUT stream 918 using the subset of values from the set of indices and the values from the second set of indices that were determined not to have a conflicts with the subset of values from the first set of indices.

The method 950, at block B910, includes writing the plurality of values to the memory. For example, the values from the LUT stream 918 may be written to memory 904 in the output stream 920. Prior to being written out, the DCU 932 may reorganize the data so that the data is in one to one order with the indices read out of the input buffer in the IDX stream 916. In some embodiments, the PPU 930 may perform one or more operations, such as interpolation, on the retrieved values prior to writing a final value out to the memory 904 in the OUT stream 920.

Hardware Sequencer for a Direct Memory Access System

A direct memory access (DMA) system may be used to move data from different memory locations without requiring a central processing unit (CPU). For example, the DMA may operate as a data movement engine to move data from a source to a destination—e.g., from a source such as an external memory (e.g., DRAM), or an internal memory such as an L2 buffer or vector memory (VMEM) of a vector processing unit (VPU), to a destination, such as a VPU. The DMA system may perform additional operations in practice, such as, without limitation, padding frame data, manipulating addresses, managing overlapping data, managing different traversal orders, and accounting for different frame sizes.

In digital signal processing, multiple DMA resources may be used to describe structured tile data movement between an external memory and a processor—such as a VPU. For example, these DMA resources may include descriptors, channels, triggers, and/or registers. Descriptors, for example, may describe tile movement such as a source location, a destination location, a line pitch, a tile width, a tile height, a circular buffer arrangement, and/or the like. However, tile data movement for image surfaces with spatial and temporal dependencies causes extra programming model challenges to a user and requires different and many DMA configuration resources. These tile-data dependencies may also complicate control code and a control sequence in processor (e.g., VPU) code. For example, a typical processing operation may include filtering, such as 3×3 filtering. This type of operation introduces spatial dependencies, as every output pixel will depend on the corresponding values of 3×3 pixels around the output pixel. In such an operation, a 3×3 matrix of values may be used to perform filtering, and this operation may be referred to as a spatially dependent operation. In practice, every tile of a frame may be the same size—e.g., 64×64—to reduce programming challenges. However, where a 3×3 filter is used on a 64×64 tile, an extra pixel up and down will be required from adjacent tiles—e.g., as illustrated in shaded regions of FIG. 10C. As such, this information needs to be encoded in the DMA resources to allow for proper fetching of the data across tiles—which causes an extra programming burden to complete.

With reference to FIGS. 10A-10G, FIGS. 10A-10G illustrate various challenges for data movements when using a DMA system. For example, visualization 1000 of FIG. 10A may correspond to padding frame data. In visualization 1000, there may be nine sections, a top left section, a top section, a top right section, a left section, a center section, a right section, a bottom left section, a bottom section, and a bottom right section. In such an example, each section may include one or more tiles—e.g., the top left section may include one tile while the top section may include, e.g., four tiles. As such, to define this sectioning accurately, in existing approaches, this frame may be described using nine descriptors (e.g., one for each section), three channels (e.g., one for a left column, one for a center column, and one for a right column), and three triggers (e.g., one for each channel).

With respect to padding, for example, due to spatial dependencies, when performing operations on data near a border of a tile or section of a frame, the DMA system may pad values or fabricate values for pixels that are outside of an image border. This may be because, in certain implementations, requesting data outside of a memory region for an image may trigger a fault. As such, the DMA may be used to pad or fabricate values after fetching the image data from the corresponding memory region to avoid triggering the fault. Without padding, the structure of the data may not match a kernel size, for example, if performing a filtering operation. The fetched data with the additional padded values may then be sent to the destination—e.g., a VPU—so that the VPU is able to process the data according to its configuration, and may process data a same way across an entire (padded) frame. When padding, zero padding may be used (e.g., where each new data point includes a zero value), duplicated values may be used (e.g., duplicate the pixel value of an adjacent pixel from the fetched data), and/or another padding mechanism may be used. In addition, padding may be added to any sides of a frame, and may be added differently for different sides. For example, in FIG. 10A, a padded region 1002 may be larger on a right side than a left, top, or bottom side of the frame. Padding increases DMA programming complexity when moving data from a source to a destination—such as from memory to VMEM—and also increases VPU programming complexity when processing a larger, padded frame.

Figure 10A:
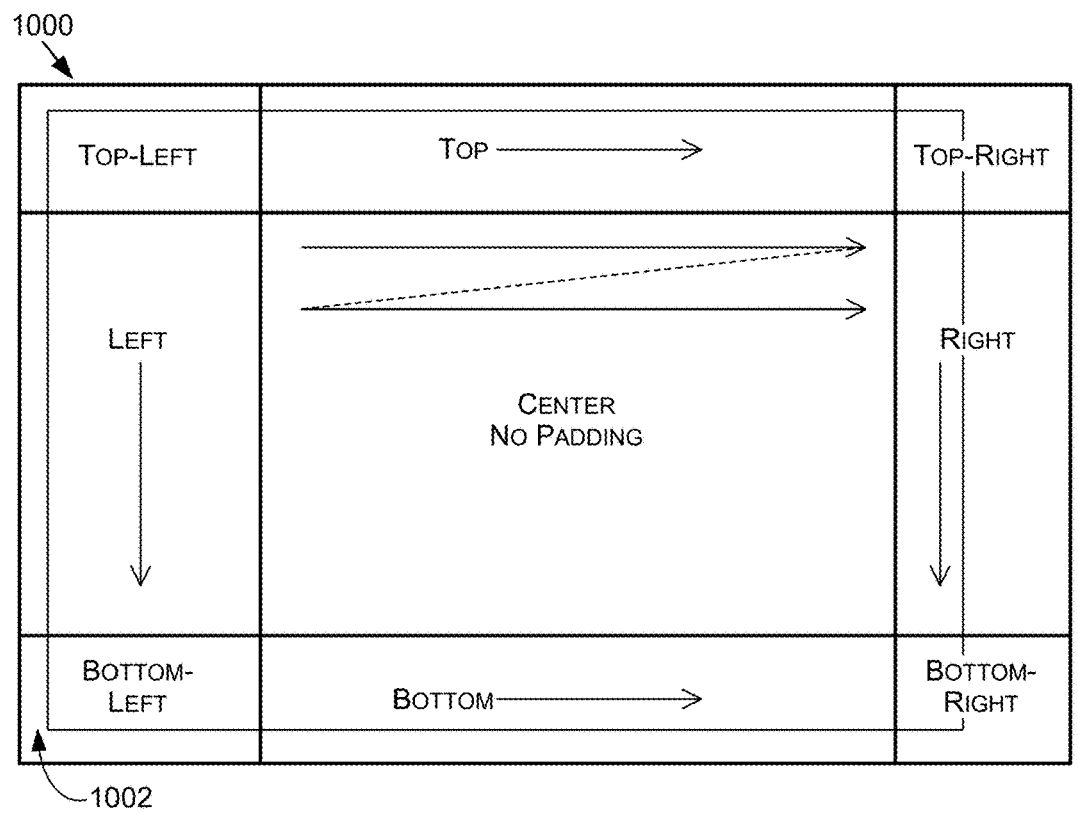
FIG. 10A is a visualization illustrating padding a frame with padded values, in accordance with some embodiments of the present disclosure.
Figure 10B:
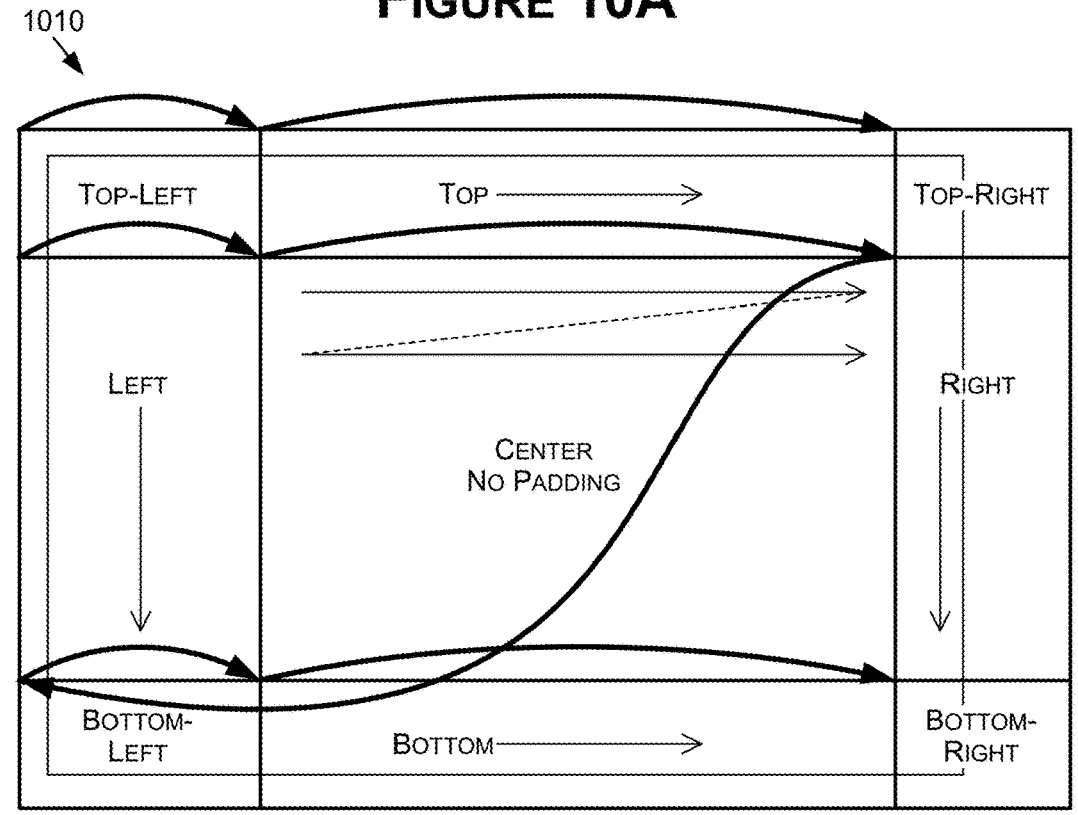
FIG. 10B is a visualization illustrating address manipulation for descriptors of a frame, in accordance with some embodiments of the present disclosure.

Now referring to FIG. 10B, visualization 1010 of FIG. 10B corresponds to address manipulation by a DMA system. For example, different descriptor addresses may be manipulated and programmed to fetch contiguous frame data. For the DMA to perform effectively, address description of data movement may be contiguous. As such, the address of each descriptor may be manipulated, and this manipulation must be carried over from one descriptor to another. For example, when padding values as illustrated, the starting address for each descriptor may be manipulated to cause the data fetched to include the padded values. To do this, a programmer uses a starting address and a tile width, and a number of tiles in each section, and uses this information to generate a next descriptor address. For example, a first descriptor may cause fetching of data starting in the top left, then the top, then the top right, then the left, then the center, and so on, as indicated by the arrows in FIG. 10B. However, starting descriptor addresses increase DMA programming complexity when moving data to a destination—such as VMEM.

Figure 10C:
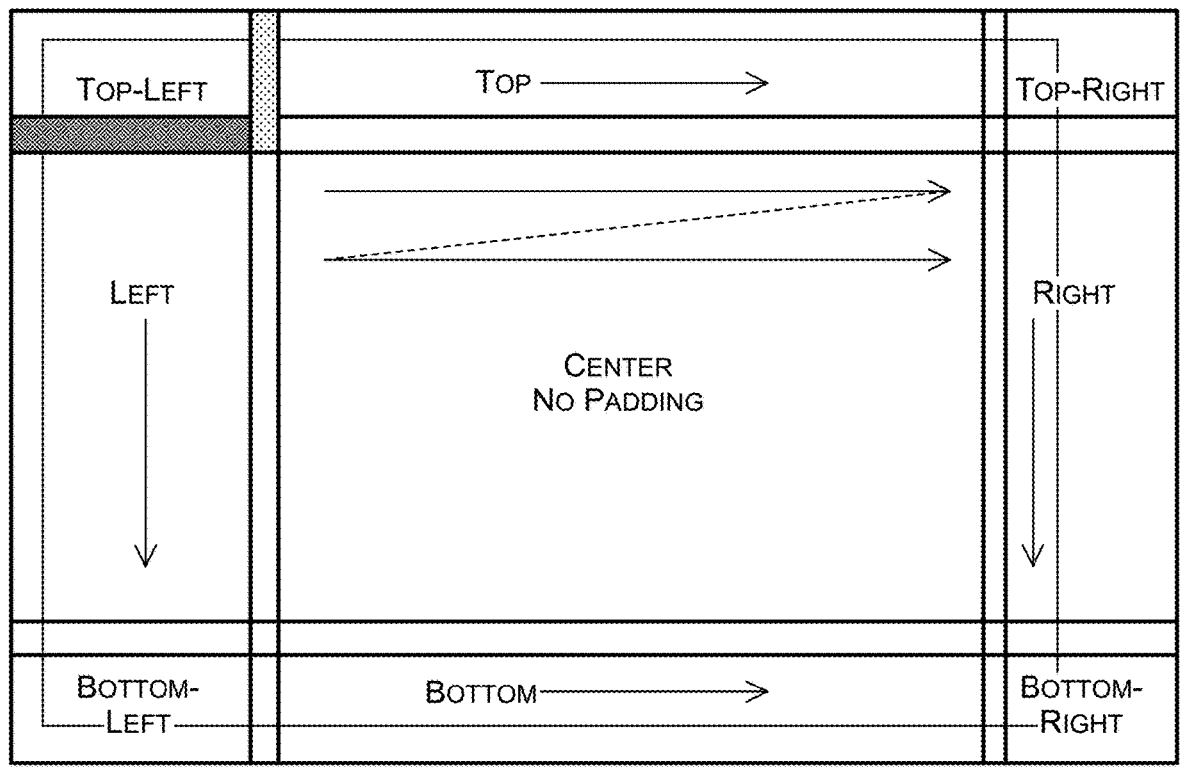
FIG. 10C is a visualization illustrating overlapping data between tiles of a frame, in accordance with some embodiments of the present disclosure.

As another example, and with respect to FIG. 10C, the DMA system may be required to read vertically and horizontally overlapped data from adjacent tiles in order to ensure contiguous data processing. For example, as illustrated by the shaded regions of FIG. 10C, overlapping data from a tile of a top left section an adjacent tile in a top section may be required to be read in a same operation. Similarly, overlapping data from a tile of a top left section and an adjacent tile in a left section may be required to be read in a same operation. To accomplish this, the descriptor needs to be updated or moved to include the overlapping portion. For example, the base descriptor may include an address at a start of the top section, but to capture data from the adjacent tile in the top left section, the descriptor for the top section needs to be updated (e.g., moved to the left) to capture the data from the tile in the top left. This updating requires additional programming complexity, especially as a number of descriptors is increased.

Figure 10D:
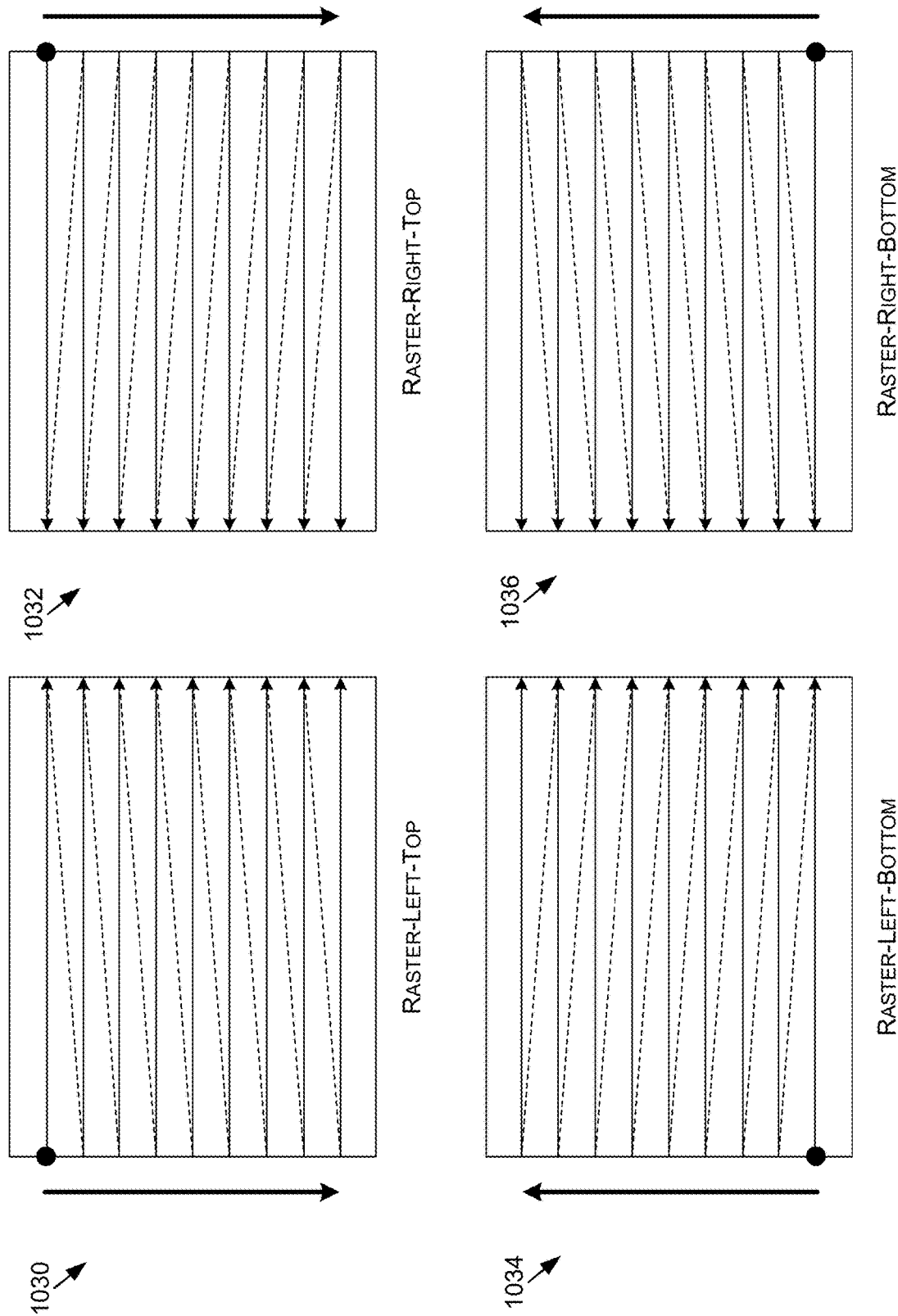
FIG. 10D includes visualizations illustrating various raster traversal orders, in accordance with some embodiments of the present disclosure.
Figure 10E:
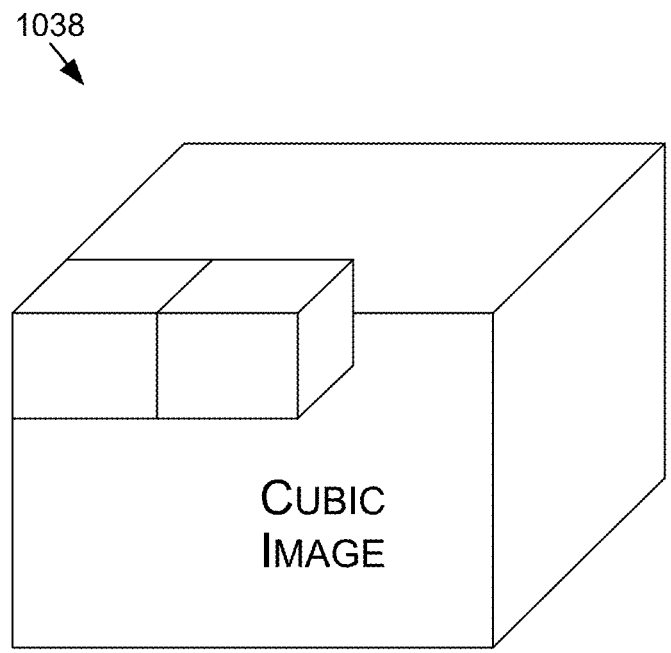
FIG. 10E is a visualization illustrating a cubic traversal order, in accordance with some embodiments of the present disclosure.
Figure 10F:
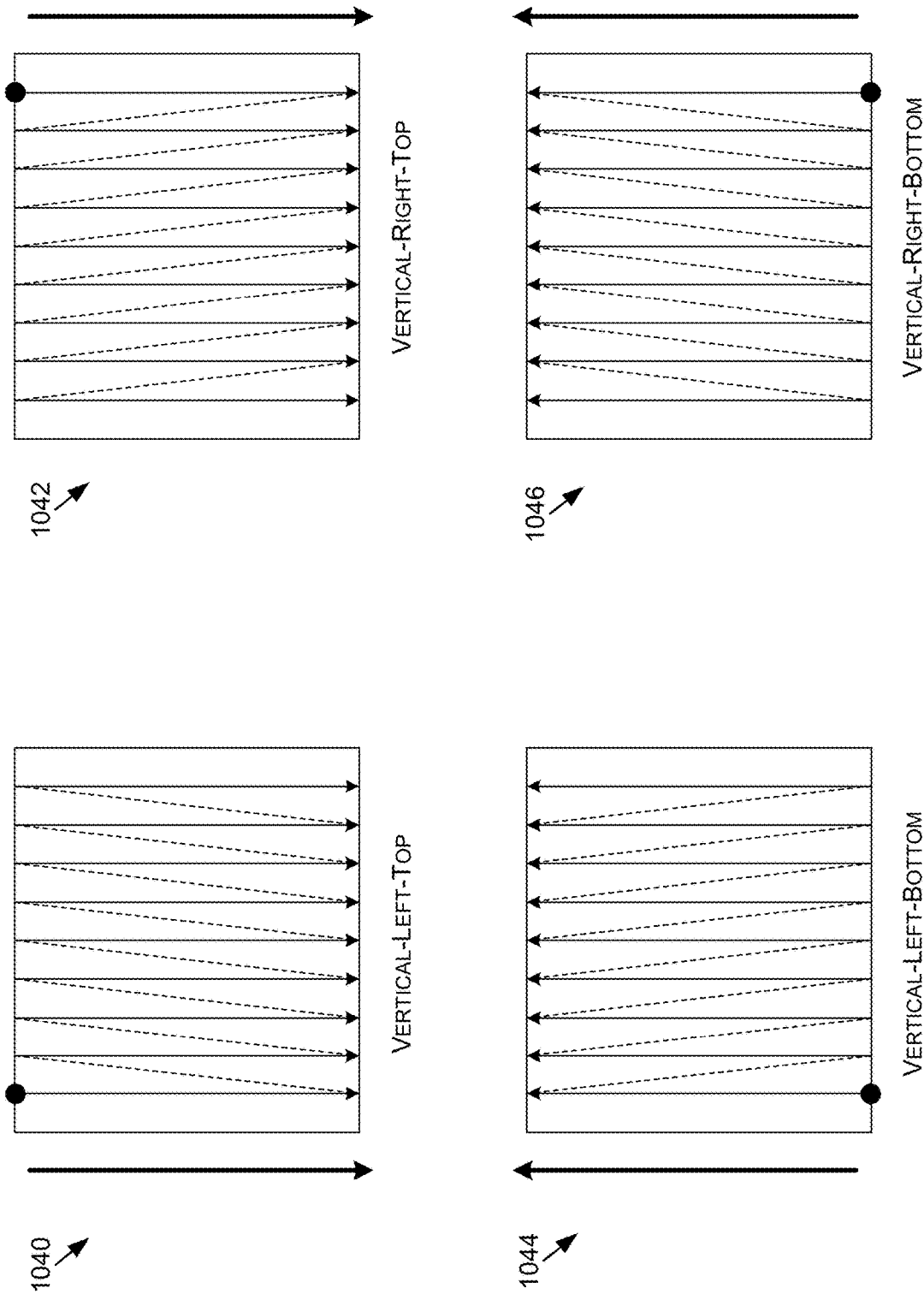
FIG. 10F includes visualizations illustrating various vertical mining traversal orders, in accordance with some embodiments of the present disclosure.

In addition, with respect to FIGS. 10D-10F, the DMA system may need to support different traversal orders for reading the data out of memory in a contiguous fashion. For example, whether performing filtering, convolution, matrix multiplication, and/or another operation, the associated traversal order may differ. To account for this, various traversal orders may be supported, such as those illustrated in FIG. 10D, which include a raster traversal order starting at a left top (visualization 1030), a raster traversal order starting at a right top (visualization 1032), a raster traversal order starting at a left bottom (visualization 1034), and/or a raster traversal order starting at a right bottom (visualization 1036). Similarly, with respect to visualization 1038 of FIG. 10E, various cubic traversal orders may be supported by the DMA system for a cubic image. FIG. 10F illustrates various vertical mining traversal orders that may be supported by the DMA system, such as a vertical mining traversal order starting at a left top (visualization 1040), a vertical mining traversal order starting at a right top (visualization 1042), a vertical mining traversal order starting at a left bottom (visualization 1046), and/or a vertical mining traversal order starting at a right bottom (visualization 1048). In order to support each of these different traversal orders for moving data to memory (such as VMEM), the complexity of DMA programming is increased.

Figure 10G:
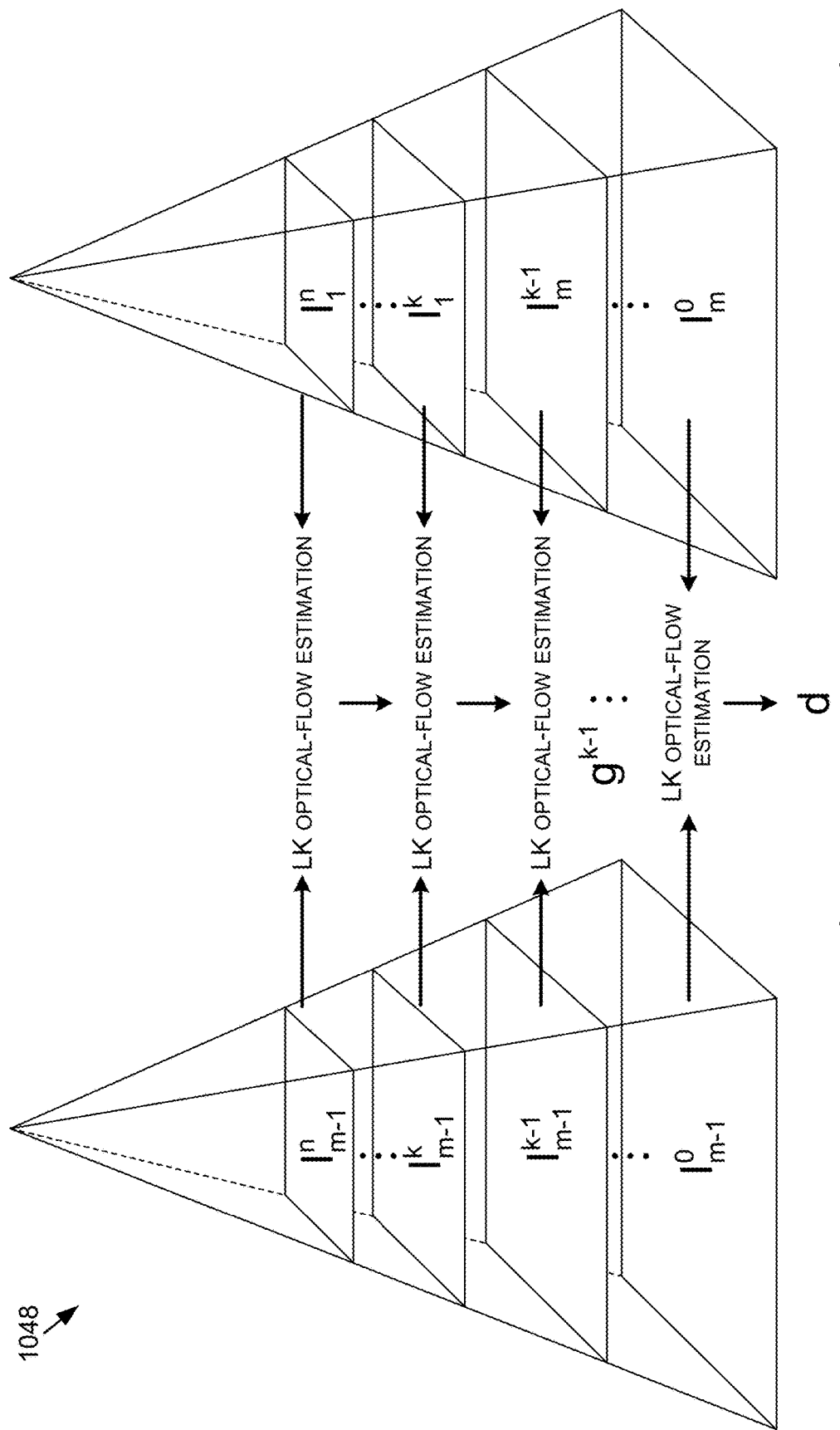
FIG. 10G is a visualization illustrating various image sizes in a pyramid configuration, in accordance with some embodiments of the present disclosure.

With respect to FIG. 10G, the DMA system may also be required to support different frame sizes, such as moving multiple frames with different sizes (e.g., Luma/Chroma composite or different pyramid levels). For example, a processor—such as a VPU—may process different sized frames to generate a final desired output. FIG. 10A illustrates an example visualization 1048 corresponding to a pyramid processing of frames for an optical flow estimation operation. In such examples, movement of pixels may first be computed a smaller frame size, then a larger frame size using a cue from the output of the smaller frame size, then an even larger frame size using a cue from the larger frame size, and so on. As such, the DMA system may support fetching frame data for various frame sizes, but this ability requires additional programming complexity for the DMA system. For example, the descriptors have to be programmed or updated for each different frame size.

To simplify the programming for these various operations that a DMA system supports, the DMA systems and methods of the present disclosure may use a hardware sequencer in combination with a DMA engine to account for data movement. For example, data movement for a full image may be explicitly and fully described in a hardware sequencing mode with a simplified programming model (e.g., an image structure of frame, such as illustrated in FIG. 10I) that handles tile sequencing (triggering), padding, overlapping (offset), order of traversing, and different frame sizes. The hardware sequencer may reduce DMA resource usage (e.g., reduce a number of descriptors, triggers, channels, etc. required), offload control from the VPU for VPU control processing, and reduce the complexity of the DMA programming. This may be accomplished by loading an image or frame descriptor view (e.g., as illustrated in FIG. 10I) in the form of a sequence of commands from a local programmable memory. These hardware sequence commands may incorporate each of the operations that result in programming complexity increases as described herein—including image padding, tile overlapping or offset, frame offset, image traversal orders, and image size in tile granularity. The hardware sequencer may read the image commands from memory in addition to descriptor information (e.g., from the image commands or from a separate descriptor memory or SRAM) and sequence the tile movements to traverse and paint out the full frame.

Figure 10H:
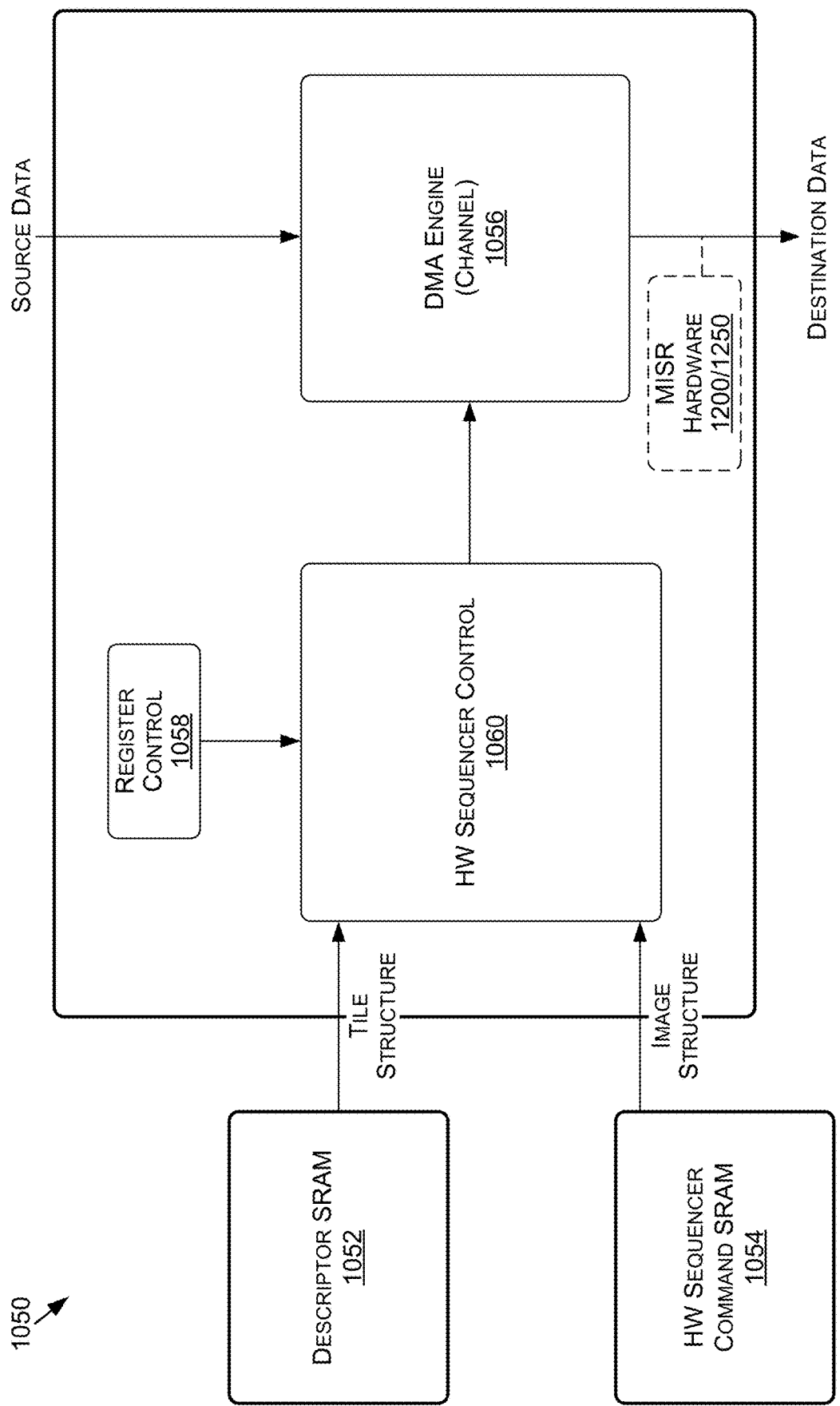
FIG. 10H is a direct memory access (DMA) system including a hardware sequencer, in accordance with some embodiments of the present disclosure.

Now referring to FIG. 10H, FIG. 10H illustrates a DMA system 1050 including a hardware sequencer, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 1050 may be included in, and/or may include similar components, features, and/or functionality to that of example autonomous vehicle 1300 of FIGS. 13A-13D, example computing device 1400 of FIG. 14, and/or example data center 1500 of FIG. 15.

The system 1050 may include a DMA engine 1056, a register control 1058, a hardware (HW) sequencer controller 1060, a descriptor SRAM 1052, and/or a hardware (HW) sequencer command SRAM 1054. An existing system may only include the DMA engine 1056 and the descriptor SRAM 1052 that stores the descriptors for the frame. As such, as described herein, the DMA engine 1056 was previously required to perform all of the operations of padding, address manipulation, etc., when sending data from a source to a destination, and the VPU or other source was required to perform the sequencing by handshaking with the DMA system (e.g., with the VPU as the primary node and the DMA as the secondary node). In such examples, the DMA engine 1056 would process on a tile level, using descriptors for various sections of the frame that each include one or more tiles in order to retrieve tiles one at a time to send to a destination, and subsequent tiles would be retrieved according to the descriptors based on an indication from the VPU to retrieve a next tile.

However, using the system 1050 of FIG. 10H, frames may be processed at the frame level—e.g., a single descriptor may be used for the frame illustrated in FIG. 10C that previously required nine descriptors. As such, in practice, when the DMA engine 1056 attempts to load descriptors from the descriptor SRAM 1052 (or descriptor memory 1052, more generally), the HW sequencer control 1060 may intercept the descriptor loading and use a command sequence processing structure to handle multiple frames, tile rows/columns, and multiple descriptors. To do this, a frame format 1070 (FIG. 10I) may be used that describes frames at a higher level by processing tile rows/columns (depending on traversal order) in hardware rather than at the tile level. For example, instead of padding tiles, an entire frame may be padded using the frame format 1070, thus padding many frames with a single padding command. As such, an entire frame may be comprehended, such as where to pad, where to overlap, how to manipulate addresses automatically, and so on. In addition, the legacy format may remain supported for operations that may not benefit from the HW sequencer control 1060 as the DMA engine 1056 may pull descriptors directly from the descriptor SRAM 1052 without intervention by the HW sequencer control 1060.

The HW sequencer control 1060 may operate, e.g., as a state machine that reads the HW sequencer command SRAM 1054 (or more generally HW sequencer command memory 1054) where the frame format 1070 including the sequencing commands are stored. A processing controller—such as an R5 processor, a CPU, an ARM processor, etc.—may use programmed code and/or settings from a higher level engine to program or configure the HW sequencer command SRAM 1054 and the descriptor SRAM 1052.

The descriptor SRAM 1054 may include one or more descriptors which may define tile dimensions (e.g., a tile width, dx, and a tile height, dy), a starting point for the image or frame (e.g., top left, bottom right, etc.), a type of trigger, and/or other micro information about the scan type of the descriptor.

The HW sequencer command SRAM 1054 may store the frame format 1070 that defines the frame as a whole, the size of the frame, the frame padding, etc. For example, the frame format 1070 may include frame headers for header control, offset control, and padding control, and may include and column headers and/or row headers for columns or rows of the frame (e.g., column headers for vertical scan patterns and row headers for raster scan patterns). The frame header control may include a frame repetition factor to identify how many times the particular frame is to be repeated, as well as a number of descriptor rows and/or descriptor columns. The frame header offset control may include a frame tile offset (e.g., an offset from tile to tile) and a frame offset (e.g., an offset between two or more frames that may be read out using a single channel, such as where a YUV frame may be processed that includes three separate planes). The frame padding header may indicate how many lines or pixels of padding to add on a frame level (as opposed to a per tile level of prior approaches), such as padding a left side of a frame, a top of a frame, a right side of a frame, and/or a bottom of a frame, such that the entire frame is padded rather than padding each tile within each section of a frame at a tile level.

The column headers may be used where the traversal order is vertical and the row headers may be used where the traversal order is raster or horizontal. The column headers and/or row headers may include a column or row offset (e.g., how much the offset is between each column or each row), a column or row repetition factor (e.g., how many times to repeat the same column or row processing type across the frame, such as N−1 times, where N is the number of times the column or row is processed), and a number of descriptors used for each column or row (e.g., a single descriptor may be used to repeat a same tile across a row or column, or a first descriptor may be used to traverse part of a row and a second descriptor may be used to traverse another part of the row, and so on). The descriptor IDs may be described such that a descriptor—e.g., stored in descriptor SRAM 1052—may be pulled and used to describe the row or column. For example, the descriptor ID may indicate which descriptor to use for a particular column(s) and/or row(s), as well as how many times the descriptor is repeated (e.g., N−1 times, where N is the number of times the descriptor is used in total). In embodiments, there may be a set number of descriptors (e.g., 64), and the descriptor ID may be used to determine which descriptor should be used for a particular column and/or row. In this way, the hardware sequencer controller 1060 looks at a super structure of a frame that is on top of basic descriptors from descriptor SRAM 1052, which allows for simplification of the resources needed by the DMA engine 1056 to implement a same data transfer. In addition, the HW sequencer control 1060 may pre-fetch tiles—e.g., using register control 1058—ahead of time to reduce latency, and the tile data may be immediately available upon request by the DMA engine 1056.

In operation, the HW sequencer control 1060 may read the image structure (e.g., the frame format 1070) from the HW sequencer command SRAM 1054 along with the descriptor information from the descriptor SRAM 1052, and may combine the information to sequence through a frame for the DMA engine 1056. As such, instead of requiring separate coding of the DMA engine 1056 for each descriptor, trigger, channel, etc., the HW sequencer control 1060 may read the image structure, pull in the descriptors, and sequence through the frame for the DMA engine 1056 with the proper descriptor format. The register control 1058 may aid, in embodiments, in controlling a traversal order, prefetching, and/or other frame addressing controls. The HW sequencer control 1060 further simplifies code for the VPU, such that the VPU does not have to account for multiple channels. Instead, the VPU may request a tile, then a next tile, then a next tile, and so on. The HW sequencer control 1060 understands a current location in the frame, and so understands a next tile to be fetched for the DMA engine 1056, and the DMA engine 1056 does not have to keep track of this information internally.

The system 1050 may thus be backwards compatible with previous approaches as the system may still support using various descriptors, triggers, channels, etc., but may also comprehend at a frame level to decrease complexity. The system 1050 may support image padding at all corners of a frame with different pixel padding sizes, overlapping tiles vertically and/or horizontally to allow for adjacent tile access by the VPU to process along tile boundaries, and traversing a frame in different traversal orders. In addition, the system 1050 may support automated tile offset adjustment by the HW sequencer control 1060 at the VMEM destination. Because descriptors in the frame are linked via hardware, a user is not required to link or stitch descriptors together. The HW sequencer control 1060 may manage address sequencing across descriptors/tiles across a frame without additional programming complexity, and the HW sequencer control 1060 may pre-fetch tiles for improved performance.

In some embodiments, the descriptors may be included in the image or frame structure, rather than being stored separately in the descriptor SRAM 1052. For example, where legacy compatibility is not implemented, the entirety of the sequencing structure and tile structure may be described in the frame structure. In such an example, the frame format of FIG. 10I may include additional information for the descriptors, such as the tile width, trigger type, etc., to result in the same information being available to the HW sequencer control 1060 as when the descriptor(s) is separately stored in the descriptor SRAM 1052.

With reference to FIG. 10J, FIG. 10J is an example of the frame format 1070 of FIG. 10I when implemented for a raster scan sequence, in accordance with some embodiments of the present disclosure. For example, frame format 1070A is one example of a frame format in a raster mode with frame address processing, using a single channel, single trigger, and single descriptor. In this example, the tile structure may be 16×8. FIG. 10K is an example of this tile structure with hardware sequencing in the raster scan sequence with frame address processing using the example frame format 1070A, in accordance with some embodiments of the present disclosure. For example, for each tile row, the same descriptor (e.g., tile dimension) may be used (as indicated by "D1" in the visualization 1072), so that the same tile is applied 16 times along each row (from C1 to C16), and repeated for 8 rows from top to bottom (from R1 to R8). The sequence may include 20 bytes, as illustrated in the frame format 1070A, and each row may have N*2+bytes, where N represents the number of entries per row (as illustrated in FIG. 10J). As such, to sequence the frame as illustrated in visualization 1072, the frame format 1070A may include no frame repetition, the number of descriptor rows may be zero, no tile offset, no frame offset, frame padding of 3 lines of pixels on the left (PL), right (PR), top (PT), and bottom (PB), the row may be repeated 7 times (for a total of 8 rows), the offset of each row may be the tile height (Ty) (such that each row is offset by the tile height), one descriptor may be used with descriptor ID D1, and the descriptor may be repeated 15 times (for a total of 16 times) in each row. As such, in practice, the HW sequencer control may use the descriptor corresponding to D1 from the descriptor SRAM 1052 (which includes the tile height and tile width), and may use the image structure from the frame format 1072 stored in the HW sequencer control SRAM 1054, to sequence the image tile by tile (16 tiles per row), row by row (from R1 to R8), for the destination processor (e.g., a VPU). In this way, a single descriptor, single trigger, and single channel may be used, thereby reducing programming complexity, while also allowing the DMA system 1050 to be the primary or controlling component in the DMA system 1050 and VPU interactions.

In some embodiments, as an extension of the HW sequencer control 1060, a DMA trigger mode may be used to reduce software intervention in programming the VPU by having the DMA system 1050 command the sequence of descriptors. For example, the DMA system 1050 may read an image from external memory, tile the image, and sequence processing of the tiles for the VPU. To facilitate this, the VPU may expose start and done signals. The VPU start may be driven by the DMA system 1050 and, when the VPU has finished processing an instruction block, the VPU may send a done signal to the DMA system 1050. As such, the DMA system 1050 (e.g., the HW sequencer control 1060) and the VPU may engage in a handshake mechanism where the DMA system 1050 is the primary node and the VPU is the secondary node. This DMA trigger mode may minimize the VPU tile control overhead and simplify the programming model for the DMA engine 1056. For example, specific code for double buffering the DMA data movement may not be required, and DMA kernel code may be independent of VPU kernel code. As such, the DMA trigger mode simplifies the VPU code since the tile sequencing is handled by the DMA system using the HW sequencer control 1060. The example code below illustrates the VPU code before and after the DMA trigger addition.

Before:
```
for (int i=0; i<tot_tiles; i++)
   {
      check_and_clear_vpu_dma_read( );
      if (i<tot_tiles-1)
      {
        vpu_dma_read( );
      }
      cfg_save=(fg==PING) ? (dvuint
          *)(cfg_save_ping):(dvuint*)(cfg_save_pong);
      fg=(fg==PING) ? PONG:PING;
      vec_process_tile((dvuint *)cfg_save,niter);
      if (i)
      {
         check_and_clear_vpu_dma_write( );
      }
      vpu_dma_write( );
   }
   check_and_clear_vpu_dma_write( );
```
After:
```
for (int i=0; i<tot_tiles; i++)
   {
      wait_for_dmao;
      cfg_save=(fg==PING) ? (dvuint
          *)(cfg_save_ping):(dvuint*)(cfg_save_pong);
      fg=(fg==PING) ? PONG:PING;
      vpu_process_tile((dvuint *)cfg_save, niter);
      vpu_is_done( );
   }
```

As a result, where the VPU had previously been requesting a tile to be moved to VMEM, now, because the HW sequencer control 1060 controls the sequencing, the DMA system 1050 may trigger the moving of the tile to VMEM with the VPU as the target. In this way, the DMA system 1050 may fetch data to be processed by the VPU in advance and, when the VPU indicates processing is complete, the DMA system 1050 may have the next data to be processed immediately available (e.g., in VMEM), and may indicate the same to the VPU.

When performing processing of a frame(s), the HW sequencer control 1060 may retrieve the descriptor(s) from the descriptor SRAM 1052 (which may indicate the tile dimensions, trigger type etc.), and may retrieve the image structure from the HW sequencer command SRAM 1054. The HW sequencer command 1060—in combination with the register control 1058—may then begin traversing a first row or column according to the traversal order and using a first (and only, in embodiments) descriptor, and then may move to a second descriptor based on a number (e.g., 1–N) of repetitions being met where a two or more descriptors are used, and so on. As each tile is determined, the DMA engine 1056 may retrieve the tile data from the source data and write the tile data to the destination data (e.g., in VMEM). Once the data is written to the data destination, the processor (e.g., a VPU) may be notified by the HW sequencer control 1060 that the data is available for the processor to begin processing. Then, during processing, the DMA system 1050 may fetch a next tile of data based on the sequence from the HW sequencer control 1060 and write the data to the data destination, such that when the processor indicates processing is complete, the HW sequencer control 1060 may indicate to the VPU (via a handshake mechanism) that the next data to process is available, and so on, until processing is complete.

Figure 10L:
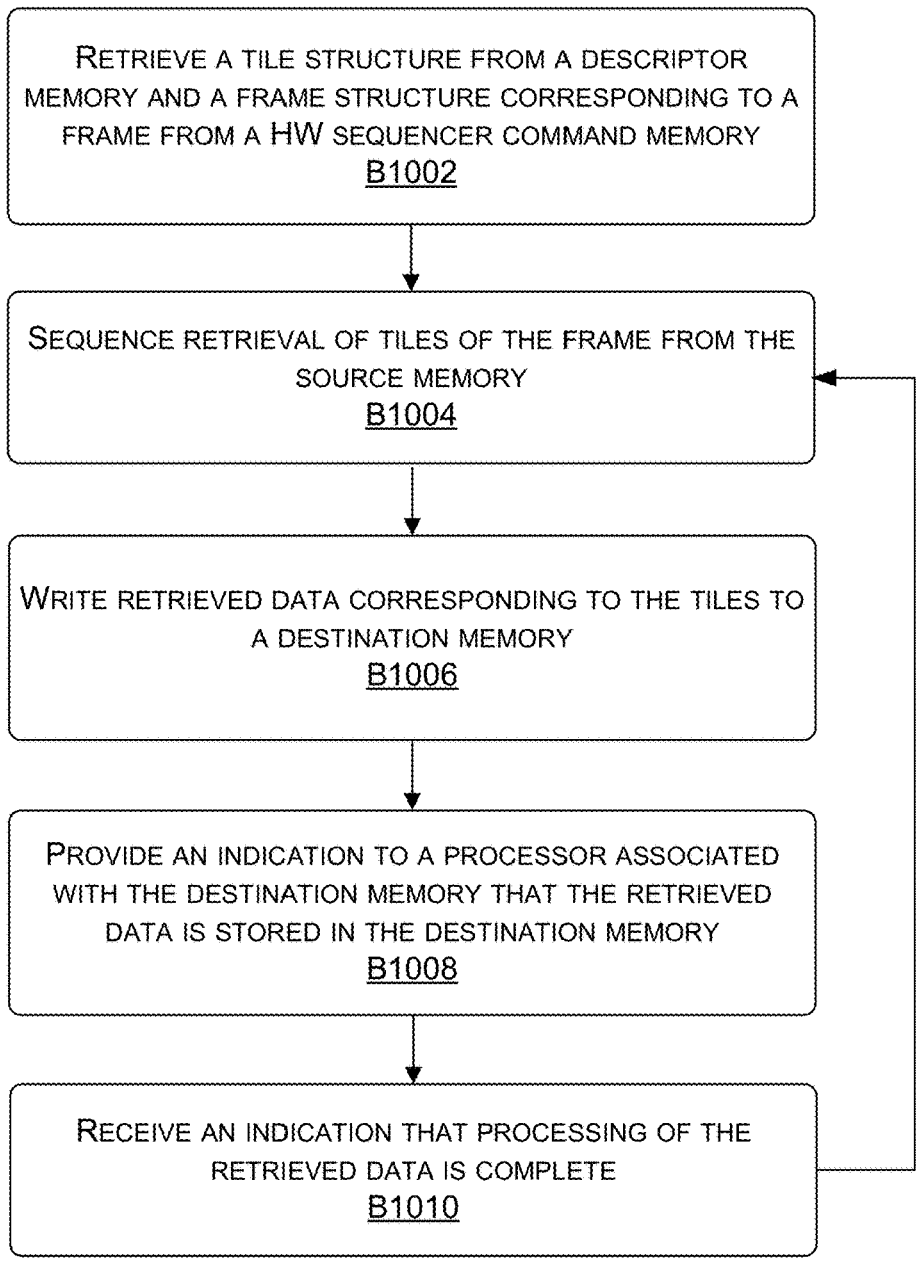
FIG. 10L is a flow diagram for a method of using a hardware sequencer in a DMA system, in accordance with some embodiments of the present disclosure.

Now referring to FIG. 10L, each block of method 1080, described herein, comprises a computing process that may be performed using any combination of hardware, firmware, and/or software. For instance, various functions may be carried out by a processor executing instructions stored in memory. The method 1080 may also be embodied as computer-usable instructions stored on computer storage media. The method 1080 may be provided by a standalone application, a service or hosted service (standalone or in combination with another hosted service), or a plug-in to another product, to name a few. In addition, method 1080 is described with respect to the system of FIG. 10H, the method 1080 may be executed by any one system, structure, or component, or any combination of systems, structures, or components, including, but not limited to, those described herein.

FIG. 10L is a flow diagram for a method 1080 for a DMA system including a hardware sequencer, in accordance with some embodiments of the present disclosure. The method 1080, at block B1002, includes retrieving a tile structure from a descriptor memory and a frame structure corresponding to a frame from a HW sequencer command memory. For example, the HW sequencer control 1060 may retrieve the descriptor(s) from the descriptor SRAM 1052.

The method 1080, at block B1004, includes sequencing retrieval of tiles of the frame from the source memory. For example, the hardware sequencer control 1060—in combination with the register control 1058, in embodiments—may sequence retrieval of tiles by the DMA engine 1056 from source memory according to the frame (or image) structure and the tile description from the descriptor(s).

The method 1080, at block B1006, includes writing retrieved data corresponding to the tiles to a destination memory. For example, the DMA engine 1056 may write the retrieved data corresponding to the tiles to the destination memory (e.g., VMEM) for processing by the destination processor (e.g., a VPU).

The method 1080, at block B1008, includes providing an indication to a processor associated with the destination memory that the retrieved data is stored in the destination memory. For example, the HW sequencer control 1060 may indicate to the processor that the data for a next tile is prepared for processing.

The method 1080, at block B1010, includes receiving an indication that processing of the retrieved data is complete. For example, upon completion of processing, the processor may indicate to the DMA system 1050 that processing is complete, at which time a next tile of data may be loaded (or may have been pre-loaded) to the destination memory, and the DMA system 1050 may indicate the same to the processor.

Using a VPU to Configure a DMA System for Region Dependent Data Movement

When fetching known data patterns, a processing controller may configure a direct memory access (DMA) system and a processor (e.g., a vector processing unit (VPU)) may trigger and sequence the DMA. However, when processing different data points or features for irregular or unknown data patterns, challenges may be introduced in reconfiguring data movement since the feature or object locations are dynamically computed. For example, object tracking algorithms, feature tracking algorithms, object detections algorithms, deep learning algorithms that use variable size regions of interest (ROI), and/or other region dependent data movement algorithms require dynamic adjustment to address and data pairs such that a DMA system can retrieve the proper information for a processor—such as a VPU—to process. In conventional systems, when fetching unknown data patterns—such as in object tracking—a processing controller (e.g., an R5 processor core for controlling a programmable vision accelerator (PVA)) may require an interrupt to intervene in the processing cycle to determine updated information computed by the processor (e.g., a VPU) and to reconfigure the DMA and for a next iteration. As such, the processing controller introduces extra latencies to, e.g., a tracking algorithm, that requires a short response time.

To account for the drawbacks of conventional systems, which require intervention by a processing controller, the systems and methods of the present disclosure may use the DMA and the processor (e.g., VPU) to configure a tightly coupled processing loop that allows the DMA to reconfigure its descriptors based on outputs of the processor. As such, the DMA may be reprogrammed dynamically at run time to handle certain algorithms that require region-dependent data movement. This VPU configure mode may be used to update descriptors of a DMA to track feature data—including location—based on run time VPU computations. As such, the VPU may specify a list of address and data pairs in memory—such as VMEM—and then to trigger the DMA to update its own descriptors to collect data from regions that have newly computed addresses. By relying on an interface between the VPU and DMA, the processing controller (e.g., an R5 or ARM processing core) may not be required to intervene once the processing controller initially configures the VPU and DMA to begin processing. This bulk, fast, and synchronous MMIO access to update functional descriptors thus reduces the latency in object tracking, feature tracking, object detection, deep learning, and/or other algorithms with region dependent data movement.

Figure 11A:
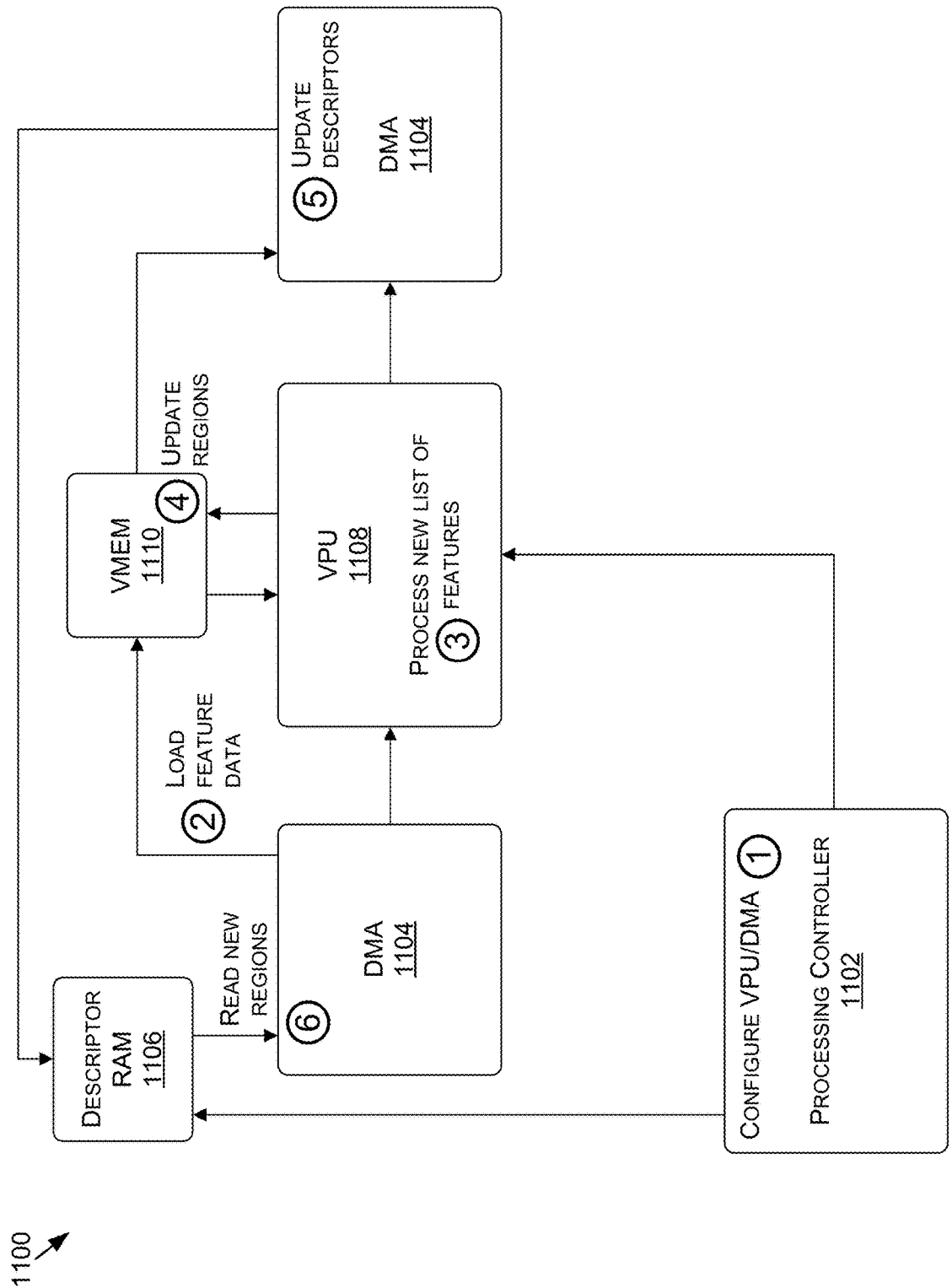
FIG. 11A illustrates data flow diagram for a process of configuring a direct memory access (DMA) system using a vector processing unit (VPU), in accordance with some embodiments of the present disclosure.

Now referring to FIG. 11A, FIG. 11A illustrates data flow diagram 1100 for a process of configuring a direct memory access (DMA) system using a vector processing unit (VPU), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the process 1100 may be executed by a system that includes similar components, features, and/or functionality to that of example autonomous vehicle 1300 of FIGS. 13A-13D, example computing device 1400 of FIG. 14, and/or example data center 1500 of FIG. 15.

The system that performs the process 1100 may include a processing controller 1102 (e.g., an R5 processor, an ARM processing core, an instruction set architecture (ISA), an X86 architecture, etc.), a direct memory access (DMA) system 1104, a vector processing unit (VPU) 1108 (or another processor type), a vector memory (VMEM) 1110 (or another memory type), and a descriptor RAM 1106. In practice, the VPU configure mode may configure the DMA descriptors by writing a sequence of non-contiguous address/data pairs to DMA descriptor SRAM. The process 1100 may be described with respect to an example feature or object tracking algorithm. However, this is not intended to be limiting, and the process 1100 and the underlying system may be used to execute any type of algorithm, such as those with region dependent data movement.

For example, a first operation may include the processing controller 1102 configuring the DMA 1104 and the VPU 1108 to perform processing on some data, and then triggering both the DMA 1104 and the VPU 1108 to being processing. For example, the processing controller 1102 may load the descriptor RAM 1106 with a starting point in memory for the processing and may configure the registers of the VPU 1108 for the particular type of operation the VPU 1108 will perform on the data.

For a second operation, the VPU 1108 may trigger the DMA 1104 to read initial feature data points in the VMEM 1110. For example, to begin work, the VPU 1108 needs data from the DMA 1104, so the VPU 1108 configures the DMA 1104 to load data points to VMEM 1110 at a location where the VPU 1108 knows to retrieve the data for processing.

At a third operation, the VPU 1108 may process the current feature data set, and compute a next tracked object or feature location. As a result, the VPU 1108 may now have computed a new or updated location for the tracked feature or object.

At a fourth operation, the VPU 1108 may updated VMEM 1110 with the updated locations using a VPU configuration format (described with respect to FIG. 11B), and then may trigger the DMA 1104 to update its descriptors in the descriptor RAM 1106. For example, FIG. 11B is a table 1120 illustrating a VPU configuration format written by a VPU in vector memory (VMEM) and read by a DMA system, in accordance with some embodiments of the present disclosure. For example, the format may include, for each address/data pair, four bytes for the address and four bytes for the data.

At a fifth operation, the DMA 1104 may update the descriptors in descriptor RAM 1106 in order to retrieve the proper data for a next iteration of processing by the VPU 1108. For example, the DMA 1104 may read the address/data pairs form the VPU configuration format to patch operating descriptors with the updated location. In embodiments, there may be a one to one correspondence between feature points and descriptors, such that each tracked feature, object, or point may include an associated descriptor. In this way, an address/data pair for each tracked feature, object, or point may be updated over time using an individual descriptor.

At a sixth operation, the DMA 1104 may use the newly updated descriptors in the descriptor RAM 1106 to fetch new feature data for the locations. For example, the DMA 1104 may indicate to the VPU 1108 that the descriptors have been updated, and the VPU 1108 may trigger the DMA 1104 to read the new data to VMEM 1110, and so on.

As a result, after the first configuration operation by the processing controller, operations two through six may be repeated to form a tightly synchronous VPU configuration loop that does require processing controller intervention—thus reducing latency to account for the short response time required by tracking or detection algorithms. In addition, because the DMA 1104 is overwriting addresses in memory with new updated addresses, the DMA 1104 is updating code that the DMA 1104 needs to look at to figure out what to fetch next. By doing this, throughput is increased as opposed to conventional systems that relied on control busses to update registers with addresses and data. Thus, the benefit of defining an address/data protocol is realized where a variable amount of address locations with a variable amount of data may be updated along with how the address/data pairs are updated. This allows the DMA 1104—which may have a width greater than the width of a control bus (e.g., 512 bits vs 32 bits, respectively)—to be updated up to (for example and without limitation)_ 8 address/data pairs at a time (where each address/data pair is defined using 8 bytes, as in FIG. 11B).

Further, although the DMA is illustrated as being updated using the VPU configuration mode of the process 1100, additional or alternative elements or components of the system may be updated. For example, an instruction cache of the VPU 1108 may be updated using the VPU using a similar approach. As another example, an updated hardware sequencer program may be written to update hardware sequencer memory by giving address data. This would include, in essence, writing a hardware sequencer RAM with a new program—such as the hardware sequencer RAM 1054 for the hardware sequence controller 1060 of FIG. 10H.

Now referring to FIG. 11C, each block of method 1150, described herein, comprises a computing process that may be performed using any combination of hardware, firmware, and/or software. For instance, various functions may be carried out by a processor executing instructions stored in memory. The method 1150 may also be embodied as computer-usable instructions stored on computer storage media. The method 1150 may be provided by a standalone application, a service or hosted service (standalone or in combination with another hosted service), or a plug-in to another product, to name a few. In addition, method 1150 is described with respect to the system of FIG. 11A, the method 1150 may be executed by any one system, structure, or component, or any combination of systems, structures, or components, including, but not limited to, those described herein.

FIG. 11C is a flow diagram for a method 1150 of configuring a DMA system using a VPU, in accordance with some embodiments of the present disclosure. The method 1150, at block B1102, includes computing, using a processor and based at least in part on first data written to memory using a DMA system, a first output corresponding to one or more first updated locations of a tracked feature. For example, the VPU 1108 may access data from VMEM 1110 that was written to VMEM 1110 using the DMA 1104, and may process the data to compute one or more object locations corresponding to a tracked feature, object, point, etc.

The method 1150, at block B1104, includes updating, using the processor, memory to include second data representative of one or more address/data pairs corresponding to the one or more first updated locations. For example, after computing the one or more locations, the VPU 1108 may update the VMEM 1110 with address/data pairs in a format, such as the format described with respect to FIG. 11B.

The method 1150, at block B1106, includes updating, using the DMA system and based at least in part on the one or more address/data pairs, one or more descriptors corresponding to the tracked feature. For example, the DMA 1104 may access the address/data pairs from the VMEM 1110 and use the address/data pairs to update descriptors in the descriptor RAM 1106 for a next read operation.

The method 1150, at block B1108, includes writing, using the DMA system and based at least in part on the one or more descriptors, third data to the memory. For example, the DMA 1104 may write the updated data from corresponding to the address/data pairs as identified using the descriptors to VMEM 1110.

The method 1150, at block B1110, includes computing, using the processor and based at least in part on the third data, a second output corresponding to one or more second updated locations of the tracked feature. For example, once the updated data is in VMEM 1110, the VPU 1108 may compute a next set of updated address/data pairs corresponding to the tracked feature, object, point, etc., and this process may repeat until the processing is complete.

Permanent Fault Detection in a Programmable Vision Accelerator (PVA)

In safety critical applications, such as autonomous and semi-autonomous machine applications, there are strict requirements for permanent fault detection and isolation. For example, when executing deep learning, computer vision, sensor processing, and/or other applications in a machine, permanent fault detection must be executed periodically and within an allotted time budget in order to allow for accurate testing, but also to allow the application to perform properly—e.g., with low latency. With respect to automotive safety integrity level (ASIL) D, applications executing in the autonomous or semi-autonomous machine may require 90% or more coverage of permanent faults. To do this, coverage from end-to-end may be required, with low latency, while meeting a running time budget of each particular application. Conventional approaches use built-in self-test (BIST) to identify faults, but these BIST techniques either do not include adequate coverage, introduce too much latency into the system, and/or do not meet running time budgets for certain applications.

To account for the deficiencies of these conventional approaches, the present systems and methods may execute a multiple input signature register (MISR) BIST—e.g., to perform fault detection of a programmable vision accelerator (PVA) of a system on a chip (SoC). For example, in various embodiments of the present disclosure, a PVA may include one or more DMA systems and one or more VPUs that are controlled using one or more processing controllers (or control processors), such as an R5 processor, and ARM processor, a CPU, and/or the like. As such, each component of the PVA may require testing, and the present systems and methods execute the MISR BIST to detect permanent faults in an end-to-end fashion. In this way, the permanent fault detection may be executed to cover end-to-end blocks for both control and data logic, with direct error reporting to a safety processor to reduce latency, and with customization for particular applications to satisfy associated running time budgets.

In various embodiments, MISR may be used in the PVA to implement a software logic BIST for permanent fault detection. The MISR hardware—described herein with respect to FIGS. 12A and/or 12B—may include a cyclic redundancy check (CRC) hardware that is initialized—e.g., with a known seed value—using a processing controller. Upon executing PVA applications, the processing controller may allocate a portion of the timing budget—e.g., ~10% or less of the timing budget—to run a known software MISR test with a known input that has a deterministic precomputed output with the correct signature or golden value. For example, where a timing budget corresponds to 30 frames per second, the timing budget corresponding to 3 or less of the frames may be allocated to the MISR testing. At the allocated time(s), the processing controller may launch the MISR test and await test completion to terminate the MISR CRC computation. Once the testing is completed, the MISR hardware may read back the final CRC value and check the final CRC value against a precomputed golden value. In the case of a mismatch, the MISR hardware may report the error directly to a safety processor of a SoC to take further action to handle the safety error—e.g., to cause outputs of the application to be disregarded, to address or work around the permanent fault, etc.

As such, the MISR hardware in the DMA block may monitor one or more (e.g., all, in embodiments) of the transactions on one or more (e.g., all, in embodiments) of the advanced extensible interface (AXI) master ports of the PVA. By examining all output stages from PVA, in embodiments, the safety integrity of the PVA may be checked against permanent defects that can corrupt the output stage—e.g., the output information—that may potentially be consumed by the PVA and/or another engine when executing an application. The MISR hardware may thus detect errors across different blocks of the PVA (e.g., the processing controller(s), the VPU(s), and the DMA system(s)) since these components all collaborate and interact on producing the output stage. The computed signature in MISR hardware may represent the state of these different blocks of the PVA throughout the duration of the MISR test.

In embodiments, the MISR scheme may include a CRC check on both write addresses (e.g., 40 bits control) and write data (e.g., 512 bits data) leaving the AXI master ports. This feature may allow isolation of the control path faults (e.g., errors in addressing) from the data path faults (e.g., errors in computations). Due to the configuration of the MISR hardware—as described herein—each DMA AXI port may be capable of being checked. In embodiments, a control bit may be used to disable writing the address and data outputs for all channels that are participating in MISR computation, in order to save on bandwidth consumption in the memory subsystem and during memory allocation. Further, the MISR scheme may include a control register bit per channel to exclude or mask specific channels from MISR computation—e.g., to isolate non-safety channels. The DMA may, in embodiments, use IEEE 802 and MPEG CRC-32 primitive polynomials to compute the MISR CRC: $X^{32}+X^{26}+X^{23}+X^{22}+X^{16}+X^{12}+X^{11}+X^{10}+X^9+X^7+X^5+X^4+X^2+X+1$. MISR SET registers may be used to set the initial CRC values (e.g., seed values) for both address and data CRC computations. MISR REF registers may be used to compare the CRC value for both address and data CRC computations.

To support MISR on 512 bit data, 8:1 bit data compression may be applied—e.g., each data byte may be compressed into 1 data bit via an 8>1 exclusive OR (XOR) operation to form 2×32 bit message data. To support MISR 40 bit addresses, 9 most significant bits may be compressed—e.g., 9 most significant address bits may be compressed via a 9>1 XOR operation to form 32 bit message addresses. Variations on test patterns and instructions may be used to cover an aliasing related to compression. The probability of hitting aliasing may be low because when there is an even number of errors in a byte on the output image the error failure does not produce an address CRC error. In addition, aliasing may be unlikely because the reference CRC may be computed on an output image that has the same pattern on the same even error bit positions across the entire duration of the MISR test. During experimentation, aliasing was shown to cause an average of 0.25% loss in coverage. Data compression with such low aliasing is valuable due to the width of the bus—e.g., 512 bits—in embodiments, and without the compression the MISR test may not satisfy the latency or running time budgets of the system.

A MISR timer register may be used to time out the MISR computation, and the MISR timer register may be decremented on every AXI clock. The timeout feature may help in case of faults that cause the MISR test to hang, which may prevent the MISR hardware from reporting the error. A software event may be used by the processing controller to stop MISR computation when the MISR test ends. The DMA system may compare the MISR REF value with a MISR VAL value for both data and address outputs of the MISR test, and the DMA hardware may update MISR status registers based on the result of the comparison. For example, the MISR status registers may include one of the following values: 0: idle; 1: done: fail data; 3: busy; 4: done: fail both address and data; 5: done: fail timeout; 6: RSVD; and 7: done: pass. In the case of a MISR timeout error, the DMA may generate a timeout signal to the safety processor, and in the case of a CRC check error in the data and/or the addresses, the DMA may assert a safety error to the safety processor.

Figure 12A:
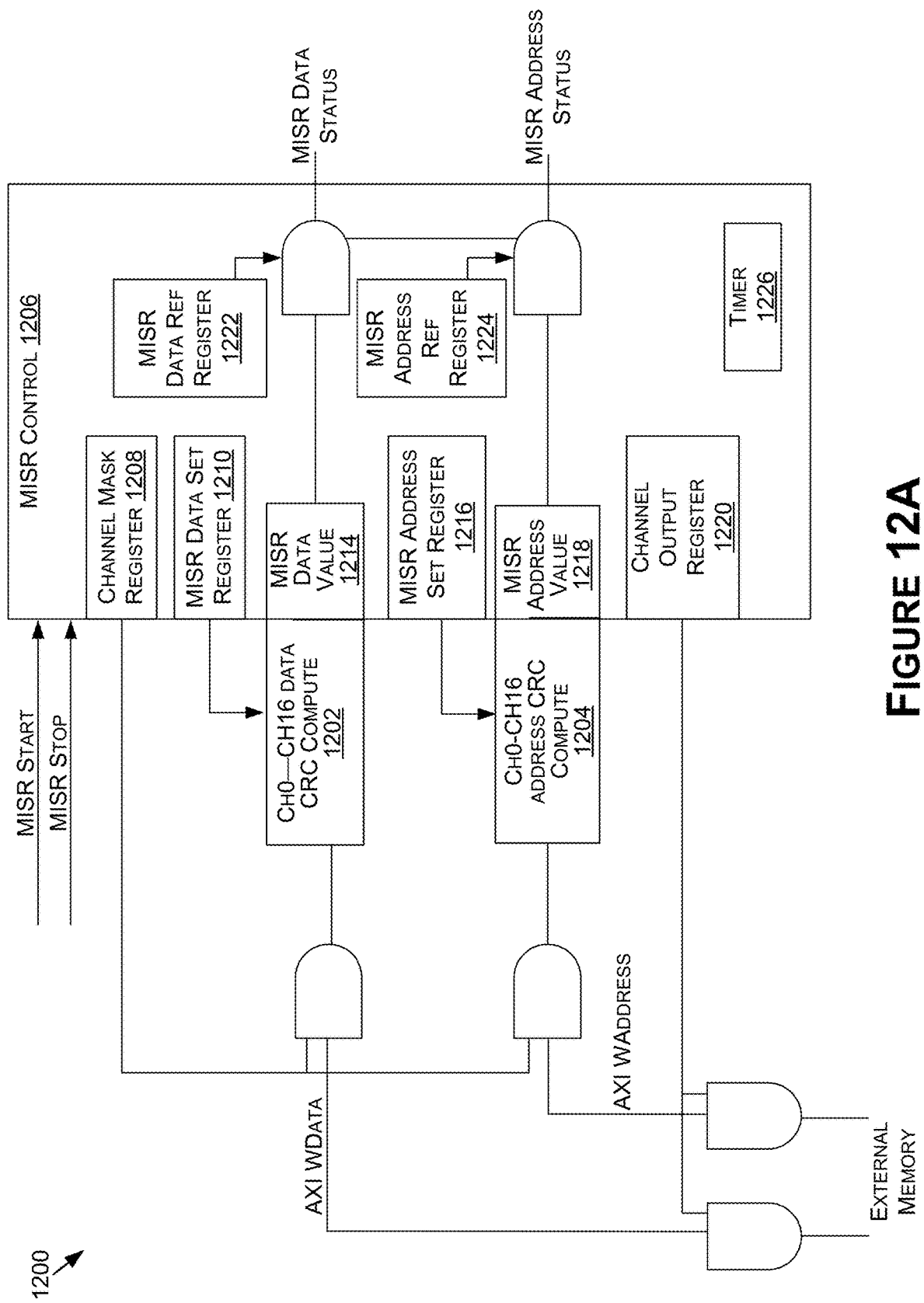
FIG. 12A is a built-in self-test (BIST) system diagram for performing cyclic redundancy check (CRC) computations of a programmable vision accelerator (PVA), in accordance with some embodiments of the present disclosure.

With reference to FIG. 12A, FIG. 12A is a built-in self-test (BIST) system diagram for performing cyclic redundancy check (CRC) computations of a programmable vision accelerator (PVA), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, MISR hardware 1250 may include similar components, features, and/or functionality to that of the DMA system 1050 of FIG. 10H, example autonomous vehicle 1300 of FIGS. 13A-13D, example computing device 1400 of FIG. 14, and/or example data center 1500 of FIG. 15. For example, the MISR hardware 1200 may be included in a DMA block of a PVA, such as illustrated in FIG. 10H. As such, the MISR hardware 1200 may operate on the output stages of data movement and addressing (or control) may tapping into the outputs of the DMA engine 1056. In the example of FIG. 12A, there may be 16 AXI data channels and 16 AXI address (or control) channels. However, this is not intended to be limiting, and any number (and/or type) of data and/or address channels may be used depending on the embodiment.

In operation, a processing controller may control the DMA system 1050 and the MISR hardware 1200—as well as one or more processing components of the system, such as a VPU. When performing MISR tests for the DMA system 1050, in embodiments, the test code may include all 0's, all 1's, alternating 0's and 1's, and/or random code sequences. In this way, high coverage may be achieved for the DMA system 1050. When testing the VPU, for example, the test code may include application specific or customized code. For example, during testing of coverage for a particular application, the components or portions of the VPU (e.g., registers, logic, etc.) that are used may be determined, and the test code may be generated such that those specific components or portions of the VPU are included in executing the test code. For example, this random data with different instructions may be included in the test code so that the test is sequenced through different instructions to use different areas of the VPU logic. In this way, coverage is increased for the VPU in general, and specifically for the particular application executing on the VPU. By performing DMA and VPU tests in this way, and because the processing controller is involved in the control and interaction between the various components (e.g., DMA system 1050 and VPU), the processing controller may have high coverage as the outputs of the data movements and addressing have been influenced by the processing controller interactions.

During testing, where different code patterns are used, the code patterns may be used in an alternating pattern, or one code may be used for a first time frame (e.g., time equivalent of 30 fps), another code for a second time frame (e.g., time equivalent of 30 fps), another code for a third time frame (e.g., time equivalent of 30 fps), and so on. For example, in the DMA code example, the code of 0's may be used for a first time frame, then the code of 1's for a second time frame, then the code of alternating 0's and 1's (e.g., 0101010101 . . . ) for a third time frame, and then a random code (e.g., 011100100010 . . . ) for a fourth time frame, and then these four codes may be repeated, and so on.

In practice, when testing the DMA, for example, the processing controller may interact with a MISR control 1206 to write a set reference value in MISR data set register 1210 and MISR address set register 1216. These values may be different for data and address, and may be referred to as the seed values for the CRC computations. The processing controller may then initialize channels that are performing data movement in the DMA engine 1056, and because the location of the test code in memory is known to the processing controller, the descriptor (e.g., as configured by the processing controller in the descriptor SRAM 1052) may be used to sequence the DMA engine 1056 through the data for the MISR test. The processing controller may set a timer 1226 on the MISR hardware 1200 to enable the MISR test, and then may trigger the channel(s) of the DMA engine 1056 to begin reading the test data from the source destination and to output the data to the MISR hardware 1200 for the MISR test. As such, when testing the DMA, the data movement is being tested (e.g., proper addressing and proper data in the addressing locations), so the MISR hardware 1200 may tap into the outputs of the DMA engine 1056 when performing the data movement of the test code. This tap into the output stage may be indicated in FIG. 12A as the external memory, which may be funneled—one data channel at a time and one address channel at a time—as sequenced by the processing controller. For example, for the data channels, the processing controller may sequence through each of the, e.g., 16 data channels, and the corresponding AXI write data (wdata) for each channel may be fed through the CH0-CH16 data CRC compute 1202—e.g., in series. For example, the processing controller may configure channel output register 1220 to sequence through the channels one at a time according to the configured sequence from the processing controller. In embodiments, a channel mask register 1208 (e.g., programmed by the MISR control 1206 based on an interaction with the processing controller) may be configured by the processing controller to mask out or remove various channels—e.g., channels not under test—from the CRC computation. This masking may be performed using an AND gate, in embodiments. Where one or more channels are masked out, the golden value in MISR data ref register 1222 (which may be supplied by the processing controller to the MISR control 1206) may only correspond to the CRC computations for the unmasked channels. For each unmasked channel, the data on the channel—generated using the test code read from memory—may be applied (e.g., with or without compression) to the polynomial of the CRC data compute 1202 to generate a MISR data value 1214 for that channel. Once a channel is finished compute, the processing controller may receive an indication, and may cause a next channel of data to be sent to the CRC compute 1202 to compute a next MISR data value 1214, and so on, until each of the unmasked channels have a corresponding MISR data value 1214. Once each of the MISR data values 1214 for the particular iteration have been computed, these values 1214 may be combined to generate a final MISR data value that may be compared to a golden value in the MISR data ref register 1222 to generate a MISR data status determination (e.g., which may include statuses corresponding to the values of 0-7, above).

As another example, for the address channels, the processing controller may sequence through each of the, e.g., 16 address or control channels, and the corresponding AXI write address (waddress) for each channel may be fed through the CH0-CH16 address CRC compute 1204—e.g., in series. In embodiments, the channel mask register 1208 may be configured by the processing controller to mask out or remove various channels—e.g., channels not under test—from the CRC computation. This masking may be performed using an AND gate, in embodiments. Where one or more channels are masked out, the golden value in MISR data ref register 1224 may only correspond to the CRC computations for the unmasked channels. For each unmasked channel, the address on the channel—generated using the test code read from memory—may be applied (e.g., with or without compression) to the polynomial of the CRC address compute 1204 to generate a MISR address value 1218 for that channel. Once a channel is finished compute, the processing controller may receive an indication, and may cause a next channel of address data to be sent to the CRC compute 1204 to compute a next MISR address value 1218, and so on, until each of the unmasked channels have a corresponding MISR address value 1218. Once each of the MISR address values 1218 for the particular iteration have been computed, these values 1218 may be combined to generate a final address MISR value that may be compared to a golden value in the MISR address ref register 1224 to generate a MISR address status determination (e.g., which may include statuses corresponding to the values of 0-7, above).

In some embodiments, the MISR test may be iterative, such that first code may be processed, the output may be tested, and then the output may be used for a next iteration that may be tested, and so on. In such embodiments, the MISR test may include a plurality of stages, and completed MISR test may include performing each stage.

Where the MISR hardware 1200 is used to test the VPU specifically, for example, the DMA system 1050 may move the test code into VMEM, the VPU may process the test code and write the results back to VMEM, and the DMA engine 1056 may read the results from VMEM back to a destination location. When writing the results back to the destination location, the MISR hardware 1200 may tap into the DMA output and perform MISR on the data (e.g., including data and addresses), and perform the MISR similar to as discussed herein. In this way, the interaction of the VPU with the test code may be tested using the MISR hardware 1200.

After completion of the MISR test, the processing controller may receive an interrupt. For example, the processing controller may receive a done interrupt, and where no error, may wait for a next MISR test cycle. Where the interrupt is an error interrupt, the type of error may be determined—e.g., fail data, fail address, fail both, etc.—and a safety error may be asserted to the safety processor. In some embodiments, where the MISR hardware 1200 gets hung up or idles (e.g., has a timeout error), for example, the DMA may generate timeout signal to the safety processor of the SoC.

In some embodiments, to speed up the MISR calculation to compute CRC on one or more (e.g., all, in embodiments, such as 16) channels without serializing or staging the channel-MISR computation, the channels may be demultiplexed based on channel ID present in an AXI ID field to parallelize channel computation. For example, due to the CRC computations being completed at different rates, the approach of FIG. 12A included serial processing of the channels one after another. However, using the system of FIG. 12B, described below, these computations may be completed in parallel. When the processing controller terminates the MISR computation, for example, the MISR controller may sequence in all channel outputs to compute a final signature that may be compared against a reference or golden value for both address and data outputs. This feature may speed up permanent fault detection without requiring an additional programmer register interface—e.g., because the same control registers may be used for all channels.

Figure 12B:
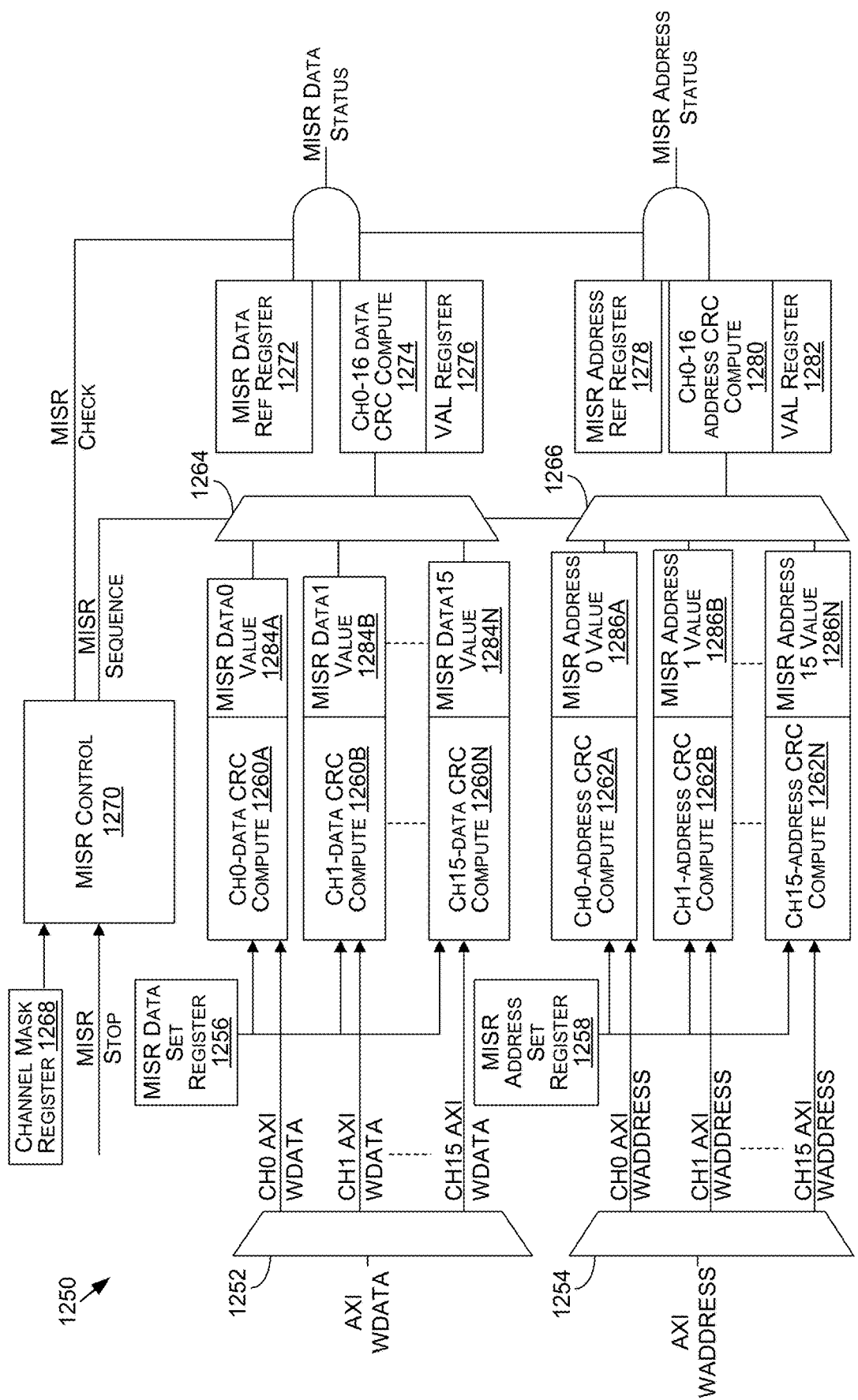
FIG. 12B is a BIST system diagram for parallel channel CRC computations of a PVA, in accordance with some embodiments of the present disclosure.

As such, and with reference to FIG. 12B, FIG. 12B is a built-in self-test (BIST) system diagram for parallel channel cyclic redundancy check (CRC) computations of a programmable vision accelerator (PVA), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the MISR hardware 1250 may include similar components, features, and/or functionality to that of the DMA system 1050 of FIG. 10H, example autonomous vehicle 1300 of FIGS. 13A-13D, example computing device 1400 of FIG. 14, and/or example data center 1500 of FIG. 15. For example, the MISR hardware 1250 may be included in a DMA block of a PVA, such as illustrated in FIG. 10H. As such, the MISR hardware 1250 may operate on the output stages of data movement and addressing (or control) may tapping into the outputs of the DMA engine 1056. In the example of FIG. 12A, there may be 16 AXI data channels and 16 AXI address (or control) channels. However, this is not intended to be limiting, and any number (and/or type) of data and/or address channels may be used depending on the embodiment.

The MISR hardware 1250 may operate similarly to the MISR hardware 1200 of FIG. 12A, except the MISR hardware 1250 may be configured for parallel data channel and parallel address channel CRC computations. For example, the processing controller may configure the MISR data set register 1256 for setting seed or reference values for each data CRC compute 1260A-1260N (corresponding to AXI data channels 0-15, respectively) and may configure the MISR address set register 1258 for setting seed or reference values for each address CRC compute 1262A-1262N (corresponding to AXI address channels 0-15, respectively). The processing controller, similar to described with respect to FIG. 12A, may then trigger the data movement (e.g., for DMA testing) and/or the VPU processing (e.g., for VPU specific testing) of the DMA system 1050 to move data around, and the MISR hardware 1250 may tap into the output stage(s) to be tested.

As such, the processing controller may cause the 16 channels of data to be sent to multiplexer (mux) 1252 and the 16 channels of address data to be sent to the multiplexer (mux) 1254. The mux 1252 may then supply the corresponding channel of data to the corresponding CRC compute 1260A-1260N (e.g., channel 0 AXI data to channel 0 CRC compute 1260, channel 1 data to channel 1 CRC compute 1260B, and so on), and each CRC compute 1260 may use the data and the CRC polynomial with the reference value to compute a MISR data value 1284A-1284N (e.g., channel 0 CRC compute 1260A may compute MISR data0 value 1284A, channel 1 CRC compute 1260B may compute MISR data1 value 1284B, and so on). The MISR data values 1284A-1284N may then be sequenced out of multiplexer (mux) 1264 according to MISR sequence from MISR control 1270 as configured by the processing controller. In embodiments, such as described with respect to FIG. 12A, one or more channels may not be included in the particular MISR test, so a channel mask register 1268 may be configured by the processing controller to update the MISR sequence such that MISR data values 1284 corresponding to the one or more masked channels are not provided to channel 0-16 data CRC compute 1274 for computing a final CRC value. For the channels that are unmasked, the MISR data values 1284 may be output by the mux 1264 according to the MISR sequence. In this way, the different computation times for different channels and CRC computes 1260 are accounted for, as the MISR data values 1284 are forced to be output according to the MISR sequence instead of being sent to the CRC compute 1274 according to the timing of the CRC computations being completed. Once the MISR sequence of MISR data values 1284 are output by the mux 1264 to the CRC compute 1274, the CRC compute 1274 may compute a final CRC value and store the final CRC value to the VAL register 1276. The final CRC value in the VAL register 1276 may then be compared to a golden value in the MISR data ref register 1272 (as configured by the MISR control 1270 from the processing controller) to determine the MISR data status.

Similarly, the processing controller may cause the 16 channels of addresses to be sent to multiplexer (mux) 1254, and the mux 1254 may then supply the corresponding address channel to the corresponding CRC compute 1262A-1262N (e.g., channel 0 AXI address to channel 0 CRC compute 1262, channel 1 address to channel 1 CRC compute 1262B, and so on), and each CRC compute 1262 may use the address and the CRC polynomial with the reference value to compute a MISR address value 1286A-1286N (e.g., channel 0 CRC compute 1262A may compute MISR address0 value 1286A, channel 1 CRC compute 1262B may compute MISR address1 value 1286B, and so on). The MISR address values 1286A-1286N may then be sequenced out of multiplexer (mux) 1266 according to MISR sequence from MISR control 1270 as configured by the processing controller. In embodiments, such as described with respect to FIG. 12A, one or more channels may not be included in the particular MISR test, so a channel mask register 1268 may be configured by the processing controller to update the MISR sequence such that MISR address values 1286 corresponding to the one or more masked channels are not provided to channel 0-16 address CRC compute 1280 for computing a final CRC value. For the channels that are unmasked, the MISR address values 1286 may be output by the mux 1266 according to the MISR sequence. In this way, the different computation times for different channels and CRC computes 1262 are accounted for, as the MISR address values 1286 are forced to be output according to the MISR sequence instead of being sent to the CRC compute 1280 according to the timing of the CRC computations being completed. Once the MISR sequence of MISR address values 1286 are output by the mux 1266 to the CRC compute 1280, the CRC compute 1280 may compute a final CRC value and store the final CRC value to the VAL register 1282. The final CRC value in the VAL register 1282 may then be compared to a golden value in the MISR address ref register 1278 (as configured by the MISR control 1270 from the processing controller) to determine the MISR address status.

The MISR data status and the MISR address status may be checked and used similarly to the description above with respect to FIG. 12A.

Figure 12C:
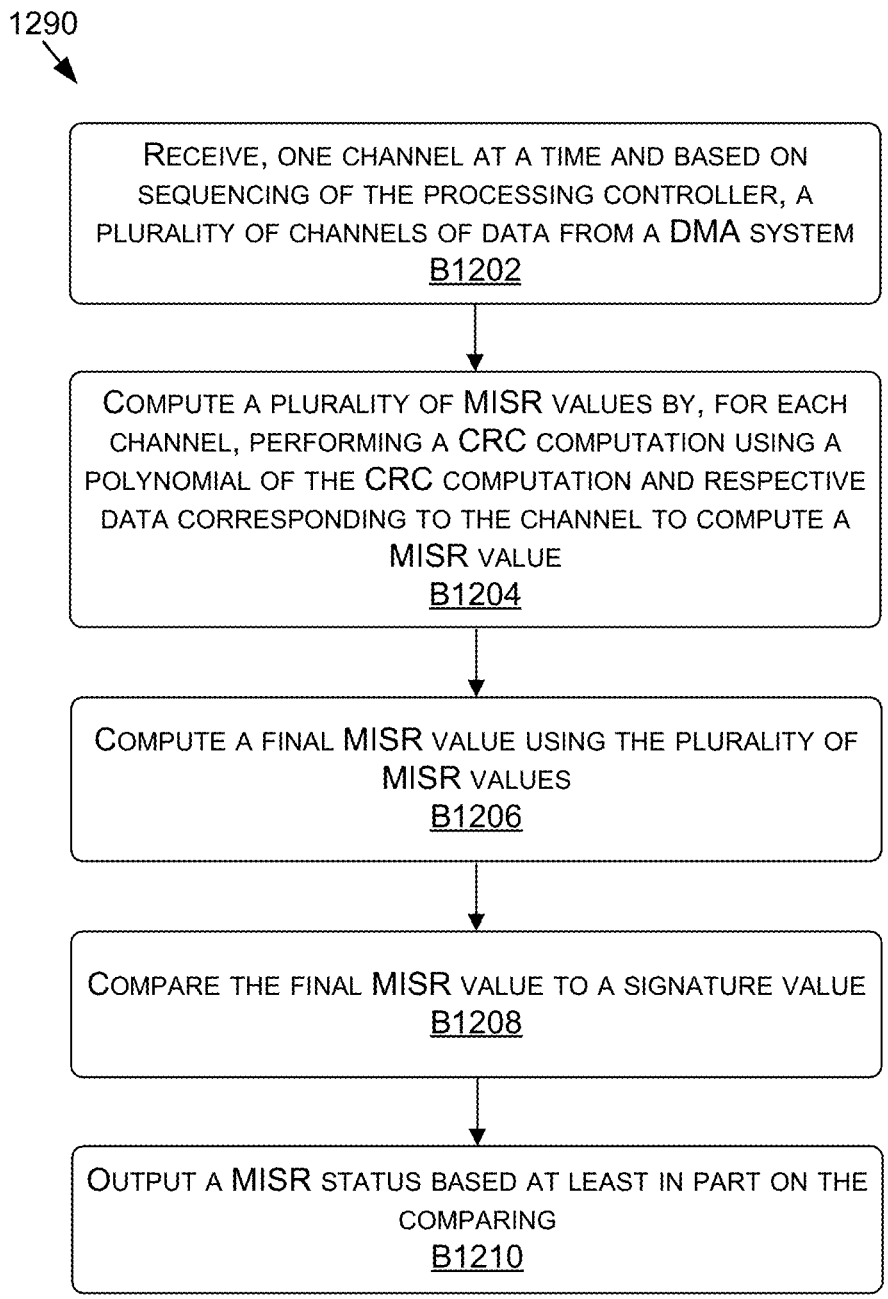
FIG. 12C is a flow diagram for a method of executing (BIST) for permanent fault detection in a PVA, in accordance with some embodiments of the present disclosure.

Now referring to FIG. 12C, each block of method 1290, described herein, comprises a computing process that may be performed using any combination of hardware, firmware, and/or software. For instance, various functions may be carried out by a processor executing instructions stored in memory. The method 1290 may also be embodied as computer-usable instructions stored on computer storage media. The method 1290 may be provided by a standalone application, a service or hosted service (standalone or in combination with another hosted service), or a plug-in to another product, to name a few. In addition, method 1290 is described with respect to the system of FIG. 12A, the method 1290 may be executed by any one system, structure, or component, or any combination of systems, structures, or components, including, but not limited to, those described herein.

FIG. 12C is a flow diagram for a method 1290 of executing (BIST) for permanent fault detection in a PVA, in accordance with some embodiments of the present disclosure. The method 1290, at block B1202, includes receiving, one channel at a time and based on sequencing of the processing controller, a plurality of channels of data from a DMA system. For example, the MISR hardware 1200 may receive one channel of data (or one channel of address data) at a time according to a sequence as determined by the processing controller.

The method 1290, at block B1204, includes computing a plurality of MISR values by, for each channel, performing a CRC computation using a polynomial of the CRC computation and respective data corresponding to the channel to compute a MISR values. For example, for each channel, the CRC compute 1202 (or 1204 for addresses) may compute a MISR data value 1214 (or MISR address value 1216 for addresses) using the data (or address) from the channel and a polynomial of the CRC compute 1202 (starting with a seed value from the CRC MISR data set register 1210, or MISR address set register 1216).

The method 1290, at block B1206, includes computing a final MISR value using the plurality of MISR values. For example, the MISR data values 1214 from each channel (or the MISR address values from each channel) may be combined to generate a final MISR value.

The method 1290, at block B1208, includes comparing the final MISR value to a signature value. For example, the final MISR value generated from the individual MISR values 1214 (or address values 1216) may be compared to a signature or golden value of the MISR data ref register 1222 (or the MISR address ref register 1224 for addresses).

The method 1290, at block B1210, includes outputting a MISR status based at least in part on the comparing. For example, based on the comparing at block B1208, a status—e.g., fail data, fail address, both fail, done, etc.—may be determined, and this status may be used to notify the safety processor of the SoC where an error status is generated.

Example Autonomous Vehicle

Figure 13A:
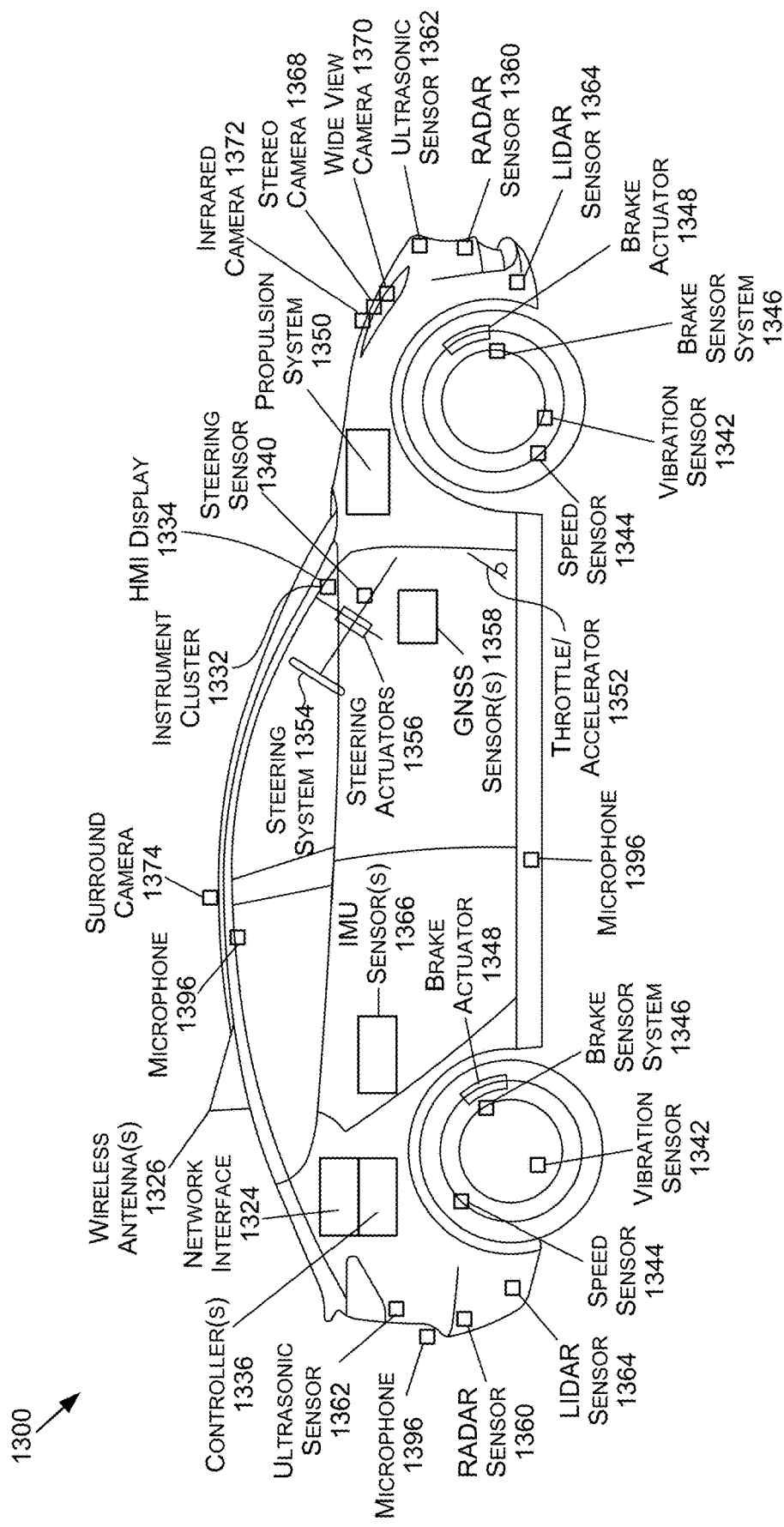
FIG. 13A is an illustration of an example autonomous vehicle, in accordance with some embodiments of the present disclosure.

FIG. 13A is an illustration of an example autonomous vehicle 1300, in accordance with some embodiments of the present disclosure. The autonomous vehicle 1300 (alternatively referred to herein as the "vehicle 1300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1300 may be capable of functionality in accordance with one or more of Level 3-Level 5 of the autonomous driving levels. For example, the vehicle 1300 may be capable of conditional automation (Level 3), high automation (Level 4), and/or full automation (Level 5), depending on the embodiment.

The vehicle 1300 may include components such as a chassis, a vehicle body, wheels (e.g., 2, 4, 6, 8, 18, etc.), tires, axles, and other components of a vehicle. The vehicle 1300 may include a propulsion system 1350, such as an internal combustion engine, hybrid electric power plant, an all-electric engine, and/or another propulsion system type. The propulsion system 1350 may be connected to a drive train of the vehicle 1300, which may include a transmission, to enable the propulsion of the vehicle 1300. The propulsion system 1350 may be controlled in response to receiving signals from the throttle/accelerator 1352.

A steering system 1354, which may include a steering wheel, may be used to steer the vehicle 1300 (e.g., along a desired path or route) when the propulsion system 1350 is operating (e.g., when the vehicle is in motion). The steering system 1354 may receive signals from a steering actuator 1356. The steering wheel may be optional for full automation (Level 5) functionality.

The brake sensor system 1346 may be used to operate the vehicle brakes in response to receiving signals from the brake actuators 1348 and/or brake sensors.

Controller(s) 1336, which may include one or more system on chips (SoCs) 1304 (FIG. 13C) and/or GPU(s), may provide signals (e.g., representative of commands) to one or more components and/or systems of the vehicle 1300. For example, the controller(s) may send signals to operate the vehicle brakes via one or more brake actuators 1348, to operate the steering system 1354 via one or more steering actuators 1356, to operate the propulsion system 1350 via one or more throttle/accelerators 1352. The controller(s) 1336 may include one or more onboard (e.g., integrated) computing devices (e.g., supercomputers) that process sensor signals, and output operation commands (e.g., signals representing commands) to enable autonomous driving and/or to assist a human driver in driving the vehicle 1300. The controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In some examples, a single controller 1336 may handle two or more of the above functionalities, two or more controllers 1336 may handle a single functionality, and/or any combination thereof.

The controller(s) 1336 may provide the signals for controlling one or more components and/or systems of the vehicle 1300 in response to sensor data received from one or more sensors (e.g., sensor inputs). The sensor data may be received from, for example and without limitation, global navigation satellite systems sensor(s) 1358 (e.g., Global Positioning System sensor(s)), RADAR sensor(s) 1360, ultrasonic sensor(s) 1362, LIDAR sensor(s) 1364, inertial measurement unit (IMU) sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree cameras), long-range and/or mid-range camera(s) 1398, speed sensor(s) 1344 (e.g., for measuring the speed of the vehicle 1300), vibration sensor(s) 1342, steering sensor(s) 1340, brake sensor(s) (e.g., as part of the brake sensor system 1346), and/or other sensor types.

One or more of the controller(s) 1336 may receive inputs (e.g., represented by input data) from an instrument cluster 1332 of the vehicle 1300 and provide outputs (e.g., represented by output data, display data, etc.) via a human-machine interface (HMI) display 1334, an audible annunciator, a loudspeaker, and/or via other components of the vehicle 1300. The outputs may include information such as vehicle velocity, speed, time, map data (e.g., the HD map 1322 of FIG. 13C), location data (e.g., the vehicle's 1300 location, such as on a map), direction, location of other vehicles (e.g., an occupancy grid), information about objects and status of objects as perceived by the controller(s) 1336, etc. For example, the HMI display 1334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1300 further includes a network interface 1324 which may use one or more wireless antenna(s) 1326 and/or modem(s) to communicate over one or more networks. For example, the network interface 1324 may be capable of communication over LTE, WCDMA, UMTS, GSM, CDMA2000, etc. The wireless antenna(s) 1326 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LP-WANs), such as LoRaWAN, SigFox, etc.

Figure 13B:
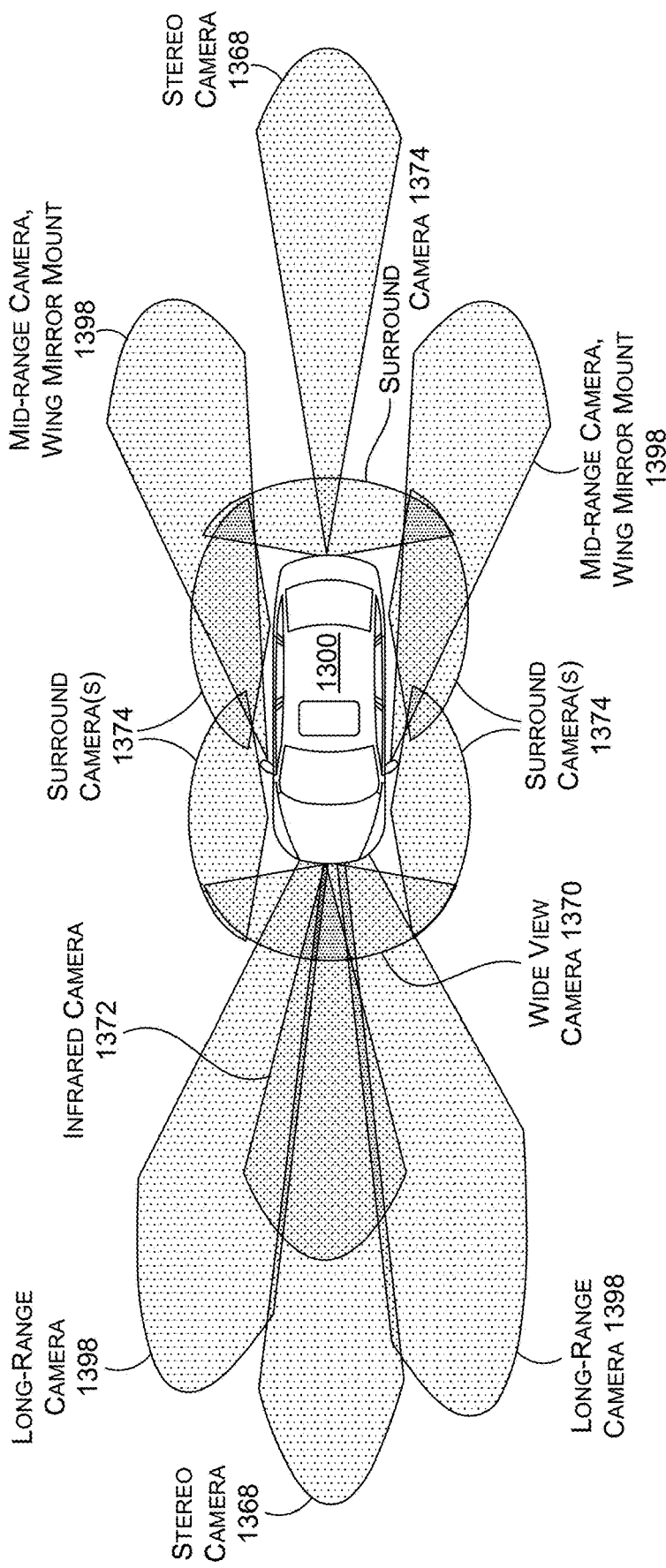
FIG. 13B is an example of camera locations and fields of view for the example autonomous vehicle of FIG. 13A, in accordance with some embodiments of the present disclosure.

FIG. 13B is an example of camera locations and fields of view for the example autonomous vehicle 1300 of FIG. 13A, in accordance with some embodiments of the present disclosure. The cameras and respective fields of view are one example embodiment and are not intended to be limiting. For example, additional and/or alternative cameras may be included and/or the cameras may be located at different locations on the vehicle 1300.

The camera types for the cameras may include, but are not limited to, digital cameras that may be adapted for use with the components and/or systems of the vehicle 1300. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1300 (e.g., front-facing cameras) may be used for surround view, to help identify forward facing paths and obstacles, as well aid in, with the help of one or more controllers 1336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1370 that may be used to perceive objects coming into view from the periphery (e.g., pedestrians, crossing traffic or bicycles). Although only one wide-view camera is illustrated in FIG. 13B, there may any number of wide-view cameras 1370 on the vehicle 1300. In addition, long-range camera(s) 1398 (e.g., a long-view stereo camera pair) may be used for depth-based object detection, especially for objects for which a neural network has not yet been trained. The long-range camera(s) 1398 may also be used for object detection and classification, as well as basic object tracking.

One or more stereo cameras 1368 may also be included in a front-facing configuration. The stereo camera(s) 1368 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1368 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1368 may be used in addition to, or alternatively from, those described herein.

Cameras with a field of view that include portions of the environment to the side of the vehicle 1300 (e.g., side-view cameras) may be used for surround view, providing information used to create and update the occupancy grid, as well as to generate side impact collision warnings. For example, surround camera(s) 1374 (e.g., four surround cameras 1374 as illustrated in FIG. 13B) may be positioned to on the vehicle 1300. The surround camera(s) 1374 may include wide-view camera(s) 1370, fisheye camera(s), 360 degree camera(s), and/or the like. Four example, four fisheye cameras may be positioned on the vehicle's front, rear, and sides. In an alternative arrangement, the vehicle may use three surround camera(s) 1374 (e.g., left, right, and rear), and may leverage one or more other camera(s) (e.g., a forward-facing camera) as a fourth surround view camera.

Cameras with a field of view that include portions of the environment to the rear of the vehicle 1300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1398, stereo camera(s) 1368), infrared camera(s) 1372, etc.), as described herein.

Figure 13C:
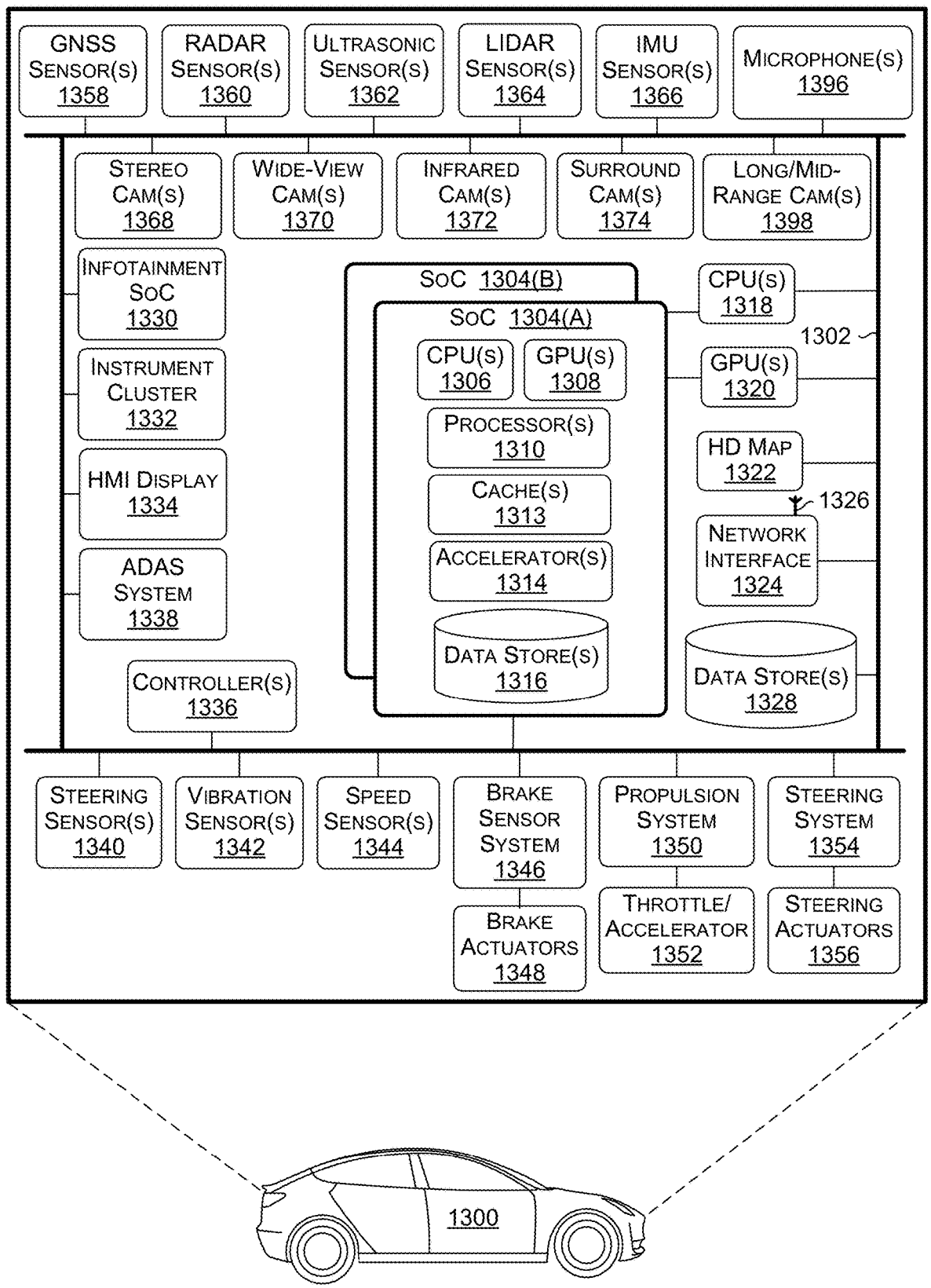
FIG. 13C is a block diagram of an example system architecture for the example autonomous vehicle of FIG. 13A, in accordance with some embodiments of the present disclosure.

FIG. 13C is a block diagram of an example system architecture for the example autonomous vehicle 1300 of FIG. 13A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1300 in FIG. 13C are illustrated as being connected via bus 1302. The bus 1302 may include a Controller Area Network (CAN) data interface (alternatively referred to herein as a "CAN bus"). A CAN may be a network inside the vehicle 1300 used to aid in control of various features and functionality of the vehicle 1300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1302 is described herein as being a CAN bus, this is not intended to be limiting. For example, in addition to, or alternatively from, the CAN bus, FlexRay and/or Ethernet may be used. Additionally, although a single line is used to represent the bus 1302, this is not intended to be limiting. For example, there may be any number of busses 1302, which may include one or more CAN busses, one or more FlexRay busses, one or more Ethernet busses, and/or one or more other types of busses using a different protocol. In some examples, two or more busses 1302 may be used to perform different functions, and/or may be used for redundancy. For example, a first bus 1302 may be used for collision avoidance functionality and a second bus 1302 may be used for actuation control. In any example, each bus 1302 may communicate with any of the components of the vehicle 1300, and two or more busses 1302 may communicate with the same components. In some examples, each SoC 1304, each controller 1336, and/or each computer within the vehicle may have access to the same input data (e.g., inputs from sensors of the vehicle 1300), and may be connected to a common bus, such the CAN bus.

The vehicle 1300 may include one or more controller(s) 1336, such as those described herein with respect to FIG. 13A. The controller(s) 1336 may be used for a variety of functions. The controller(s) 1336 may be coupled to any of the various other components and systems of the vehicle 1300, and may be used for control of the vehicle 1300, artificial intelligence of the vehicle 1300, infotainment for the vehicle 1300, and/or the like.

The vehicle 1300 may include a system(s) on a chip (SoC) 1304. The SoC 1304 may include CPU(s) 1306, GPU(s) 1308, processor(s) 1310, cache(s) 1312, accelerator(s) 1314, data store(s) 1316, and/or other components and features not illustrated. The SoC(s) 1304 may be used to control the vehicle 1300 in a variety of platforms and systems. For example, the SoC(s) 1304 may be combined in a system (e.g., the system of the vehicle 1300) with an HD map 1322 which may obtain map refreshes and/or updates via a network interface 1324 from one or more servers (e.g., server(s) 1378 of FIG. 13D).

The CPU(s) 1306 may include a CPU cluster or CPU complex (alternatively referred to herein as a "CCPLEX"). The CPU(s) 1306 may include multiple cores and/or L2 caches. For example, in some embodiments, the CPU(s) 1306 may include eight cores in a coherent multi-processor configuration. In some embodiments, the CPU(s) 1306 may include four dual-core clusters where each cluster has a dedicated L2 cache (e.g., a 2 MB L2 cache). The CPU(s) 1306 (e.g., the CCPLEX) may be configured to support simultaneous cluster operation enabling any combination of the clusters of the CPU(s) 1306 to be active at any given time.

The CPU(s) 1306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1308 may include an integrated GPU (alternatively referred to herein as an "iGPU"). The GPU(s) 1308 may be programmable and may be efficient for parallel workloads. The GPU(s) 1308, in some examples, may use an enhanced tensor instruction set. The GPU(s) 1308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1308 may include at least eight streaming microprocessors. The GPU(s) 1308 may use compute application programming interface(s) (API(s)). In addition, the GPU(s) 1308 may use one or more parallel computing platforms and/or programming models (e.g., NVIDIA's CUDA).

The GPU(s) 1308 may be power-optimized for best performance in automotive and embedded use cases. For example, the GPU(s) 1308 may be fabricated on a Fin field-effect transistor (FinFET). However, this is not intended to be limiting and the GPU(s) 1308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1308 to access the CPU(s) 1306 page tables directly. In such examples, when the GPU(s) 1308 memory management unit (MMU) experiences a miss, an address translation request may be transmitted to the CPU(s) 1306. In response, the CPU(s) 1306 may look in its page tables for the virtual-to-physical mapping for the address and transmits the translation back to the GPU(s) 1308. As such, unified memory technology may allow a single unified virtual address space for memory of both the CPU(s) 1306 and the GPU(s) 1308, thereby simplifying the GPU(s) 1308 programming and porting of applications to the GPU(s) 1308.

In addition, the GPU(s) 1308 may include an access counter that may keep track of the frequency of access of the GPU(s) 1308 to memory of other processors. The access counter may help ensure that memory pages are moved to the physical memory of the processor that is accessing the pages most frequently.

The SoC(s) 1304 may include any number of cache(s) 1312, including those described herein. For example, the cache(s) 1312 may include an L3 cache that is available to both the CPU(s) 1306 and the GPU(s) 1308 (e.g., that is connected both the CPU(s) 1306 and the GPU(s) 1308). The cache(s) 1312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1304 may include an arithmetic logic unit(s) (ALU(s)) which may be leveraged in performing processing with respect to any of the variety of tasks or operations of the vehicle 1300—such as processing DNNs. In addition, the SoC(s) 1304 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 1306 and/or GPU(s) 1308.

The SoC(s) 1304 may include one or more accelerators 1314 (e.g., hardware accelerators, software accelerators, or a combination thereof). For example, the SoC(s) 1304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1308 and to off-load some of the tasks of the GPU(s) 1308 (e.g., to free up more cycles of the GPU(s) 1308 for performing other tasks). As an example, the accelerator(s) 1314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing.

The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1308, and by using an inference accelerator, for example, a designer may target either the DLA(s) or the GPU(s) 1308 for any function. For example, the designer may focus processing of CNNs and floating point operations on the DLA(s) and leave other functions to the GPU(s) 1308 and/or other accelerator(s) 1314.

The accelerator(s) 1314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1314 (e.g., the hardware acceleration cluster) may include a computer vision network on-chip and SRAM, for providing a high-bandwidth, low latency SRAM for the accelerator(s) 1314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1314 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1366 output that correlates with the vehicle 1300 orientation, distance, 3D location estimates of the object obtained from the neural network and/or other sensors (e.g., LIDAR sensor(s) 1364 or RADAR sensor(s) 1360), among others.

The SoC(s) 1304 may include data store(s) 1316 (e.g., memory). The data store(s) 1316 may be on-chip memory of the SoC(s) 1304, which may store neural networks to be executed on the GPU and/or the DLA. In some examples, the data store(s) 1316 may be large enough in capacity to store multiple instances of neural networks for redundancy and safety. The data store(s) 1312 may comprise L2 or L3 cache(s) 1312. Reference to the data store(s) 1316 may include reference to the memory associated with the PVA, DLA, and/or other accelerator(s) 1314, as described herein.

The SoC(s) 1304 may include one or more processor(s) 1310 (e.g., embedded processors). The processor(s) 1310 may include a boot and power management processor that may be a dedicated processor and subsystem to handle boot power and management functions and related security enforcement. The boot and power management processor may be a part of the SoC(s) 1304 boot sequence and may provide runtime power management services. The boot power and management processor may provide clock and voltage programming, assistance in system low power state transitions, management of SoC(s) 1304 thermals and temperature sensors, and/or management of the SoC(s) 1304 power states. Each temperature sensor may be implemented as a ring-oscillator whose output frequency is proportional to temperature, and the SoC(s) 1304 may use the ring-oscillators to detect temperatures of the CPU(s) 1306, GPU(s) 1308, and/or accelerator(s) 1314. If temperatures are determined to exceed a threshold, the boot and power management processor may enter a temperature fault routine and put the SoC(s) 1304 into a lower power state and/or put the vehicle 1300 into a chauffeur to safe stop mode (e.g., bring the vehicle 1300 to a safe stop).

The processor(s) 1310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1310 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1310 may further include a real-time camera engine that may include a dedicated processor subsystem for handling real-time camera management.

The processor(s) 1310 may further include a high-dynamic range signal processor that may include an image signal processor that is a hardware engine that is part of the camera processing pipeline.

The processor(s) 1310 may include a video image compositor that may be a processing block (e.g., implemented on a microprocessor) that implements video post-processing functions needed by a video playback application to produce the final image for the player window. The video image compositor may perform lens distortion correction on wide-view camera(s) 1370, surround camera(s) 1374, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1308 is not required to continuously render new surfaces. Even when the GPU(s) 1308 is powered on and active doing 3D rendering, the video image compositor may be used to offload the GPU(s) 1308 to improve performance and responsiveness.

The SoC(s) 1304 may further include a mobile industry processor interface (MIPI) camera serial interface for receiving video and input from cameras, a high-speed interface, and/or a video input block that may be used for camera and related pixel input functions. The SoC(s) 1304 may further include an input/output controller(s) that may be controlled by software and may be used for receiving I/O signals that are uncommitted to a specific role.

The SoC(s) 1304 may further include a broad range of peripheral interfaces to enable communication with peripherals, audio codecs, power management, and/or other devices. The SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from bus 1302 (e.g., speed of vehicle 1300, steering wheel position, etc.), data from GNSS sensor(s) 1358 (e.g., connected over Ethernet or CAN bus). The SoC(s) 1304 may further include dedicated high-performance mass storage controllers that may include their own DMA engines, and that may be used to free the CPU(s) 1306 from routine data management tasks.

The SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1304 may be faster, more reliable, and even more energy-efficient and space-efficient than conventional systems. For example, the accelerator(s) 1314, when combined with the CPU(s) 1306, the GPU(s) 1308, and the data store(s) 1316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1320) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1308.

In some examples, a CNN for facial recognition and vehicle owner identification may use data from camera sensors to identify the presence of an authorized driver and/or owner of the vehicle 1300. The always on sensor processing engine may be used to unlock the vehicle when the owner approaches the driver door and turn on the lights, and, in security mode, to disable the vehicle when the owner leaves the vehicle. In this way, the SoC(s) 1304 provide for security against theft and/or carjacking.

In another example, a CNN for emergency vehicle detection and identification may use data from microphones 1396 to detect and identify emergency vehicle sirens. In contrast to conventional systems, that use general classifiers to detect sirens and manually extract features, the SoC(s) 1304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1362, until the emergency vehicle(s) passes.

The vehicle may include a CPU(s) 1318 (e.g., discrete CPU(s), or dCPU(s)), that may be coupled to the SoC(s) 1304 via a high-speed interconnect (e.g., PCIe). The CPU(s) 1318 may include an X86 processor, for example. The CPU(s) 1318 may be used to perform any of a variety of functions, including arbitrating potentially inconsistent results between ADAS sensors and the SoC(s) 1304, and/or monitoring the status and health of the controller(s) 1336 and/or infotainment SoC 1330, for example.

The vehicle 1300 may include a GPU(s) 1320 (e.g., discrete GPU(s), or dGPU(s)), that may be coupled to the SoC(s) 1304 via a high-speed interconnect (e.g., NVIDIA's NVLINK). The GPU(s) 1320 may provide additional artificial intelligence functionality, such as by executing redundant and/or different neural networks, and may be used to train and/or update neural networks based on input (e.g., sensor data) from sensors of the vehicle 1300.

The vehicle 1300 may further include the network interface 1324 which may include one or more wireless antennas 1326 (e.g., one or more wireless antennas for different communication protocols, such as a cellular antenna, a Bluetooth antenna, etc.). The network interface 1324 may be used to enable wireless connectivity over the Internet with the cloud (e.g., with the server(s) 1378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1300 information about vehicles in proximity to the vehicle 1300 (e.g., vehicles in front of, on the side of, and/or behind the vehicle 1300). This functionality may be part of a cooperative adaptive cruise control functionality of the vehicle 1300.

The network interface 1324 may include a SoC that provides modulation and demodulation functionality and enables the controller(s) 1336 to communicate over wireless networks. The network interface 1324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1300 may further include data store(s) 1328 which may include off-chip (e.g., off the SoC(s) 1304) storage. The data store(s) 1328 may include one or more storage elements including RAM, SRAM, DRAM, VRAM, Flash, hard disks, and/or other components and/or devices that may store at least one bit of data.

The vehicle 1300 may further include GNSS sensor(s) 1358. The GNSS sensor(s) 1358 (e.g., GPS, assisted GPS sensors, differential GPS (DGPS) sensors, etc.), to assist in mapping, perception, occupancy grid generation, and/or path planning functions. Any number of GNSS sensor(s) 1358 may be used, including, for example and without limitation, a GPS using a USB connector with an Ethernet to Serial (RS-232) bridge.

The vehicle 1300 may further include RADAR sensor(s) 1360. The RADAR sensor(s) 1360 may be used by the vehicle 1300 for long-range vehicle detection, even in darkness and/or severe weather conditions. RADAR functional safety levels may be ASIL B. The RADAR sensor(s) 1360 may use the CAN and/or the bus 1302 (e.g., to transmit data generated by the RADAR sensor(s) 1360) for control and to access object tracking data, with access to Ethernet to access raw data in some examples. A wide variety of RADAR sensor types may be used. For example, and without limitation, the RADAR sensor(s) 1360 may be suitable for front, rear, and side RADAR use. In some example, Pulse Doppler RADAR sensor(s) are used.

The RADAR sensor(s) 1360 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1300 surroundings at higher speeds with minimal interference from traffic in adjacent lanes. The other two antennae may expand the field of view, making it possible to quickly detect vehicles entering or leaving the vehicle's 1300 lane.

Mid-range RADAR systems may include, as an example, a range of up to 1360 m (front) or 80 m (rear), and a field of view of up to 42 degrees (front) or 1350 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1300 may further include ultrasonic sensor(s) 1362. The ultrasonic sensor(s) 1362, which may be positioned at the front, back, and/or the sides of the vehicle 1300, may be used for park assist and/or to create and update an occupancy grid. A wide variety of ultrasonic sensor(s) 1362 may be used, and different ultrasonic sensor(s) 1362 may be used for different ranges of detection (e.g., 2.5 m, 4 m). The ultrasonic sensor(s) 1362 may operate at functional safety levels of ASIL B.

The vehicle 1300 may include LIDAR sensor(s) 1364. The LIDAR sensor(s) 1364 may be used for object and pedestrian detection, emergency braking, collision avoidance, and/or other functions. The LIDAR sensor(s) 1364 may be functional safety level ASIL B. In some examples, the vehicle 1300 may include multiple LIDAR sensors 1364 (e.g., two, four, six, etc.) that may use Ethernet (e.g., to provide data to a Gigabit Ethernet switch).

In some examples, the LIDAR sensor(s) 1364 may be capable of providing a list of objects and their distances for a 360-degree field of view. Commercially available LIDAR sensor(s) 1364 may have an advertised range of approximately 1300 m, with an accuracy of 2 cm-3 cm, and with support for a 1300 Mbps Ethernet connection, for example. In some examples, one or more non-protruding LIDAR sensors 1364 may be used. In such examples, the LIDAR sensor(s) 1364 may be implemented as a small device that may be embedded into the front, rear, sides, and/or corners of the vehicle 1300. The LIDAR sensor(s) 1364, in such examples, may provide up to a 120-degree horizontal and 35-degree vertical field-of-view, with a 200 m range even for low-reflectivity objects. Front-mounted LIDAR sensor(s)

1364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1300. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1364 may be less susceptible to motion blur, vibration, and/or shock.

The vehicle may further include IMU sensor(s) 1366. The IMU sensor(s) 1366 may be located at a center of the rear axle of the vehicle 1300, in some examples. The IMU sensor(s) 1366 may include, for example and without limitation, an accelerometer(s), a magnetometer(s), a gyroscope(s), a magnetic compass(es), and/or other sensor types. In some examples, such as in six-axis applications, the IMU sensor(s) 1366 may include accelerometers and gyroscopes, while in nine-axis applications, the IMU sensor(s) 1366 may include accelerometers, gyroscopes, and magnetometers.

In some embodiments, the IMU sensor(s) 1366 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1366 may enable the vehicle 1300 to estimate heading without requiring input from a magnetic sensor by directly observing and correlating the changes in velocity from GPS to the IMU sensor(s) 1366. In some examples, the IMU sensor(s) 1366 and the GNSS sensor(s) 1358 may be combined in a single integrated unit.

The vehicle may include microphone(s) 1396 placed in and/or around the vehicle 1300. The microphone(s) 1396 may be used for emergency vehicle detection and identification, among other things.

The vehicle may further include any number of camera types, including stereo camera(s) 1368, wide-view camera(s) 1370, infrared camera(s) 1372, surround camera(s) 1374, long-range and/or mid-range camera(s) 1398, and/or other camera types. The cameras may be used to capture image data around an entire periphery of the vehicle 1300. The types of cameras used depends on the embodiments and requirements for the vehicle 1300, and any combination of camera types may be used to provide the necessary coverage around the vehicle 1300. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 13A and FIG. 13B.

The vehicle 1300 may further include vibration sensor(s) 1342. The vibration sensor(s) 1342 may measure vibrations of components of the vehicle, such as the axle(s). For example, changes in vibrations may indicate a change in road surfaces. In another example, when two or more vibration sensors 1342 are used, the differences between the vibrations may be used to determine friction or slippage of the road surface (e.g., when the difference in vibration is between a power-driven axle and a freely rotating axle).

The vehicle 1300 may include an ADAS system 1338. The ADAS system 1338 may include a SoC, in some examples. The ADAS system 1338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1360, LIDAR sensor(s) 1364, and/or a camera(s). The ACC systems may include longitudinal ACC and/or lateral ACC. Longitudinal ACC monitors and controls the distance to the vehicle immediately ahead of the vehicle 1300 and automatically adjust the vehicle speed to maintain a safe distance from vehicles ahead. Lateral ACC performs distance keeping, and advises the vehicle 1300 to change lanes when necessary. Lateral ACC is related to other ADAS applications such as LCA and CWS.

CACC uses information from other vehicles that may be received via the network interface 1324 and/or the wireless antenna(s) 1326 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1300), while the I2V communication concept provides information about traffic further ahead. CACC systems may include either or both I2V and V2V information sources. Given the information of the vehicles ahead of the vehicle 1300, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1300 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1300 if the vehicle 1300 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1300 is backing up. Some RCTW systems include AEB to ensure that the vehicle brakes are applied to avoid a crash. RCTW systems may use one or more rear-facing RADAR sensor(s) 1360, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1300, the vehicle 1300 itself must, in the case of conflicting results, decide whether to heed the result from a primary computer or a secondary computer (e.g., a first controller 1336 or a second controller 1336). For example, in some embodiments, the ADAS system 1338 may be a backup and/or secondary computer for providing perception information to a backup computer rationality module. The backup computer rationality monitor may run a redundant diverse software on hardware components to detect faults in perception and dynamic driving tasks. Outputs from the ADAS system 1338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1304.

In other examples, ADAS system 1338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1338 may be fed into the primary computer's perception block and/or the primary computer's dynamic driving task block. For example, if the ADAS system 1338 indicates a forward crash warning due to an object immediately ahead, the perception block may use this information when identifying objects. In other examples, the secondary computer may have its own neural network which is trained and thus reduces the risk of false positives, as described herein.

The vehicle 1300 may further include the infotainment SoC 1330 (e.g., an in-vehicle infotainment system (IVI)). Although illustrated and described as a SoC, the infotainment system may not be a SoC, and may include two or more discrete components. The infotainment SoC 1330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1300. For example, the infotainment SoC 1330 may radios, disk players, navigation systems, video players, USB and Bluetooth connectivity, carputers, in-car entertainment, Wi-Fi, steering wheel audio controls, hands free voice control, a heads-up display (HUD), an HMI display 1334, a telematics device, a control panel (e.g., for controlling and/or interacting with various components, features, and/or systems), and/or other components. The infotainment SoC 1330 may further be used to provide information (e.g., visual and/or audible) to a user(s) of the vehicle, such as information from the ADAS system 1338, autonomous driving information such as planned vehicle maneuvers, trajectories, surrounding environment information (e.g., intersection information, vehicle information, road information, etc.), and/or other information.

The infotainment SoC 1330 may include GPU functionality. The infotainment SoC 1330 may communicate over the bus 1302 (e.g., CAN bus, Ethernet, etc.) with other devices, systems, and/or components of the vehicle 1300. In some examples, the infotainment SoC 1330 may be coupled to a supervisory MCU such that the GPU of the infotainment system may perform some self-driving functions in the event that the primary controller(s) 1336 (e.g., the primary and/or backup computers of the vehicle 1300) fail. In such an example, the infotainment SoC 1330 may put the vehicle 1300 into a chauffeur to safe stop mode, as described herein.

The vehicle 1300 may further include an instrument cluster 1332 (e.g., a digital dash, an electronic instrument cluster, a digital instrument panel, etc.). The instrument cluster 1332 may include a controller and/or supercomputer (e.g., a discrete controller or supercomputer). The instrument cluster 1332 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1330 and the instrument cluster 1332. In other words, the instrument cluster 1332 may be included as part of the infotainment SoC 1330, or vice versa.

Figure 13D:
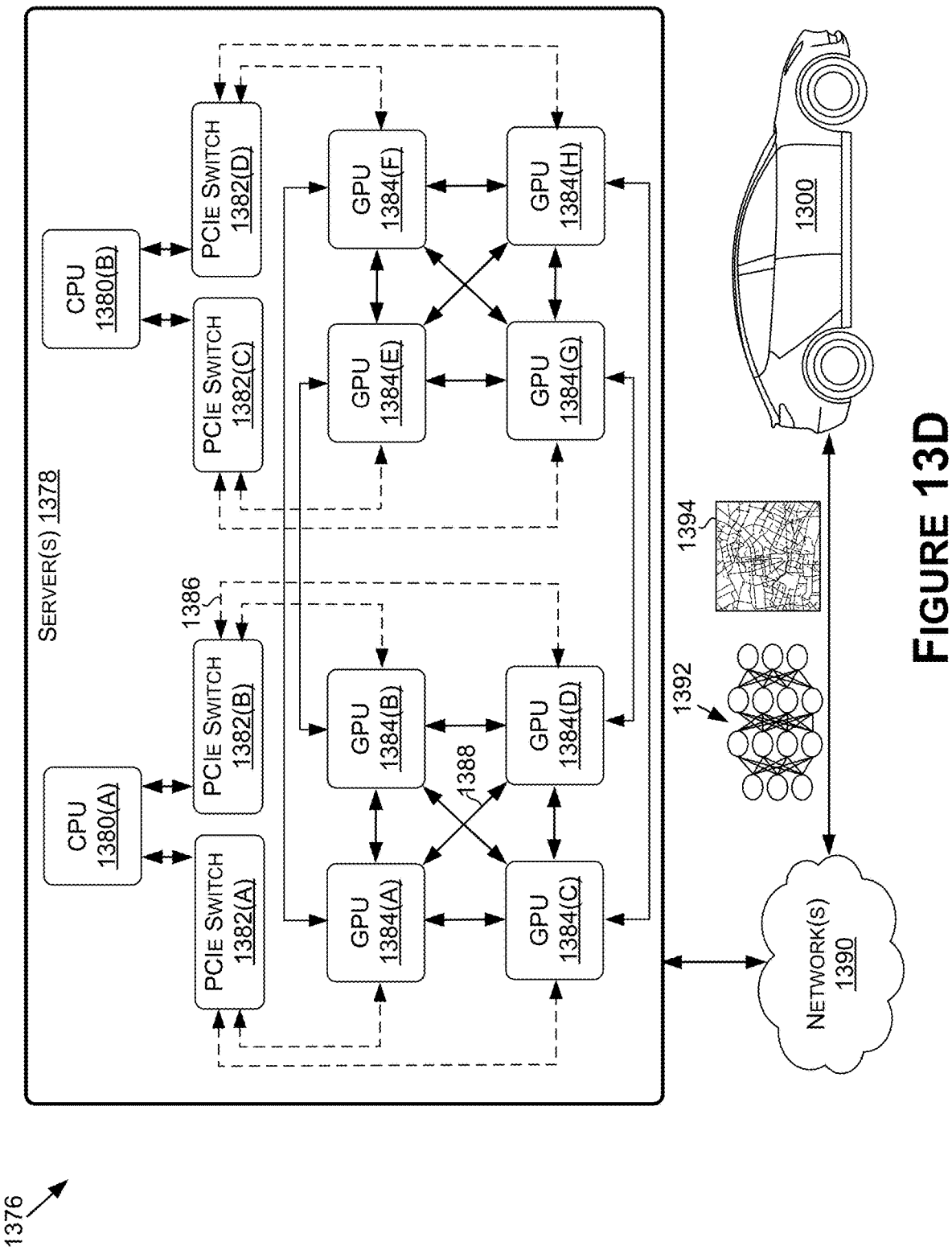
FIG. 13D is a system diagram for communication between cloud-based server(s) and the example autonomous vehicle of FIG. 13A, in accordance with some embodiments of the present disclosure.

FIG. 13D is a system diagram for communication between cloud-based server(s) and the example autonomous vehicle 1300 of FIG. 13A, in accordance with some embodiments of the present disclosure. The system 1376 may include server(s) 1378, network(s) 1390, and vehicles, including the vehicle 1300. The server(s) 1378 may include a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). The GPUs 1384, the CPUs 1380, and the PCIe switches may be interconnected with high-speed interconnects such as, for example and without limitation, NVLink interfaces 1388 developed by NVIDIA and/or PCIe connections 1386. In some examples, the GPUs 1384 are connected via NVLink and/or NVSwitch SoC and the GPUs 1384 and the PCIe switches 1382 are connected via PCIe interconnects. Although eight GPUs 1384, two CPUs 1380, and two PCIe switches are illustrated, this is not intended to be limiting. Depending on the embodiment, each of the server(s) 1378 may include any number of GPUs 1384, CPUs 1380, and/or PCIe switches. For example, the server(s) 1378 may each include eight, sixteen, thirty-two, and/or more GPUs 1384.

The server(s) 1378 may receive, over the network(s) 1390 and from the vehicles, image data representative of images showing unexpected or changed road conditions, such as recently commenced road-work. The server(s) 1378 may transmit, over the network(s) 1390 and to the vehicles, neural networks 1392, updated neural networks 1392, and/or map information 1394, including information regarding traffic and road conditions. The updates to the map information 1394 may include updates for the HD map 1322, such as information regarding construction sites, potholes, detours, flooding, and/or other obstructions. In some examples, the neural networks 1392, the updated neural networks 1392, and/or the map information 1394 may have resulted from new training and/or experiences represented in data received from any number of vehicles in the environment, and/or based on training performed at a datacenter (e.g., using the server(s) 1378 and/or other servers).

The server(s) 1378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1390, and/or the machine learning models may be used by the server(s) 1378 to remotely monitor the vehicles.

In some examples, the server(s) 1378 may receive data from the vehicles and apply the data to up-to-date real-time neural networks for real-time intelligent inferencing. The server(s) 1378 may include deep-learning supercomputers and/or dedicated AI computers powered by GPU(s) 1384, such as a DGX and DGX Station machines developed by NVIDIA. However, in some examples, the server(s) 1378 may include deep learning infrastructure that use only CPU-powered datacenters.

The deep-learning infrastructure of the server(s) 1378 may be capable of fast, real-time inferencing, and may use that capability to evaluate and verify the health of the processors, software, and/or associated hardware in the vehicle 1300. For example, the deep-learning infrastructure may receive periodic updates from the vehicle 1300, such as a sequence of images and/or objects that the vehicle 1300 has located in that sequence of images (e.g., via computer vision and/or other machine learning object classification techniques). The deep-learning infrastructure may run its own neural network to identify the objects and compare them with the objects identified by the vehicle 1300 and, if the results do not match and the infrastructure concludes that the AI in the vehicle 1300 is malfunctioning, the server(s) 1378 may transmit a signal to the vehicle 1300 instructing a fail-safe computer of the vehicle 1300 to assume control, notify the passengers, and complete a safe parking maneuver.

For inferencing, the server(s) 1378 may include the GPU(s) 1384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 14:
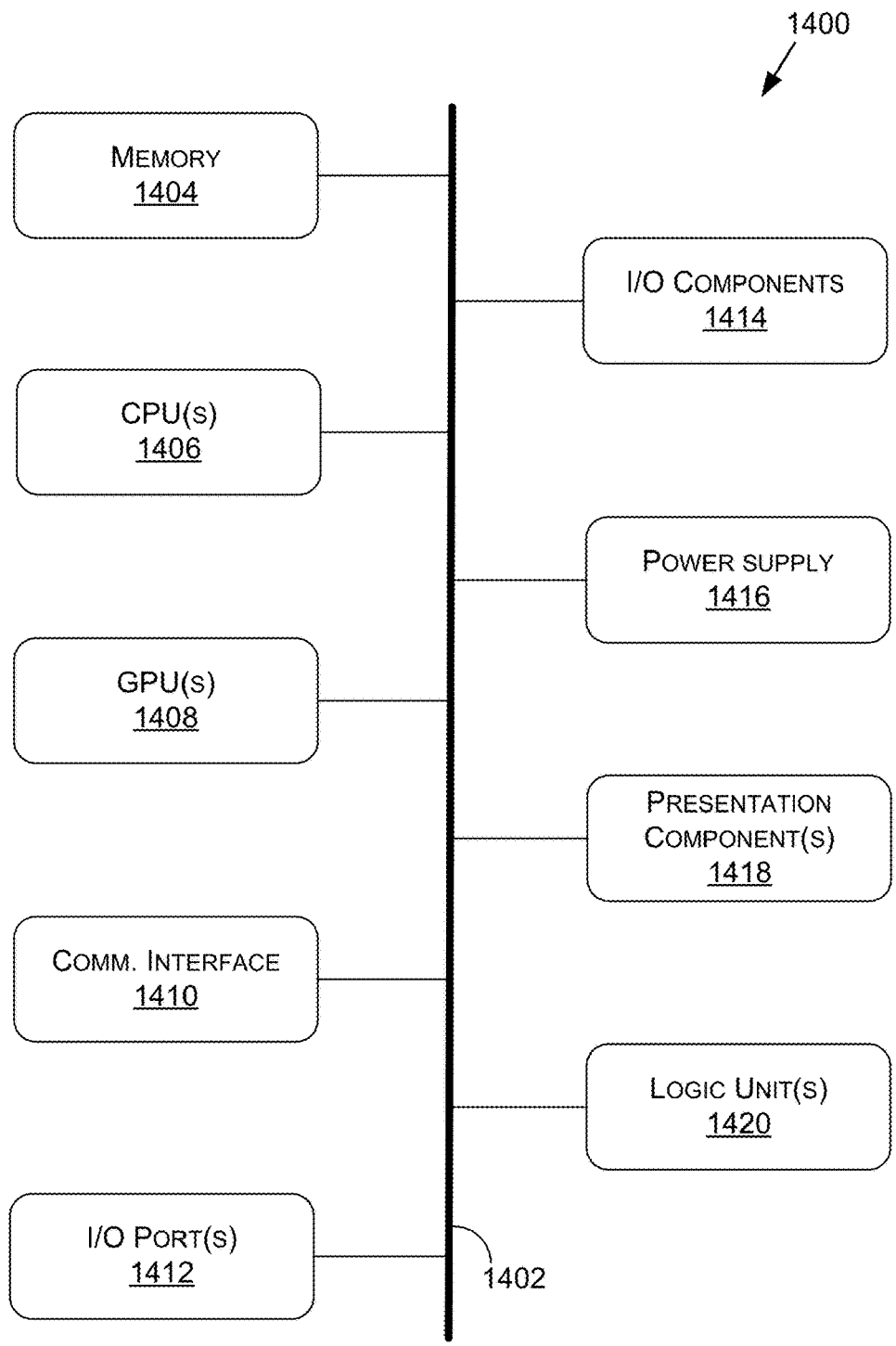
FIG. 14 is a block diagram of an example computing device suitable for use in implementing some embodiments of the present disclosure.

FIG. 14 is a block diagram of an example computing device(s) 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, input/output (I/O) ports 1412, input/output components 1414, a power supply 1416, one or more presentation components 1418 (e.g., display(s)), and one or more logic units 1420. In at least one embodiment, the computing device(s) 1400 may comprise one or more virtual machines (VMs), and/or any of the components thereof may comprise virtual components (e.g., virtual hardware components). For non-limiting examples, one or more of the GPUs 1408 may comprise one or more vGPUs, one or more of the CPUs 1406 may comprise one or more vCPUs, and/or one or more of the logic units 1420 may comprise one or more virtual logic units. As such, a computing device(s) 1400 may include discrete components (e.g., a full GPU dedicated to the computing device 1400), virtual components (e.g., a portion of a GPU dedicated to the computing device 1400), or a combination thereof.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute at least some of the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

In addition to or alternatively from the CPU(s) 1406, the GPU(s) 1408 may be configured to execute at least some of the computer-readable instructions to control one or more components of the computing device 1400 to perform one or more of the methods and/or processes described herein. One or more of the GPU(s) 1408 may be an integrated GPU (e.g., with one or more of the CPU(s) 1406 and/or one or more of the GPU(s) 1408 may be a discrete GPU. In embodiments, one or more of the GPU(s) 1408 may be a coprocessor of one or more of the CPU(s) 1406. The GPU(s) 1408 may be used by the computing device 1400 to render graphics (e.g., 3D graphics) or perform general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1406 and/or the GPU(s) 1408, the logic unit(s) 1420 may be configured to execute at least some of the computer-readable instructions to control one or more components of the computing device 1400 to perform one or more of the methods and/or processes described herein. In embodiments, the CPU(s) 1406, the GPU(s) 1408, and/or the logic unit(s) 1420 may discretely or jointly perform any combination of the methods, processes and/or portions thereof. One or more of the logic units 1420 may be part of and/or integrated in one or more of the CPU(s) 1406 and/or the GPU(s) 1408 and/or one or more of the logic units 1420 may be discrete components or otherwise external to the CPU(s) 1406 and/or the GPU(s) 1408. In embodiments, one or more of the logic units 1420 may be a coprocessor of one or more of the CPU(s) 1406 and/or one or more of the GPU(s) 1408.

Examples of the logic unit(s) 1420 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1410 may include one or more receivers, transmitters, and/or transceivers that enable the computing device 1400 to communicate with other computing devices via an electronic communication network, included wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1420 and/or communication interface 1410 may include one or more data processing units (DPUs) to transmit data received over a network and/or through interconnect system 1402 directly to (e.g., a memory of) one or more GPU(s) 1408.

The I/O ports 1412 may enable the computing device 1400 to be logically coupled to other devices including the I/O components 1414, the presentation component(s) 1418, and/or other components, some of which may be built in to (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, DPUs, etc.), and output the data (e.g., as an image, video, sound, etc.).

Example Data Center

Figure 15:
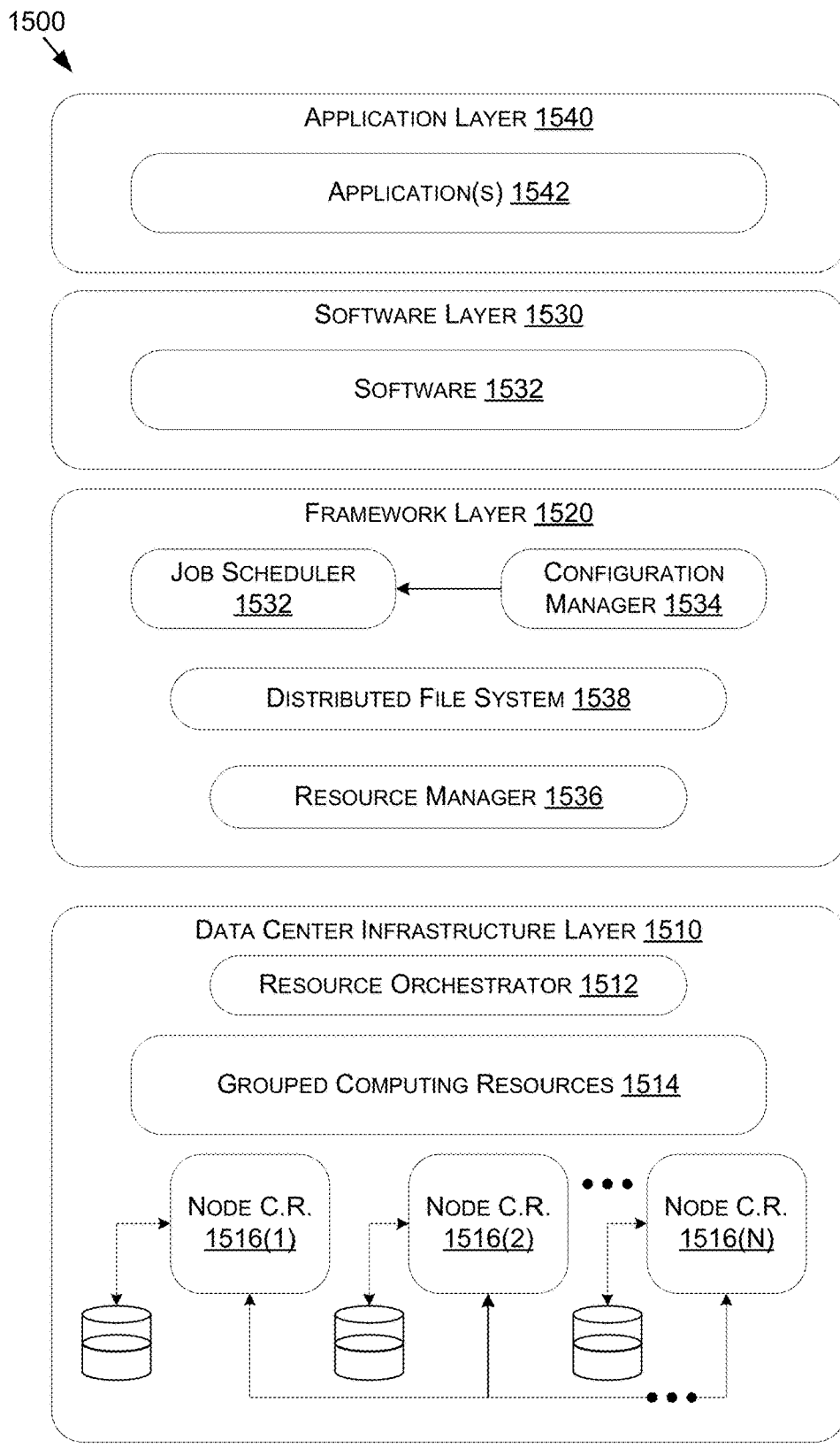
FIG. 15 is a block diagram of an example data center suitable for use in implementing some embodiments of the present disclosure.

FIG. 15 illustrates an example data center 1500 that may be used in at least one embodiments of the present disclosure. The data center 1500 may include a data center infrastructure layer 1510, a framework layer 1520, a software layer 1530, and/or an application layer 1540.

As shown in FIG. 15, the data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1516(1)-1516(N) may correspond to a server having one or more of the above-mentioned computing resources. In addition, in some embodiments, the node C.R.s 1516(1)-15161(N) may include one or more virtual components, such as vGPUs, vCPUs, and/or the like, and/or one or more of the node C.R.s 1516(1)-1516(N) may correspond to a virtual machine (VM).

In at least one embodiment, grouped computing resources 1514 may include separate groupings of node C.R.s 1516 housed within one or more racks (not shown), or many racks housed in data centers at various geographical locations (also not shown). Separate groupings of node C.R.s 1516 within grouped computing resources 1514 may include grouped compute, network, memory or storage resources that may be configured or allocated to support one or more workloads. In at least one embodiment, several node C.R.s 1516 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1512 may configure or otherwise control one or more node C.R.s 1516(1)-1516(N) and/or grouped computing resources 1514. In at least one embodiment, resource orchestrator 1512 may include a software design infrastructure (SDI) management entity for the data center 1500. The resource orchestrator 1512 may include hardware, software, or some combination thereof.

In at least one embodiment, as shown in FIG. 15, framework layer 1520 may include a job scheduler 1532, a configuration manager 1534, a resource manager 1536, and/or a distributed file system 1538. The framework layer 1520 may include a framework to support software 1532 of software layer 1530 and/or one or more application(s) 1542 of application layer 1540. The software 1532 or application(s) 1542 may respectively include web-based service software or applications, such as those provided by Amazon Web Services, Google Cloud and Microsoft Azure. The framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1532 may include a Spark driver to facilitate scheduling of workloads supported by various layers of data center 1500. The configuration manager 1534 may be capable of configuring different layers such as software layer 1530 and framework layer 1520 including Spark and distributed file system 1538 for supporting large-scale data processing. The resource manager 1536 may be capable of managing clustered or grouped computing resources mapped to or allocated for support of distributed file system 1538 and job scheduler 1532. In at least one embodiment, clustered or grouped computing resources may include grouped computing resource 1514 at data center infrastructure layer 1510. The resource manager 1536 may coordinate with resource orchestrator 1512 to manage these mapped or allocated computing resources.

In at least one embodiment, software 1532 included in software layer 1530 may include software used by at least portions of node C.R.s 1516(1)-1516(N), grouped computing resources 1514, and/or distributed file system 1538 of framework layer 1520. One or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516(1)-1516(N), grouped computing resources 1514, and/or distributed file system 1538 of framework layer 1520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1534, resource manager 1536, and resource orchestrator 1512 may implement any number and type of self-modifying actions based on any amount and type of data acquired in any technically feasible fashion. Self-modifying actions may relieve a data center operator of data center 1500 from making possibly bad configuration decisions and possibly avoiding underutilized and/or poor performing portions of a data center.

The data center 1500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1500. In at least one embodiment, trained or deployed machine learning models corresponding to one or more neural networks may be used to infer or predict information using resources described above with respect to the data center 1500 by using weight parameters calculated through one or more training techniques, such as but not limited to those described herein.

In at least one embodiment, the data center 1500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1400 of FIG. 14—e.g., each device may include similar components, features, and/or functionality of the computing device(s) 1400. In addition, where backend devices (e.g., servers, NAS, etc.) are implemented, the backend devices may be included as part of a data center 1500, an example of which is described in more detail herein with respect to FIG. 15.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1400 described herein with respect to FIG. 14. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
one or more processors to:
receive first data corresponding to a first data channel and second data corresponding to a second data channel;
perform a first cyclic redundancy check (CRC) computation for the first data channel using the first data to compute a first value;
perform a second CRC computation for the second data channel using the second data to compute a second value;
determine a status associated with the system based at least on the first value, the second value, and a signature value corresponding to the at least one of the first data or the second data; and
output data representative of the status.

2. The system of claim 1, wherein the one or more processors are further to:
determine a third value based at least on the first value and the second value,
wherein the state associated with the system is determined based at least on comparing the third value to the signature value.

3. The system of claim 1, wherein:
the first value includes at least one of a first multi input signature register (MISR) data value or a first MISR address value;
the second value includes at least one of a second MISR data value or a second MISR address value; and
the signature value includes at least one of a signature MISR data value or a signature MISR address value.

4. The system of claim 1, wherein the one or more processors are further to mask at least a third data channel in order to at least one of refrain from receiving third data corresponding to the third data channel or refrain from performing a third CRC computation for the third data channel using the third data to compute a third value.

5. The system of claim 1, wherein the signature value is associated with the first data, and wherein the status of the system is further determined based at least on a second signature value associated with the second data.

6. The system of claim 1, wherein the second CRC computation is performed in parallel with the first CRC computation.

7. The system of claim 1, wherein the first value is a first data value, the second value is a second data value, and the signature value is a signature data value, and wherein the one or more processors are further to:
 receive a first address corresponding to the first data channel and a second address corresponding to the second data channel;
 perform a third CRC computation based at least on the first address to compute a first address value; and
 perform a fourth CRC computation based at least on the second address to compute a second address value,
 wherein the status associated to the system is further determined based at least on the first address value, the second address value, and a signature address value.

8. The system of claim 7, wherein the one or more processors are further to:
 determine a data status associated with the system based at least on the first data value, the second data value, and the signature data value; and
 determine an address status associated with the system based at least on the first address value, the second address value, and the signature address value,
 wherein the status associated with the system is determined based at least on the data status and the address status.

9. The system of claim 1, wherein the status is associated with a first test, and wherein the one or more processors are further to:
 receive, at a beginning of a second test, third data corresponding to the first data channel and fourth data corresponding to the second data channel;
 determine that a period of time has elapsed since the beginning of the second test; and
 determine a second status associated with the system based at least on the period of time elapsing.

10. The system of claim 1, wherein the system is comprised in at least one of:
 a control system for an autonomous or semi-autonomous machine;
 a perception system for an autonomous or semi-autonomous machine;
 a system for performing simulation operations;
 a system for performing deep learning operations;
 a system on chip (SoC);
 a system including a programmable vision accelerator (PVA);
 a system including a vison processing unit;
 a system implemented using an edge device;
 a system implemented using a robot;
 a system incorporating one or more virtual machines (VMs);
 a system implemented at least partially in a data center; or
 a system implemented at least partially using cloud computing resources.

11. A method comprising:
 receiving first data corresponding to a first data channel and second data corresponding to a second data channel;
 performing a first cyclic redundancy check (CRC) computation for the first data channel using the first data to compute a first value;
 at least partially during the performing of the first CRC computation, performing a second CRC computation for the second data channel using the second data to compute a second value;
 determining a status associated to a system based at least on the first value, the second value, and a signature value associated with at least one of the first data or the second data; and
 outputting data representative of the status.

12. The method of claim 11, further comprising:
 determining a third value based at least on the first value and the second value,
 wherein the determining the state associated with the system is based at least on comparing the third value to the signature value.

13. The method of claim 11, wherein:
 the first value includes at least one of a first multi input signature register (MISR) data value or a first MISR address value;
 the second value includes at least one of a second MISR data value or a second MISR address value; and
 the signature value includes at least one of a signature MISR data value or a signature MISR address value.

14. The method of claim 11, further comprising masking at least a third data channel in order to at least one of refrain from receiving third data corresponding to the third data channel or refrain from performing a third CRC computation for the third data channel using the third data to compute a third value.

15. The method of claim 11, wherein the signature value is associated with the first data, and wherein the determining the status is further based at least on a second signature value associated with the second data.

16. The method of claim 11, wherein the first value is a first data value, the second value is a second data value, and the signature value is a signature data value, and wherein the method further comprises:
 receiving a first address corresponding to the first data channel and a second address corresponding to the second data channel;
 performing a third CRC computation based at least on the first address to compute a first address value; and
 performing a fourth CRC computation based at least on the second address to compute a second address value,
 wherein the determining the status associated to the system is further based at least on the first address value, the second address value, and a signature address value.

17. The method of claim 16, wherein the status is associated with a first test, and wherein the method further comprises:
 receiving, at a beginning of a second test, third data corresponding to the first data channel and fourth data corresponding to the second data channel;
 determining that a period of time has elapsed since the beginning of the second test; and
 determining a second status associated with the system based at least on the period of time elapsing.

18. A hardware component comprising:
one or more processors to:
- receive data corresponding to one or more data channels from a direct memory access (DMA) system;
- compute one or more values by, for at least a data channel of the one or more data channels, performing a cyclic redundancy check (CRC) computation to compute a value;
- compute a final value based at least on the one or more values;
- compare the final value to a signature value; and
- output a status based at least on the comparison.

19. The hardware component of claim 18, wherein the one or more values are one or more data values, the value is a data value, the final value is a final data value, and the signature value is a signature data value, and wherein the one or more processors are further to:
- receive one or more addresses corresponding to the one or more data channels;
- compute one or more address values by, for at least the data channel of the one or more data channels, performing a second CRC computation to compute an address value;
- compute a final address value based at least on the one or more address values;
- compare the final address value to a signature address value; and
- output a status based at least on the comparison of the final address value to the signature address value.

20. The hardware component of claim 18, wherein the hardware component is comprised in at least one of:
- a control system for an autonomous or semi-autonomous machine;
- a perception system for an autonomous or semi-autonomous machine;
- a system for performing simulation operations;
- a system for performing deep learning operations;
- a system on chip (SoC);
- a system including a programmable vision accelerator (PVA);
- a system including a vison processing unit;
- a system implemented using an edge device;
- a system implemented using a robot;
- a system incorporating one or more virtual machines (VMs);
- a system implemented at least partially in a data center; or
- a system implemented at least partially using cloud computing resources.

* * * * *